(12) United States Patent
Astete et al.

(10) Patent No.: US 8,473,627 B2
(45) Date of Patent: Jun. 25, 2013

(54) MULTITENANT HOSTED VIRTUAL MACHINE INFRASTRUCTURE

(75) Inventors: Nicholas Luis Astete, Seattle, WA (US); Aaron Benjamin Brethorst, Seattle, WA (US); Joseph Michael Goldberg, Seattle, WA (US); Matthew Hanlon, Seattle, WA (US); Anthony A. Hutchinson, Jr., Seattle, WA (US); Gopalakrishnan Janakiraman, Bellevue, WA (US); Alexander Kotelnikov, Saint-Petersburg (RU); Petr Novodvorskiy, Seattle, WA (US); David William Richardson, Seattle, WA (US); Roxanne Camille Skelly, Seattle, WA (US); Nikolai Slioussar, Seattle, WA (US); Jonathan Weeks, Vashon, WA (US)

(73) Assignee: Skytap, Seattle, WA (US)

( * ) Notice: Subject to any disclaimer, the term of this patent is extended or adjusted under 35 U.S.C. 154(b) by 0 days.

(21) Appl. No.: 13/276,153

(22) Filed: Oct. 18, 2011

(65) Prior Publication Data

US 2012/0096158 A1 Apr. 19, 2012

Related U.S. Application Data

(62) Division of application No. 12/434,620, filed on May 2, 2009.

(60) Provisional application No. 61/101,665, filed on Sep. 30, 2008, provisional application No. 61/050,163, filed on May 2, 2008.

(51) Int. Cl.
*G06F 15/16* (2006.01)
*G06F 15/167* (2006.01)

(52) U.S. Cl.
USPC .................. 709/229; 709/213; 709/225

(58) Field of Classification Search
USPC .............. 709/203–205, 212–219, 229, 223, 709/225–226; 718/1, 104
See application file for complete search history.

(56) References Cited

U.S. PATENT DOCUMENTS

| | | |
|---|---|---|
| 5,922,044 A | 7/1999 | Banthia |
| 6,453,392 B1 | 9/2002 | Flynn, Jr. |
| 6,766,371 B1 | 7/2004 | Hipp et al. |
| 7,085,883 B1 | 8/2006 | Dalgic et al. |
| 7,093,086 B1 | 8/2006 | van Rietschote |
| 7,331,791 B2 | 2/2008 | Rowley et al. |
| 7,506,265 B1 | 3/2009 | Traut et al. |
| 7,536,541 B2 | 5/2009 | Isaacson |
| 7,577,722 B1 | 8/2009 | Khandekar et al. |
| 7,681,200 B2 | 3/2010 | Wong |
| 7,698,706 B2 | 4/2010 | Bantz et al. |
| 7,793,288 B2 | 9/2010 | Sameske |

(Continued)

OTHER PUBLICATIONS

Declaration of Matthew Hanlon, Oct. 10, 2012, 29 pages.

*Primary Examiner* — Brendan Higa
(74) *Attorney, Agent, or Firm* — Perkins Coie LLP

(57) ABSTRACT

A multi-tenant virtual machine infrastructure (MTVMI) allows multiple tenants to independently access and use a plurality of virtual computing resources via the Internet. Within the MTVMI, different tenants may define unique configurations of virtual computing resources and unique rules to govern the use of the virtual computing resources. The MTVMI may be configured to provide valuable services for tenants and users associated with the tenants.

15 Claims, 54 Drawing Sheets

U.S. PATENT DOCUMENTS

| | | |
|---|---|---|
| 7,865,782 B2 | 1/2011 | Terashima et al. |
| 7,877,485 B2 | 1/2011 | Piper et al. |
| 7,984,449 B2 | 7/2011 | Baran et al. |
| 8,015,563 B2 | 9/2011 | Araujo, Jr. et al. |
| 8,028,048 B2 | 9/2011 | Karve et al. |
| 8,108,858 B2 | 1/2012 | Bantz et al. |
| 8,161,475 B2 | 4/2012 | Araujo, Jr. et al. |
| 8,200,796 B1 | 6/2012 | Margulis |
| 8,209,408 B1 | 6/2012 | Huang et al. |
| 2005/0120160 A1 | 6/2005 | Plouffe et al. |
| 2006/0130059 A1* | 6/2006 | Bennett et al. .................... 718/1 |
| 2006/0136912 A1 | 6/2006 | Robinson et al. |
| 2006/0190532 A1 | 8/2006 | Chadalavada |
| 2007/0078988 A1 | 4/2007 | Miloushev et al. |
| 2007/0089111 A1 | 4/2007 | Robinson et al. |
| 2007/0171921 A1 | 7/2007 | Wookey et al. |
| 2007/0180381 A1 | 8/2007 | Rice et al. |
| 2007/0234302 A1 | 10/2007 | Suzuki et al. |
| 2007/0260702 A1* | 11/2007 | Richardson et al. .......... 709/217 |
| 2008/0022376 A1* | 1/2008 | Ke et al. ............................ 726/5 |
| 2008/0196043 A1 | 8/2008 | Feinleib et al. |
| 2009/0241030 A1 | 9/2009 | Von Eicken et al. |
| 2009/0241108 A1 | 9/2009 | Edwards et al. |
| 2009/0288084 A1 | 11/2009 | Astete et al. |
| 2009/0319580 A1 | 12/2009 | Lorenz et al. |
| 2009/0327471 A1* | 12/2009 | Astete et al. ................... 709/223 |
| 2010/0138830 A1 | 6/2010 | Astete et al. |
| 2010/0235831 A1 | 9/2010 | Dittmer |

\* cited by examiner

FIG. 17

High-level architecture of Multi-Tenant Hosted Virtual Machine Infrastructure

A tenant's clustered network of virtual machines with customized hostnames, network addresses, and operating system types and associated storage pool constructed using MTVMI Tenant's interface to a software library of single and multimachine configurations in MTVMI Customer's interface to a single multi-machine configuration in the library in MTVMI Customer interface for configuring access permissions of their end-users to resources and configurations in MTVMI Super-user interface for inputting customer (i.e. a commercial tenant) usage quota for MTVMI.

FIG. 32

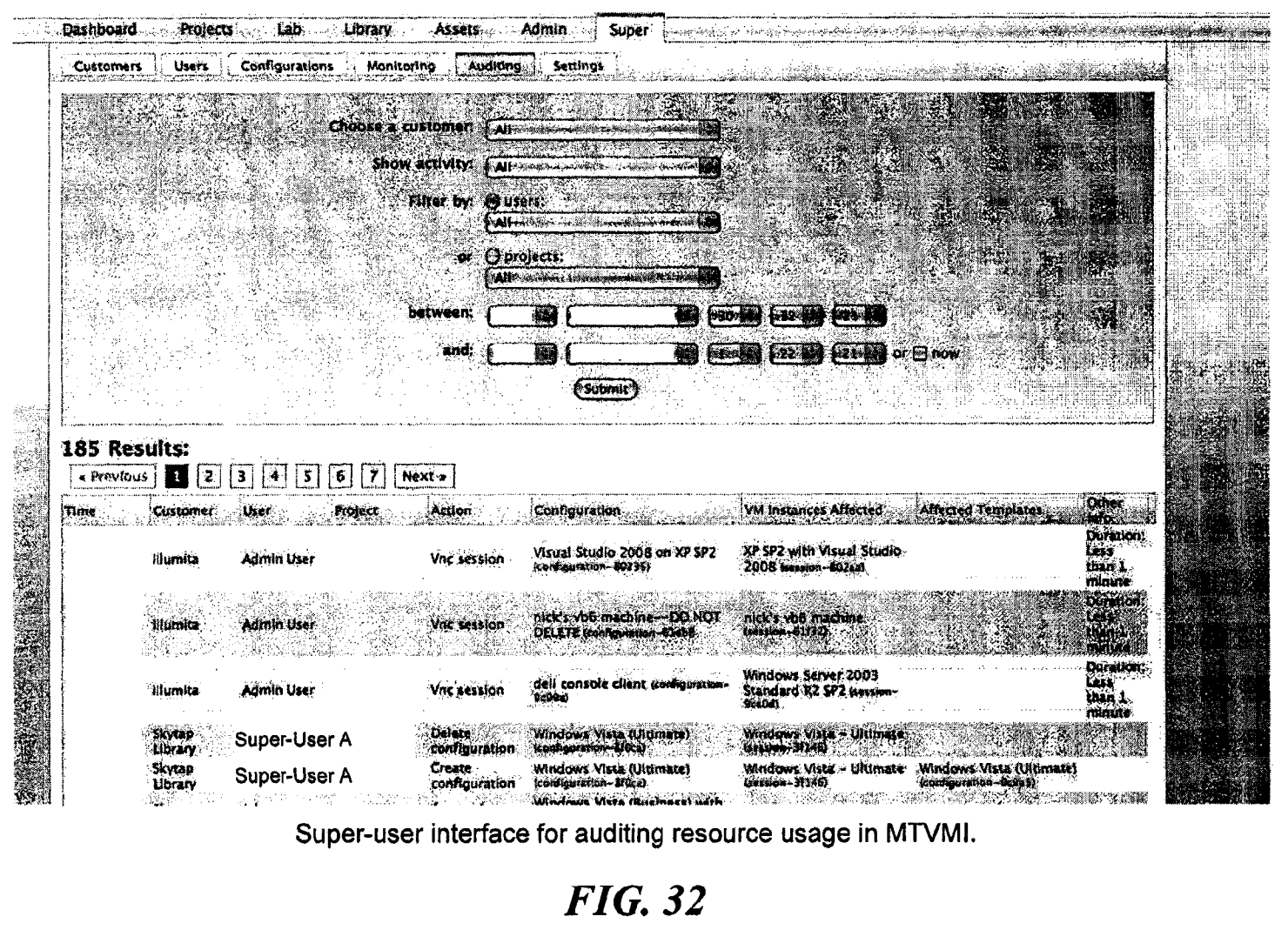

Super-user interface for auditing resource usage in MTVMI.

Interface for reviewing customer resource usage in MTVMI.

FIG. 34

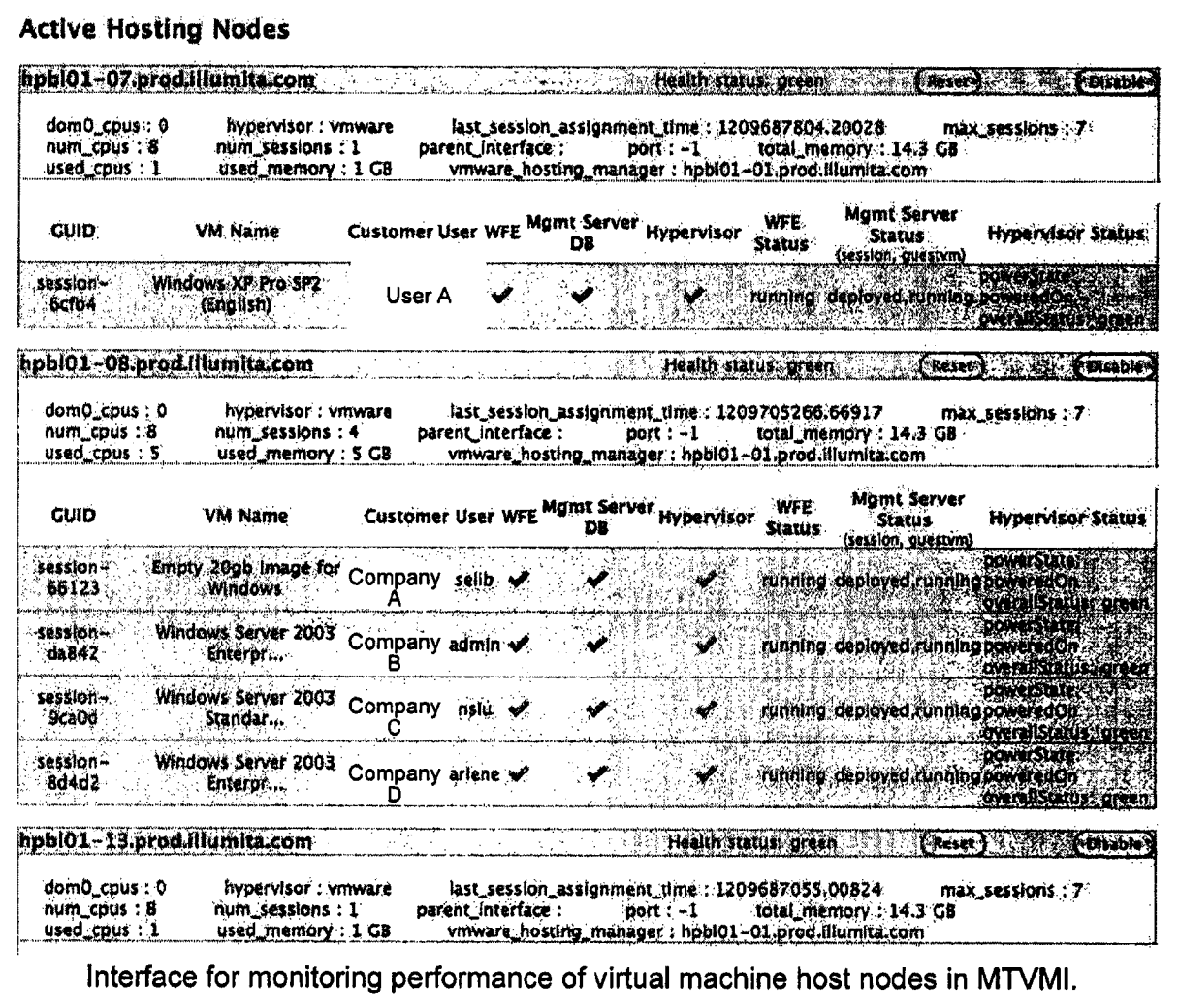

Interface for monitoring performance of virtual machine host nodes in MTVMI.

Interface for controlling virtual machine network settings in MTVMI.

FIG. 36

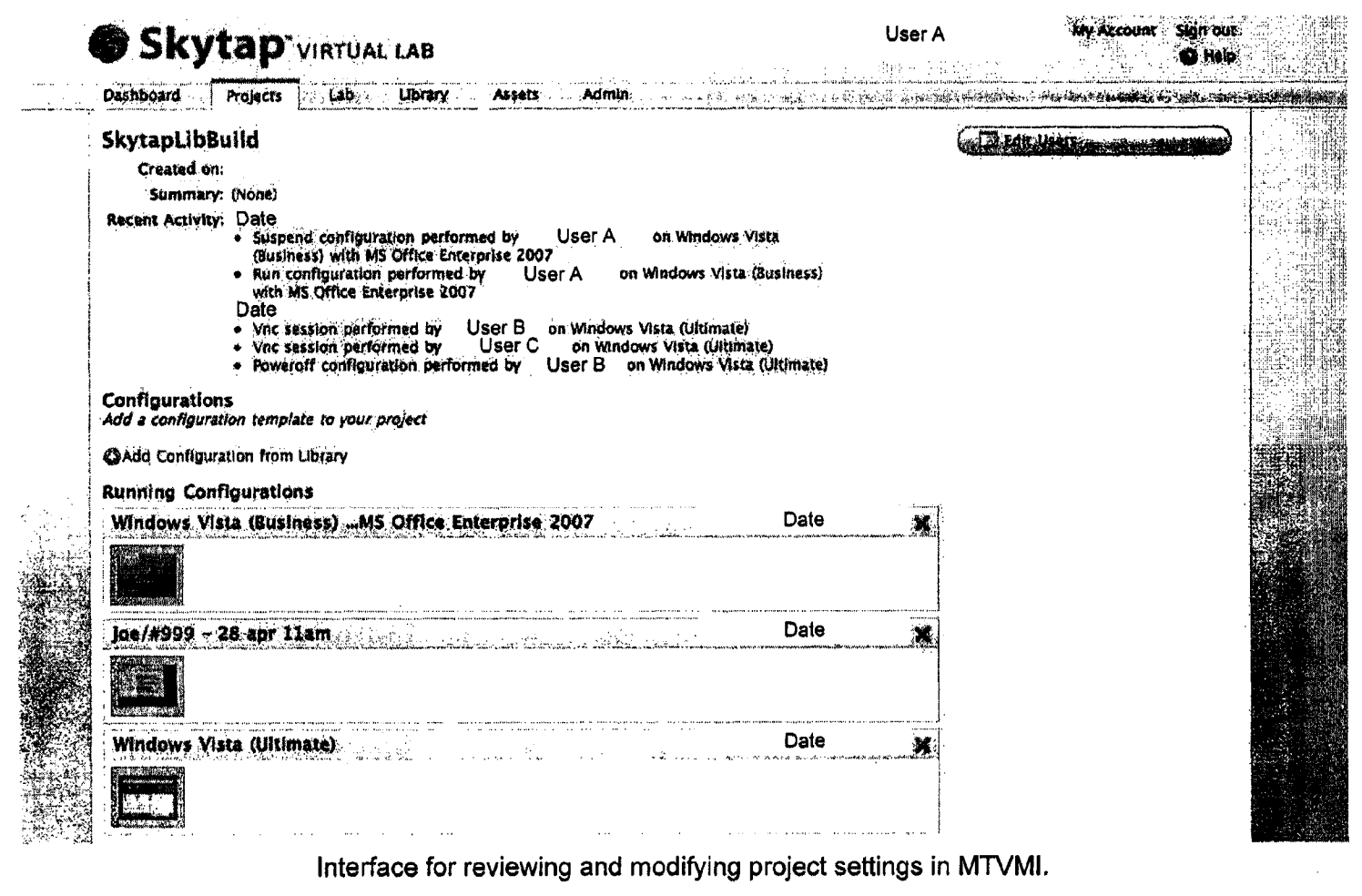

Interface for reviewing and modifying project settings in MTVMI.

Interface for facilitating user navigation within virtual lab service of MTVMI.

FIG. 38

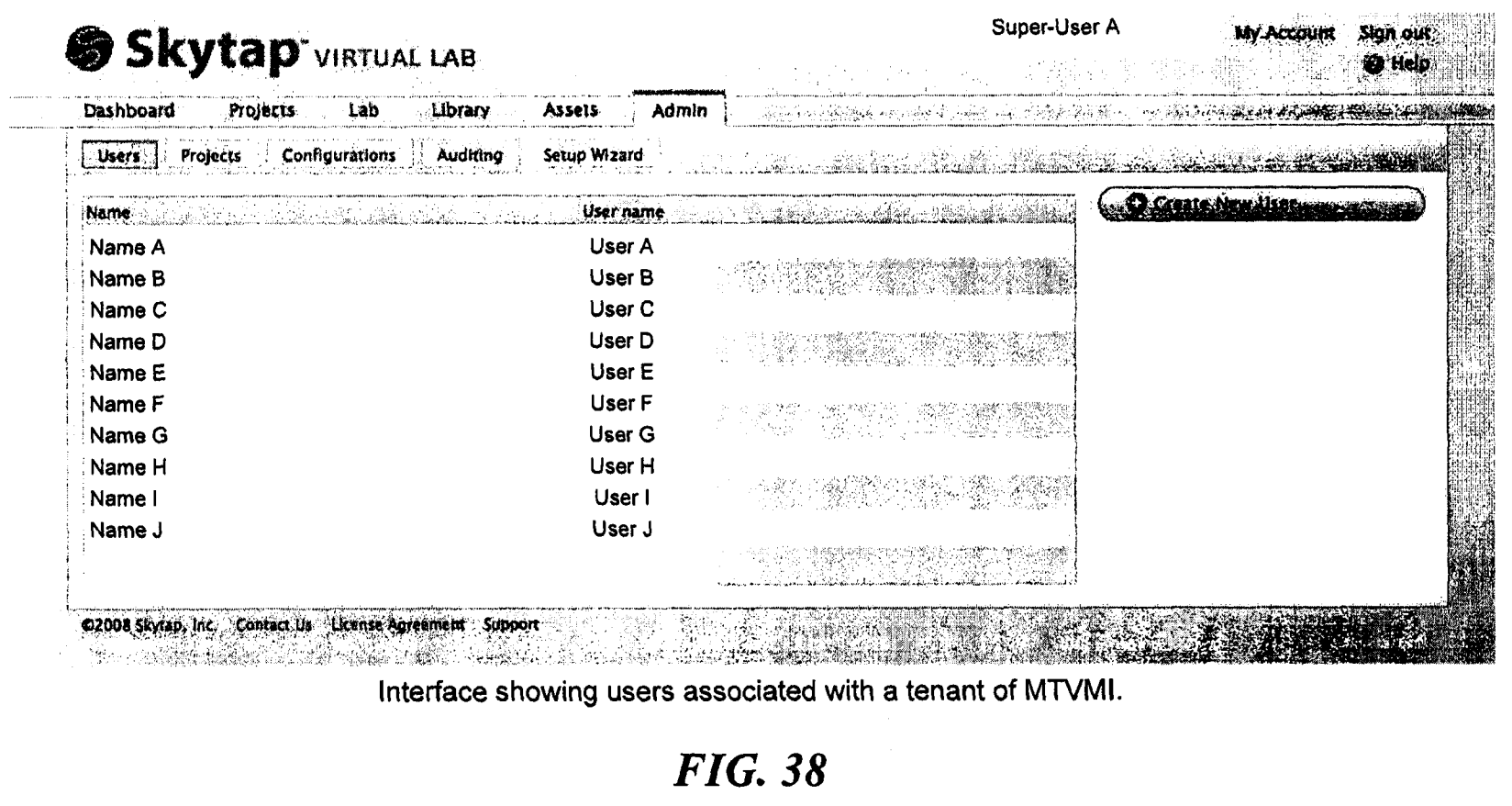

Interface showing users associated with a tenant of MTVMI.

Interface showing available virtual machine configurations within MTVMI.

FIG. 40

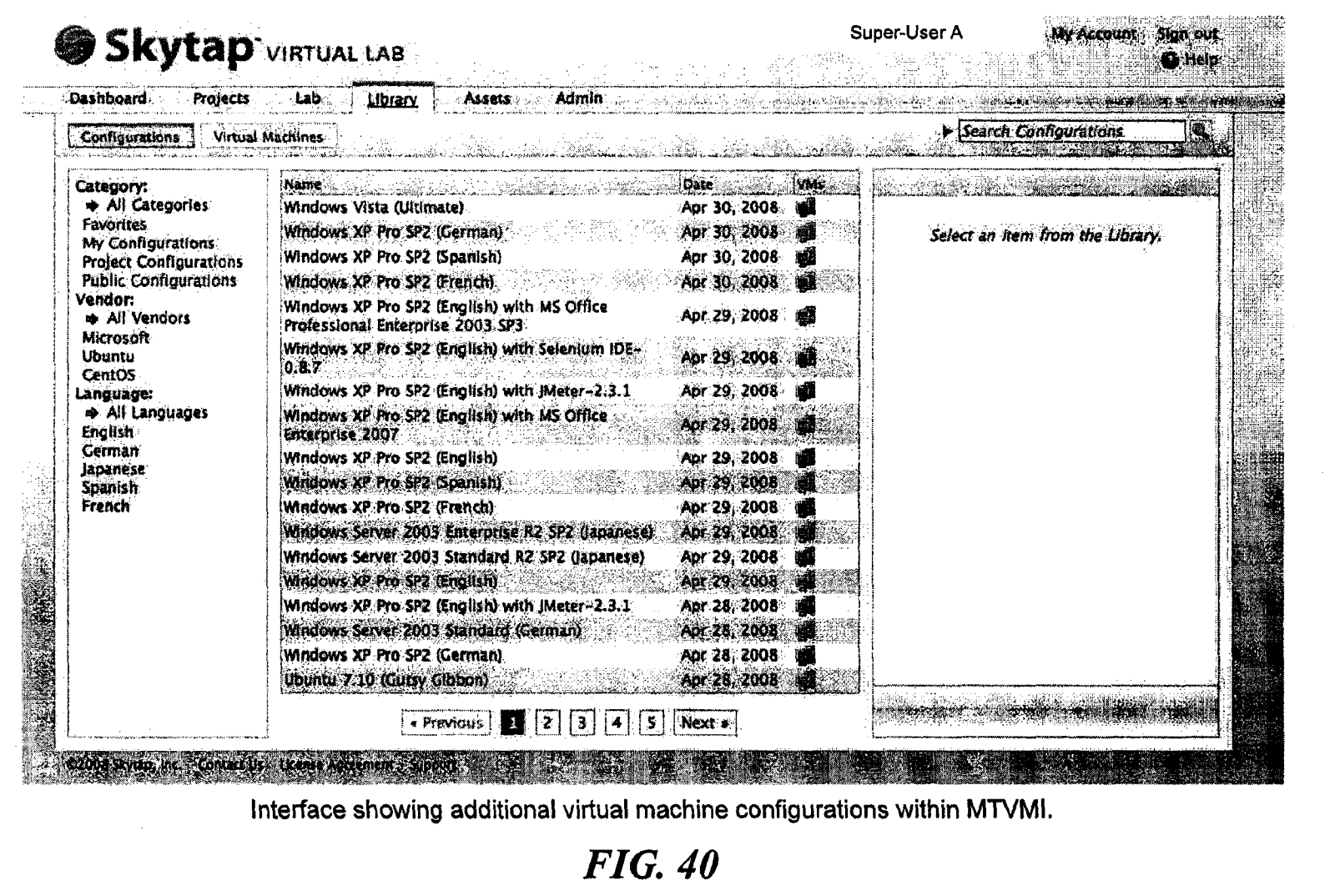

Interface showing additional virtual machine configurations within MTVMI.

Super-user interface showing customers of MTVMI.

FIG. 42

Super-user interface showing users associated with customers of MTVMI.

FIG. 43

Interface showing current configuration of MTVMI.

Interface for authenticating user or tenant software license within MTVMI.

Interface for authenticating user or tenant software license within MTVMI.

new vendor profile

| | | |
|---|---|---|
| company name | HyperTools | 4701 |
| company address | 11 E. Main St.<br>Zora, PA 17320 | 4702 |
| contact name | Denise Arnold | 4703 |
| contact email | DA@H-Tools.com | 4704 |
| contact phone | 717-934-1212 | 4705 |
| access password | **** | 4706 |

Submit — 4710

4700

*FIG. 47* list content for consumption on marketplace vendor    HyperTools /—4801 name    4811 —\ Crossbow Debugger description    4812 —\ A robust debugging environment; received four start review from Developer's Journal support link    4813 —\ www.h-tools.com/support/cb.htm listing expiration date    4814 —\ 1/1/2012 pricing:

| | | | |
|---|---|---|---|
| monthly subscription | $ | 25 | /mo/user   4821 |
| annual subscription | $ | 200 | /yr/user   4822 |
| hourly metered | $ | .05 | /hr   4823 |
| permanent license | $ |  | /user   4824 | file to upload    c:\bin\cb.exe    [Browse] —4831 / —4832

[Submit] —4840

*FIG. 48* vendor accounting results for February, 2009

| item | rate | units | revenue | item total |
|---|---|---|---|---|
| crossbow debugger | $25/mo/user | 22 | $550 | |
| | $200/yr/user | 4 | $800 | |
| | $.05/hr | 7200 | $360 | $1710 |
| image cropper | $5/yr/user | 75 | $375 | |
| | $10/user | 230 | $2300 | $2675 |
| gross revenue for month | | | | $4385 |
| marketplace charge | | | | ($877) |
| net revenue for month | | | | $3508 |

*FIG. 49*

Customer Table 5201

| Customer ID | Customer Attributes |
|---|---|
| | (includes Customer Quota ID) |

User Table 5202

| User ID | User Attributes |
|---|---|
| | (includes Customer ID, User Quota ID) |

Project Table 5203

| Project ID | Project Attributes |
|---|---|
| | (includes Customer ID, Project Quota ID) |

Role Assignment Table 5204

| User ID | Project ID | User Role |
|---|---|---|

Shares Table 5205

| Object ID | Owner ID | Customer ID | List of Project IDs Shared With |
|---|---|---|---|
| (e.g. Virtual Data Center Configuration ID, etc.) | | | |

*FIG. 52*

Customer Table 5301

| Customer ID | Customer Attributes (Includes Customer Quota ID) |
|---|---|
| | |

User Table 5302

| User ID | User Attributes (Includes Customer and User Quota ID) |
|---|---|
| | |

Project Table 5303

| Project ID | Project Attributes (Includes Customer and Project Quota ID) |
|---|---|
| | |

Resource Usage Events Table 5304

| Event ID | Resource Type | Resource Size | Start Time | End Time | Object ID | List of Quota IDs |
|---|---|---|---|---|---|---|
| | | | | | | |

*FIG. 53*

MULTITENANT HOSTED VIRTUAL MACHINE INFRASTRUCTURE

CROSS-REFERENCE TO RELATED APPLICATION(S)

This application is a divisional application of U.S. application Ser. No. 12/434,620, filed May 2, 2009, which is related to and incorporates by reference in their entirety U.S. application Ser. No. 12/434,619 entitled MULTITENANT HOSTED VIRTUAL MACHINE INFRASTRUCTURE, filed May 2, 2009, and U.S. application Ser. No. 12/434,621 entitled MULTITENANT HOSTED VIRTUAL MACHINE INFRASTRUCTURE, filed May 2, 2009. This application claims the benefit of each of U.S. Provisional Patent Application No. 61/050,163, filed on May 2, 2008, and U.S. Provisional Patent Application No. 61/101,665, filed on Sep. 30, 2008, each of which is hereby incorporated by reference in its entirety.

BACKGROUND

A virtual machine is a software construct designed to run computer programs like a real physical machine. As an example, a virtual machine may comprise various software components for running executable code written for a particular computing platform. Such executable code may include, among other things, operating system code, application programs, software drivers, and so on.

A virtual machine does not necessarily have a direct correspondence to a real physical machine; however, virtual machines are often designed to imitate the behavior of specific hardware architectures. As an example, a virtual machine may be designed to imitate the behavior of an x86 processor.

Virtual machine infrastructures (VMIs) have been developed to coordinate user access to collections of virtual machines and to provide additional features such as virtual networking capability, virtual data storage management, and so forth. In general, a VMI comprises a set of physical computational resources, virtualization software for creating virtual machines on the physical computational resources, and management software for managing the virtual machines and coordinating access to the virtual machines.

In one example, a VMI comprises a set of physical computers each running multiple virtual machines. Users at separate remote-access consoles access the different virtual machines over a local area network. Each console includes a virtual machine interface designed to allow a user to interact with a virtual machine in the same way that the user would interact with a local machine. For instance, the virtual machine interface may present a user desktop and explorer windows similar to those found in an ordinary personal computer.

Within a VMI, different virtual machines may be individually configured according to the users' unique needs and preferences. For instance, the different virtual machines may run different types of operating systems (e.g., Windows, Linux), allowing the users to use different operating-system-specific programs within the VMI. Additionally, each of the virtual machines may provide a different level of performance so that the resources of the single physical computer can be efficiently divided among users having different computational demands.

Recently, large enterprises have begun employing complex VMIs to provide virtual computing resources for large groups of users. These users may work together, but have different computational demands. As an example, a company with hundreds of employees may set up a virtual data center comprising many physical machines each configured to run several virtual machines for use by the employees.

The virtual machines can be configured in accordance with the different computational demands and preferences of the different employees. For instance, an employee whose job requires a significant amount of computing power—say, an engineer who runs test simulations on complex circuits—may use a virtual machine configured with higher throughput and more memory, compared with an employee whose job only requires the use of a few simple programs such as a word processor and an Internet browser. Similarly, an employee whose job requires a relatively high level of system access—say, a system administrator—may use a virtual machine configured with a higher level of access within the VMI compared with an employee whose job requires a relatively lower level of access.

Conventional VMIs are designed for use within a single organization, i.e., a single company or group of users. In this type of VMI, the operation of the virtual machines is governed by a common set of rules, such as a common hierarchy of access rights, usage rights, quality of service guarantees, and naming conventions. Additionally, in this type of VMI, the administration of the computing hardware and operating software as well as the configuration and execution of virtual machines on this infrastructure are controlled by a single administrative entity, i.e., a single system administrator or group of system administrators. Furthermore, these conventional VMIs do not provide adequately isolated or independent network services or storage services for virtual machines executed by different users. Also, these conventional VMIs do not support adequate resource usage quota, reporting, and enforcement mechanisms.

BRIEF DESCRIPTION OF THE DRAWINGS

FIGS. 9-24 are display diagrams showing a typical user interface presented by an example software application running on a MTVMI to provide a virtual lab service in some embodiments.

FIGS. 27-46 are display diagrams showing displays presented by the MTVMI in some embodiments.

FIGS. 47-49 are display diagrams illustrating a user interface designed for use by vendors offering items for sale via the brokering portal in some embodiments.

FIG. 52 is a block diagram illustrating the organization of the data model that supports access control mechanisms of MTVMI management application in some embodiments.

FIG. 53 is a block diagram illustrating the organization of the data model that supports resource usage quota mechanisms of MTVMI management application in some embodiments.

DETAILED DESCRIPTION

Figure 1:
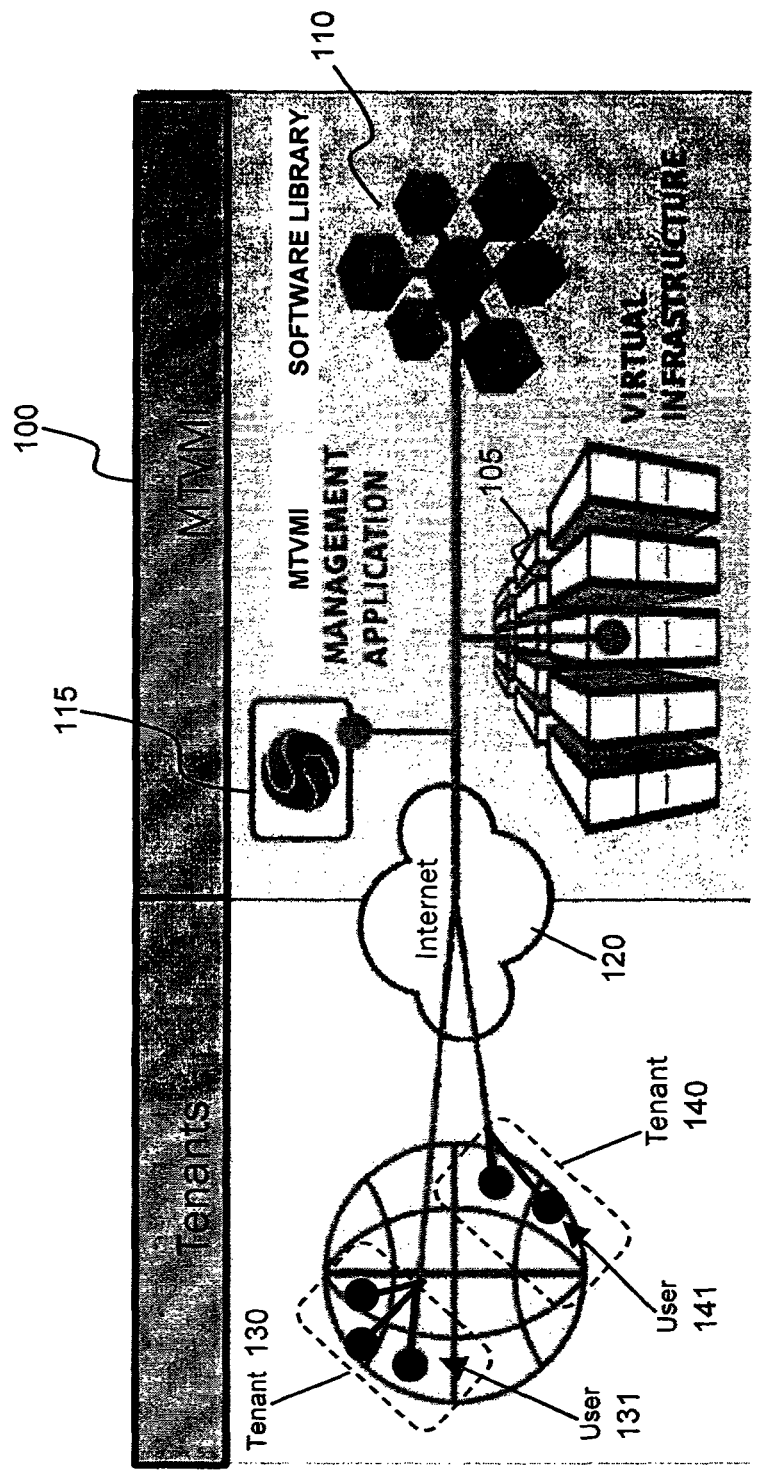
FIG. 1 is a conceptual diagram providing a system-level overview of a multitenant virtual machine infrastructure (MTVMI) in some embodiments.

A variety of embodiments will now be described. These embodiments are provided as teaching examples and should not be interpreted to limit the scope of the invention. Although specific details of the embodiments are presented, these embodiments may be modified by changing, supplementing, or eliminating many of these details.

A shared computing infrastructure ("the infrastructure") is described. In some embodiments, a user can exploit the entire infrastructure using a standard web browser running on a personal client machine (e.g., the user's laptop), without having to install any specialized applications on the client machine. The infrastructure supports the deployment of virtual data centers, wherein each virtual data center comprises one or more virtual machines capable of transparently interfacing amongst themselves and with computing resources located elsewhere in the Internet. As an example, the infrastructure may execute a virtual data centers on physical machines within the infrastructure, while users control the virtual machines through personal computers connected to the infrastructure via the Internet.

The shared computing infrastructure may incorporate a software environment and interface capable of facilitating the automation of specific virtualized infrastructure based services. As an example, the infrastructure may incorporate a software platform that implements a portal where users can develop and exchange data that may be useful within the infrastructure. This data could include, e.g., virtual data center configurations and software applications that could be run within the virtual data center. The data could be developed by individual users or by group collaboration within the infrastructure. Additionally, the data could be exchanged with or without monetary payments.

For explanation purposes, the shared computing infrastructure will be referred to as a multi-tenant virtual machine infrastructure (MTVMI). A MTVMI is a VMI adapted for use by multiple tenants, where each "tenant" is an independent entity (e.g., a set of users within a single company or other organization) whose access to and use of the MTVMI is governed by a unique and independent set of rules. For instance, each tenant in a MTVMI may have a unique and independent authentication mechanism, access control model, hierarchy of rights and privileges, resource allocation control model, resource usage control, quotas, service level agreements, and billing. The MTVMI may provide virtual data center isolation for each tenant. For example, the MTVMI may allocate a number of virtual resources for the exclusive use of a tenant concerned with security or availability of services. While tenants have access to and use of the MTVMI, the MTVMI may be owned and operated by a different independent entity (logically the "landlord").

Although the term "tenant" generally has a connotation related to the rental or occupation of property or space, "tenant" in the current context should not be limited to entities having certain legal or logistical agreements or arrangements relative to the MTVMI; neither should it be limited to entities who occupy a certain quantity of space or resources within a MTVMI. Rather, "tenant" here merely refers to any entity having a certain logical relationship with the MTVMI as demonstrated by the examples and explanations presented in this written description.

Examples of multiple tenants sharing a MTVMI include different companies or groups of individual users. For instance, an MTVMI could be shared by multiple large corporations each having its own set of virtual data centers, application software assets, set of users and so on.

The MTVMI is unique in delivering virtual data centers as a service over the Web based on a multi-tenant shared infrastructure. In addition to those mentioned above, the MTVMI may provide additional capabilities valued by customers in the initial target markets (e.g., Quality Assurance, Staging, Training, Pre-sales Proof of Concept, etc.), such as network services (e.g., DHCP, DNS) for virtual data centers, connectivity to internal data centers, rapid creation of custom virtual machines, storage virtualization, and remote access to virtual data centers and virtual machine environments.

FIG. 1 is a conceptual diagram providing a system-level overview of an MTVMI in some embodiments. MTVMI 100 comprises a physical infrastructure resident at the MTVMI provider's site, virtual infrastructure 105, a software library 110, and a MTVMI management application 115.

The left side of FIG. 1 shows different tenants 130 and 140 connected to MTVMI 100 through the Internet 120. Different users among tenants 130 and 140 may access MTVMI 100 over corresponding secure Internet connections. Typically, a user accesses MTVMI 100 by logging on to the infrastructure through a console or Internet browser. Once the user logs on to MTVMI 100, a user interface for MTVMI 100 appears in the user's computer display to allow the user to access various features of MTVMI 100. In some embodiments, the user interface appears similar to a normal computer desktop, so that the user's experience is substantially the same as it would be if the user was interacting with a set of local resources. The user interface enables a user associated with a tenant to manage virtual data centers, such as by creating, configuring, starting, and stopping virtual machines within the virtual data centers. In some embodiments, the user interface may control a user's access to certain resources of the virtual data center. For example, the user interface may allow users with administrative privileges to start and stop virtual machines while prevent other users from doing so.

In general, tenants can access MTVMI 100 over the Internet from any Internet-enabled device. As examples, the MTVMI can be accessed through personal computers, Internet-enabled personal digital assistants (PDAs), and Internet-enabled cell phones. In some embodiments, where a user accesses the MTVMI 100 using a portable device such as a PDA or cell phone, the user does so with a web browser installed in the device, much like the user would do in a personal computer.

Each tenant of MTVMI 100 operates within its own unique, private virtual environment. The environment for each tenant may include, for example, one or more private virtual data centers each comprising a set of virtual machines, virtual storage, and virtual network accessible to the tenant's users. The environment for each tenant may provide the tenant's users with access to ready-to-instantiate templates of virtual data centers and specific software applications in Software Library 110. Additionally, the environment may provide Labs corresponding to instantiated virtual data centers that can be executed. Furthermore, through the MTVMI, a tenant may create custom virtual data centers by specifying certain attributes of the virtual data centers and/or their virtual machines (e.g., number of cores, amount of RAM, domain name, IP addresses, etc.). The MTVMI provides a number of methods for building and rapidly deploying virtual machines, such as uploading and installing complete virtual machine images, installing operating system packages on raw virtual machine containers, installing application packages on pre-built virtual machine images, etc. Furthermore, because the MTVMI may store the state of an entire virtual data center, including its virtual machines, storage, network identifies, network service profiles, and so on, the virtual data centers and their virtual machines can be replicated. The environment may further include methods for managing the virtual data centers, such as a hierarchy of user access rights, limits on the amount of resources such as central processing unit (CPU) time and storage space available to the users, and so on. In some embodiments, the MTVMI can provide resource isolation for some or all of its tenants. For example, the MTVMI may assign a tenant with heightened security concerns a set of virtual resources for the exclusive use of that tenant. When the tenant is processing or manipulating secure data, the tenant can use the "private" resources to prevent other tenants of the MTVMI from comprising the tenant's secure data.

Within MTVMI 100, virtual infrastructure 105 comprises both a physical platform for running virtual machines, virtual storage, and virtual network, and a software platform enabling the creation and management of the virtual machines, virtual storage, and virtual network. The physical platform may comprise computer hardware such as storage system and media, servers comprising CPUs, memory, and related processing components, and networking hardware such as network switches, routers, etc. The software platform may include, e.g., a hypervisor for each server, and software components for the storage system and networking components and software for managing them.

Within virtual infrastructure 105, different functional components can be roughly partitioned into three groups, including network nodes, virtual machine host nodes, and storage nodes. Network nodes include both hardware and software components for implementing virtual network functionality (e.g., network services such as DHCP and DNS, VPN services, file share services, etc.), virtual machine nodes include hardware and software components for creating and hosting virtual machines, and storage nodes include hardware and software components for implementing virtual data storage. In some embodiments, the storage nodes are part of a distributed file system management architecture that supports, among other things, fast snapshot and cloning operations in a scalable way, such as data placement, data migration, and load balancing.

Software library 110 comprises a collection of software programs, data objects, and/or virtual data center configurations for use by tenants and associated users who interact with MTVMI 100. The software programs may include, among other things, specific operating systems to be run on virtual machines, application programs to run within the virtual machines, and any code used by tenants to maintain their own virtual resources. The data objects may include, for example, database files, software configuration files, and so forth. The virtual data center configurations may include, e.g., specifications of network topologies, and hardware and software specifications for individual virtual machines within virtual networks. One example configuration for a virtual machine could include 2 GHz virtual CPU and 1 GB RAM, and run Windows XP.

Some of the programs and data in software library 110 may be commercial software requiring individual or corporate user-licenses. The licensing of these programs or data may be regulated in any of several different ways. As examples, tenants or individual users could provide their own license keys for the programs, or licenses could be provided as part of a tenant's agreement for using the MTVMI. In some embodiments, MTVMI 100 includes mechanisms for automatically negotiating the licenses with third-party software providers in real time. In some embodiments, licenses are purchased by the entity hosting the MTVMI 100 so that users are not required to obtain their own licenses. In some embodiments, software library 110 may be connected to a licensing module to negotiate on-demand licensing of proprietary software to tenants, or management of a limited number of existing licenses among multiple users.

In some embodiments, software library 110 is divided into public and private libraries. A public library is a portion of software library 110 accessible to any tenant using MTVMI 100. A private library, on the other hand, is a portion of software library 110 accessible to only a subset of the tenants using MTVMI 100 or to a subset of users belonging to a tenant. Public libraries may include, for instance, freeware software applications, commercial operating systems and applications that can be provided to tenants for a charge based on usage, shared data, and so on. Private libraries may include, for instance, licensed or proprietary software for use by individual tenants, specific data objects related to work performed by the tenant or the configuration of a tenant's virtual network. In some embodiments, a library can contain a commercial operating system, application, or other program that, when installed on a virtual machine, will be customized with a license key owned by the installing tenant. In some embodiments, the MTVMI makes commercial library items available to users on a pay-per-use basis. In these embodiments, the MTVMI provides the architecture, data model, workflows, and metering to support this service. The MTVMI enables producers of such content to upload and identify their products so that consumers can find them and download them for use. Furthermore, the MTVMI can meter, enforce, and bill consumers for any period of usage.

In addition to specific software programs and data structures, software library 110 may further include specific virtual data center configurations for use by individual tenants. A virtual data center configuration stored in the software library contains complete information for instantiating a set or "cluster" of virtual machines connected by a virtual network. The virtual data center configuration specifies capabilities of each virtual machine to be instantiated, including such attributes as number of processor cores, amount of memory, operating systems, etc. The virtual data center configuration further contains complete state for each virtual machine to be instantiated. Such state generally includes contents of a disk volume to be accessible by the virtual machine, and may also include memory contents of the virtual machine, and/or processor state for the virtual machine, including contents for registers including program counters. In some embodiments, a user may upload a virtual machine image generated outside the MTVMI. This virtual machine image can be stored in the library, and instantiated by the MTVMI in a virtual data center.

An instance of a virtual data center can be created by a tenant's user using the content in the software library. As an example, one virtual data center may include several virtual machines with a particular operating system and particular applications, as well as virtual storage, that is together performing a batch application. A tenant or a tenant's user may have a number of such virtual data center configuration instances, which can be in varying states, including running and stopped. The set of these virtual data center configuration instances comprise the Lab for the tenant or the tenant's user.

Further descriptions of software libraries and labs are provided below with reference to FIGS. 11-20. Various additional functions and benefits of software library 110 will be readily apparent from the descriptions of FIGS. 11-20.

MTVMI management application 115 controls and monitors interactions between tenants and MTVMI 100. Additionally, MTVMI management application 115 allocates resources among different tenants and coordinates the use of MTVMI 100 by the different tenants. Various management related tasks performed by MTVMI management application 115 may include, as examples, authenticating users, allocating CPU time and storage space among different tenants, maintaining logical isolation between different tenants, tracking each tenant's usage of MTVMI 100, and many others. Additional examples of specific functions that can be performed by MTVMI management application 115 are described below in relation to FIG. 6.

Tenant information such as virtual data center configurations and stored data within MTVMI 100 may be generated in a variety of different ways. For instance, in some embodiments, the tenant information may be generated by a tenant's privileged user through manual operations on the MTVMI 100 using its graphical interface. Alternatively, virtual data center configurations and other tenant information can be generated for MTVMI 100 by providing a virtual machine appliance container that describes an existing physical or virtual machine to a module within MTVMI 100, and operating the module to generate a virtual data center configuration for use within MTVMI 100. Moreover, virtual data storage facilities can be established and initialized within MTVMI 100 by downloading data from an existing data storage platform into MTVMI 100.

Figure 2:
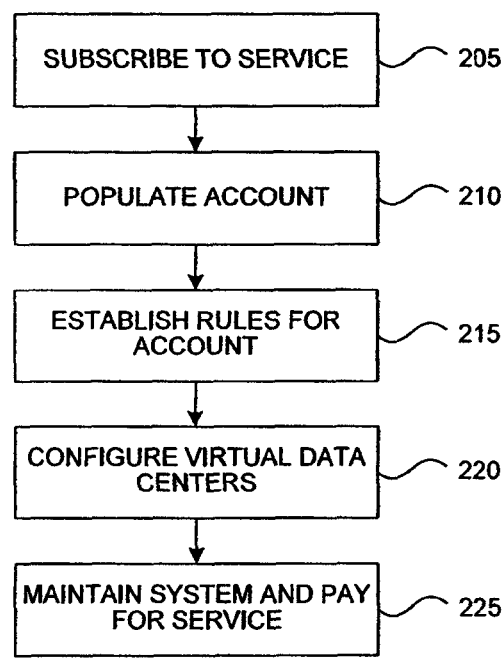
FIG. 2 is a flowchart illustrating the use of a MTVMI by a new tenant in some embodiments.

FIG. 2 is a flowchart illustrating the use of a MTVMI by a new tenant in some embodiments. FIG. 2 is intended to provide a very broad illustration of the tenant's interactions with the MTVMI, beginning with the initial establishment of a usage agreement between the tenant and an MTVMI host. In the description that follows, it can be assumed that actions performed by the tenant are actually carried out by a representative of the tenant, such as a system administrator or another authorized individual.

Referring to FIG. 2, in step 205, a tenant establishes a relationship with a MTVMI host by submitting a subscription request to the host. In the subscription request, the tenant may specify, among other things, a desired amount of resource usage within the MTVMI, any desired features such as access to particular software applications, and other terms for governing tenant's use of the MTVMI. A tenant's resource usage can be measured in any of several different ways, including, e.g., by a total amount of CPU time used by the tenant, or by a total amount of time that users are logged on to the MTVMI.

Once a tenant has subscribed to use the MTVMI, the tenant may populate their MTVMI account in step 210. They may create individual accounts for the tenant's users. They may also populate the account with data such as virtual machine images, software installation binaries, data files etc. by transferring them as needed from the tenant's other computing environments or elsewhere.

As one of the steps in establishing practices for using their MTVMI account, in step 215, the tenant establishes rules to govern use of the MTVMI environment. Examples of these rules include, among others, creating project structures to organize the environment, assigning users different privileges on different projects to establish access control, and establishing limits on the amount of resource usage such as computational bandwidth and storage space allocated to different users. The access rights, in addition to limiting use of certain resources by certain users, may also limit the ability of certain users to change aspects of the virtual data center, e.g., by adding additional machines, and so forth. In many regards, the rules governing the virtual data center can be established so they are similar to the rules that govern ordinary, physical data centers. The MTVMI provides the environment and tools for a tenant's users to establish these governance rules.

Once rules have been established for the virtual data center, in step 220, the tenant's users can establish virtual data centers within the MTVMI. Each of the tenant's virtual data centers may include, among other things, a set of virtual machines, a set of virtual networks, and a set of data storage resources. The performance and capacity of the tenant's virtual data centers may be limited by the tenant's subscription agreement; however, the tenant is generally free to configure the logical structure of the data center in any way desired. At a high level, the tenant's process of establishing a virtual data center may be compared, by analogy, to the process that an organization goes through to establish a physical data center, by purchasing a set of physical resources, connecting the resources together, and getting the resources to communicate with one another. However, in contrast to a physical data center, a virtual data center requires significantly less legwork on the part of the system architects, and therefore tends to require much less time and expense.

Once resources have been configured for the virtual data center, in step 225, the tenant may continue to perform maintenance and monitoring on its virtual data center while the virtual data center is being used by the tenant's users. The maintenance and monitoring may include upgrading and patching various components, modifying the set of users associated with the tenant, measuring the resource usage by different users, and so on.

Those skilled in the art will appreciate that the steps shown in FIG. 2 and in each of the flow charts discussed below may be altered in a variety of ways. For example, the order of the steps may be rearranged; some steps may be performed in parallel; shown steps may be omitted, or other steps may be included; etc.

Figure 3A:
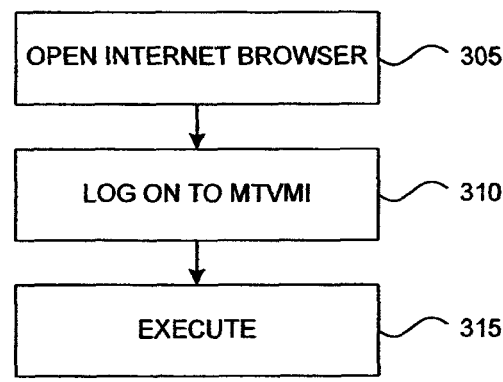
FIG. 3A is a flowchart illustrating the use of a MTVMI by a user associated with a particular tenant in some embodiments.

FIG. 3A is a flowchart illustrating the use of a MTVMI by a user associated with a particular tenant in some embodiments. To use the MTVMI, in step 305, the user opens an Internet browser. As explained above, the Internet browser may be included in any type of web-enabled device, including, e.g., a personal computer, a web-enabled cell phone, or a PDA.

After opening the Internet browser, the user enters a URL for the MTVMI to load an MTVMI access portal website into the browser. In step 310, the user logs onto the MTVMI through the access portal by supplying credentials such as a user name and password to the portal.

After the user logs onto the MTVMI, in step 315, the MTVMI begins executing resources on behalf of the user so that the user may access, for example, the software library, labs, and data store. A lab can have multiple virtual data center configuration instances, each of which can have multiple virtual machines. The display of the user's machine may be modified to show a desktop for any instantiated virtual machine in the labs. The desktop may resemble an ordinary computer desktop as is normally displayed on a personal computer. As a result, the user may interact with the virtual machine in essentially the same way that the user would interact with a local machine.

Figure 3B:
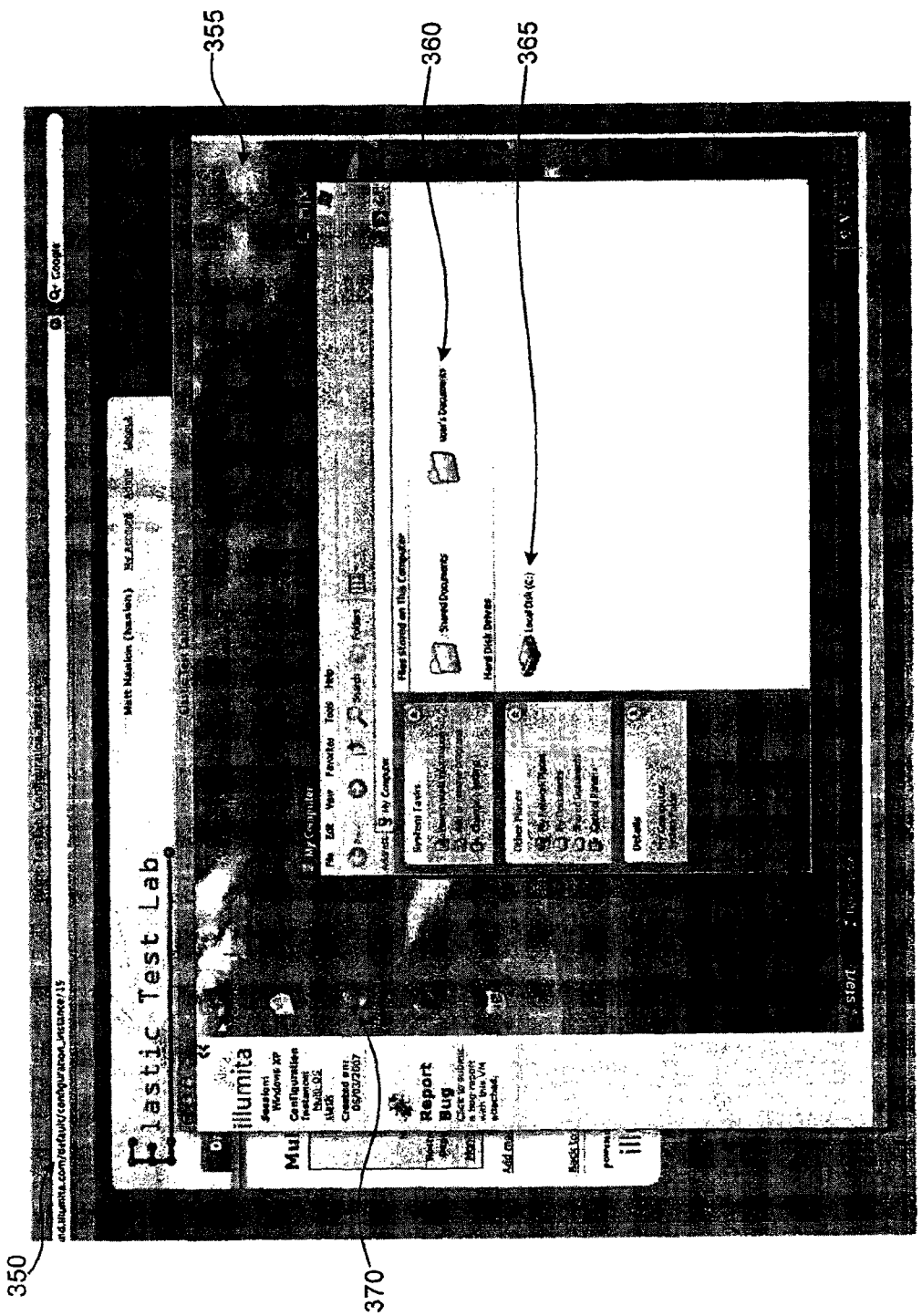
FIG. 3B is a display diagram illustrating an example browser used to log into a MTVMI and a resulting screen that appears in the user's display upon logging in to the MTVMI in some embodiments.

FIG. 3B is a display diagram illustrating an example browser used to log into a MTVMI and a resulting screen that appears in the user's display upon logging in to the MTVMI in some embodiments. Through the browser window, the user can navigate to the console display 355 of one of their virtual machines. As seen in FIG. 3B, within this virtual machine, the user may have access to a virtual local disk 365, and documents 360 stored in a virtual storage platform. In addition to this virtual machine, the user may also have access to other virtual machines within a virtual data center created by the tenant. In one embodiment, these additional virtual machines may be accessible through an icon such as the "My Network Places" icon 370 displayed on the screen 355.

Once the user is logged onto the MTVMI, the user may interact with the virtual machine in much the same way that the user would interact with a non-virtual local machine. In addition, as will be described in greater detail with reference to FIGS. 7-22, a user who has logged onto the MTVMI may also perform actions such as creating a lab with multiple virtual machines, and installing custom software applications on the different virtual machines for specific tasks.

Figure 4:
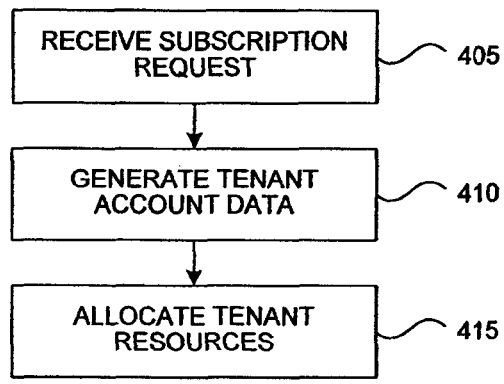
FIG. 4 is a flowchart illustrating the operation of a MTVMI in relation to a tenant in some embodiments.

FIG. 4 is a flowchart illustrating a method of operating a MTVMI in relation to a tenant in some embodiments. The method of FIG. 4 can be viewed as a counterpart to the method illustrated in FIG. 2. In other words, while FIG. 2 illustrates actions performed by a tenant in relation to the MTVMI, FIG. 4 shows actions performed by the MTVMI in relation to a tenant. In general, the actions of the MTVMI may be performed by a MTVMI management application such as that illustrated in FIGS. 1 and 6.

Referring to FIG. 4, in step 405, the MTVMI receives a subscription request from a new tenant. As described above in relation to FIG. 2, the subscription request may include, among other things, information specifying desired usage rights for the new tenant. In step 410, the MTVMI generates account data for the new tenant based on the information provided with the subscription request. The account data may include, e.g., information for regulating MTVMI access and usage by the tenant, such as a data storage quota, authorized users associated with the tenant, a CPU quota, network bandwidth quota, and user authentication information.

After the account data is generated, in step 415, the MTVMI allocates tenant resources, such as data storage space, CPU time, and so forth. In some embodiments, these resources are allocated on an on-demand basis. In other words, resources such as storage space and CPU time are only allotted to a tenant when the tenant performs an operation requiring the resources. In other embodiments, however, resources may be reserved for use by individual tenants, regardless of whether the tenants currently need resources.

Figure 5:
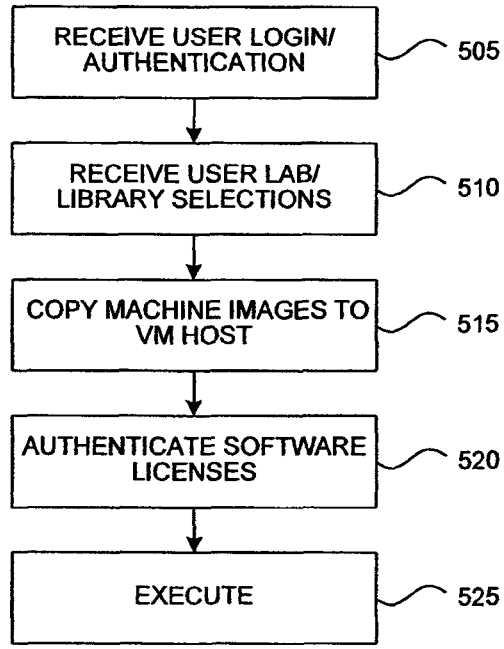
FIG. 5 is a flowchart illustrating the operation of a MTVMI in relation to a user in some embodiments.

FIG. 5 is a flowchart illustrating the operation of a MTVMI in relation to a user in some embodiments. The method of FIG. 5 can be viewed as a counterpart to the method illustrated in FIG. 3. In other words, while FIG. 3 illustrates actions performed by a user in relation to the MTVMI, FIG. 5 shows actions performed by the MTVMI in relation to a user.

Referring to FIG. 5, in step 505, the MTVMI receives user login and/or authentication information. Based on this information, the MTVMI determines whether to allow the user to access the MTVMI. Upon granting the user access to the MTVMI, in step 510, the MTVMI allows the user to configure a virtual data center. Upon request from the user to instantiate a virtual data center configuration, in step 515, the MTVMI binds the selected virtual machines to one or more virtual machine hosts by communicating with the hyperviser for the virtual machine hosts. In step 520, the MTVMI allows the user to perform authentication of any licenses for selected software. In step 525, the MTVMI begins executing the resources. During the execution of virtual machines within MTVMI, the MTVMI may run a console application to generate information on the user's display. In particular, the user can view and interact with the desktop console of the virtual machine in a display such as that shown in FIG. 3B.

Figure 6:
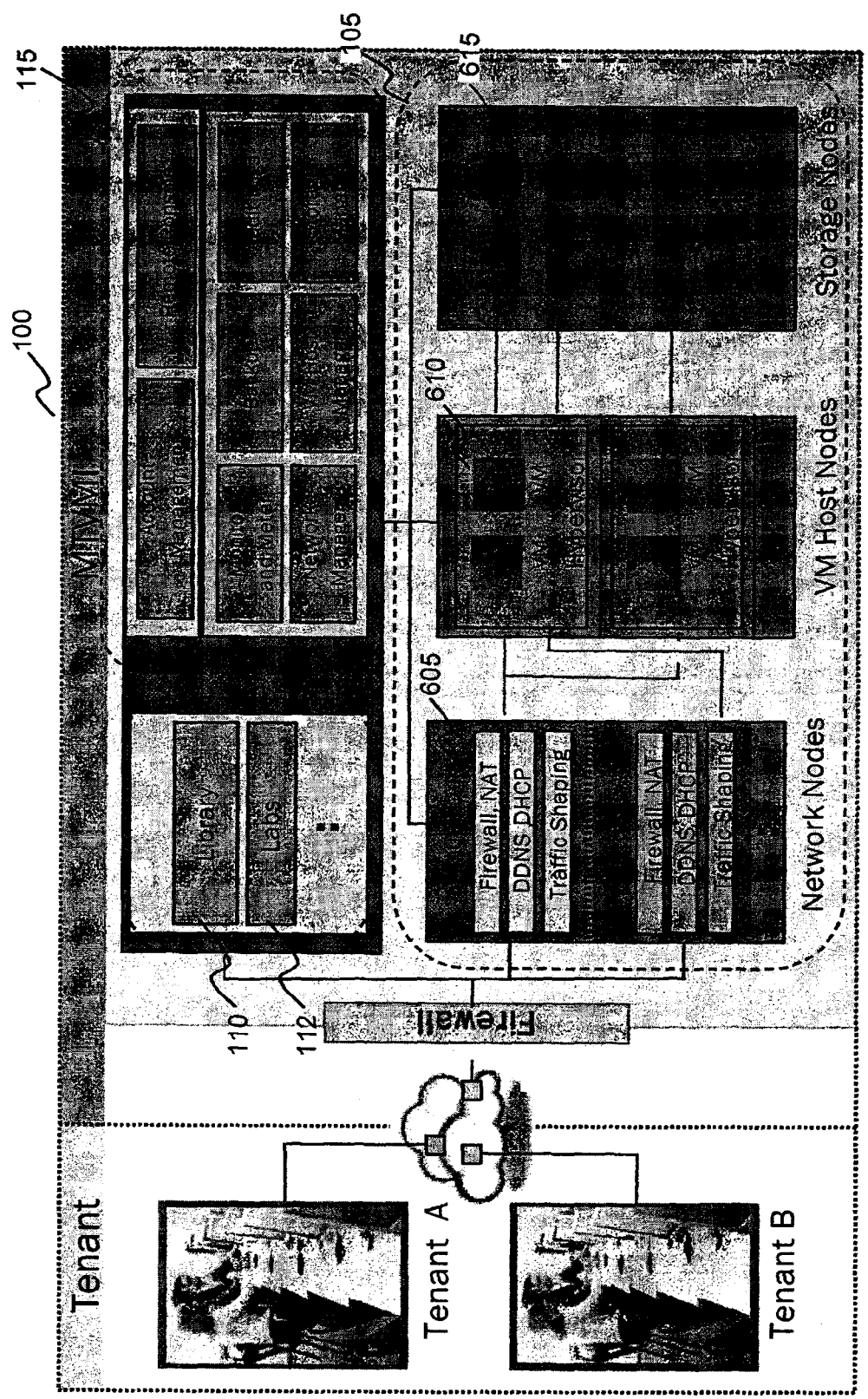
FIG. 6 is a conceptual diagram providing a more detailed system-level overview of a hosted multitenant virtual machine infrastructure in some embodiments.

FIG. 6 is a conceptual diagram providing a more detailed overview of MTVMI 100 shown in FIG. 1 in some embodiments. Further to the description of FIG. 1, FIG. 6, shows various example components that may be included in virtual infrastructure 105, software library 110, labs 112, and MTVMI management application 115.

In the example of FIG. 6, virtual infrastructure 105 comprises a plurality of network nodes 605, a plurality of virtual machine host nodes 610, and a plurality of storage nodes 615, each of which can be implemented using either general purpose commodity server hardware or server hardware more specialized to the roles of network processing, virtual machine execution, and high-volume reliable storage, respectively.

Although the description treats these different nodes as separate features, it should be recognized that the functionality of these nodes can be implemented by different hardware and software arrangements. Moreover, the functionality of the different nodes will not necessarily be implemented within different physical or logical structures. In other words, some components may implement functions for more than one type of node.

Each of the network nodes 605 comprises one or more physical or virtual machines that establish one or more virtual LANs for each virtual network specified by one of the labs 112. A virtual network connects together the virtual machines of a network, and enables them to access their corresponding virtual data stores on the storage nodes. In particular, to implement a virtual LAN, the network nodes establish an independent set of network services for each virtual LAN. These network services include such network services as virtual private network, firewall, network address translation, dynamic DNS, dynamic host configuration protocol service, and traffic shaping. In some embodiments, one or more of these services can be disabled for a particular virtual network. In some embodiments, the user may configure a virtual data center to specify whether, for each of these network services, a standard version is executed in the network node, or a specialized version is executed in the virtual machine. In a similar manner, the user can configure other networking aspects of the virtual LAN, such as by setting static IP addresses for the virtual machines which are private only to the virtual LAN or which are publicly routable from the public Internet, connecting individual VPNs from each virtual machine to their own corporate data center, collectively connecting all the virtual machines in a configuration through a VPN gateway to their own corporate data center, setting their own domain name, running their own domain name server, etc. In some embodiments, one or more of these network nodes work cooperatively as a load-balancing cluster or a failover cluster.

The organization and configuration of network nodes and the networking attributes of individual virtual machines and appropriate virtual storage devices guarantee that network services for each virtual data center are isolated. Network interfaces of virtual machines are configured to operate within one or more specific virtual LANs. Network service instances (e.g., name resolution, DHCP service, VPN gateway service, network file share service etc.) are operated independently for each of these virtual LANs and each of these instances are restricted to service network traffic only from specific virtual LANs. In addition, network nodes are configured with appropriate rules to enforce the routing of network traffic to appropriate VLANs, to mask private network addresses through network address translation, and to firewall or open specific network ports and map between specific ports. The MTVMI management application makes these configuration changes on the network nodes and the individual virtual machines in an automated way based on the input received from the user on the desired networking attributes for the virtual data center.

Each of virtual machine host nodes 610 comprises one or more physical machines capable of executing one or more virtual machines. Each physical machine has a corresponding hypervisor and the one or more virtual machines runs on top of the hypervisor.

Each of storage nodes 615 comprises one or more physical data storage media. These storage media may provide virtual storage for virtual machines running within the MTVMI. Additionally, storage nodes may provide long and/or short term data storage for tenant information such as virtual data center configurations, and data archives. In various alternative embodiments, storage nodes 615 may be populated by users or tenants directly interacting with MTVMI 100, or through automatic processes such as automatically downloading content stored in another data storage system. Additionally, in some embodiments these storage nodes may support capabilities to create snapshots, clones, and mirrors for data objects stored on these nodes. The snapshot of a data object creates a point-in-time checkpoint copy of the data object that is not directly modifiable. The cloning of a data object creates a point-in-time copy of the data object that can subsequently modified independent of the parent object. The mirror of a data object creates a duplicate copy of the data object that is maintained as an exact replica of the parent object even if the parent object is modified subsequently. In some embodiments the copies created by the snapshot, cloning, or mirroring of a data object are created on the same physical storage node where the parent data object resides. In other embodiments, these copies may be created on a different storage node. Additionally, in some embodiments the copies created by snapshot and cloning create a physically distinct copy. In other embodiments, these copies are maintained as logical copies of the parent data object and actual physical copies are created on demand when content is modified either in the parent or the copy (e.g., using a well-known Copy-on-Write mechanism). The MTVMI infrastructure can take advantage of these various embodiments to realize powerful unique capabilities. For example, when the state of all the virtual machines in a virtual data center (e.g., this includes the state of the virtual machines' processors, memory, and disk) is maintained on the storage nodes, the MTVMI may provide a feature to create an identical but independent copy of the virtual machines in a virtual data center rapidly by executing operations on the storage node to create clones of the data objects that maintain the virtual machine states on the storage node. In combination with other steps, e.g., to create identical but independent virtual networks, the MTVMI may support the capability to rapidly clone a virtual data center configuration.

Management application 115 comprises components for managing and monitoring user access to MTVMI 100. As shown in FIG. 6, for instance, management application 115 may comprise an account management component for managing a tenant's account data, a remote console component for displaying a graphical user interface in a user's local display, a monitoring and metering component for tracking resource usage by different tenants and users, a backup component for maintaining backup copies of the data stored by storage nodes 615, an audit logs component for maintaining audit logs documenting all the actions performed by each tenant's users, a network manager component for controlling the creation and functioning of isolated virtual networks and network services within the MTVMI 100, a VM host manager component for controlling the creation and functioning of virtual machines within MTVMI 100, and a storage manager component for controlling the creation and functioning of virtual storage within the MTVMI 100 and for coordinating tenant and user access to virtual storage services.

In some embodiments, the storage manager component of the MTVMI management application is responsible for storage-related operations (e.g., backup, relocation, replication). In some embodiments, the storage manager centralizes storage knowledge within the MTVMI management application, provides unified management of basic storage operations spanning multiple or dissimilar storage products, and insulates the rest of the application from the numerous details of the actual storage implementation. The storage manager supports portability across a wide range of lower-level storage implementations and enables an administrator to deploy different Common off the Shelf (COTS) storage products on the MTVMI management application. The storage manager may optimize use of the underlying storage nodes by, for example, delegating certain storage operations to certain storage nodes based on the capacity/usage, load, and health of the storage nodes. The storage manager may also isolate a specific tenant's use of storage to a specific subset of storage nodes to meet performance, security, or availability considerations of the tenant. The storage manager also supports improved supportability and maintainability, redundant data storage for improved availability, and horizontal scalability.

In some embodiments, the storage manager uses load-balancing techniques to select for each virtual machine the storage node that is assigned to provide virtual storage to the virtual machine. In some embodiments, the storage manager further provides intelligent data placement, dynamic data replication, and/or dynamic data migration. Intelligent data placement involves strategically selecting one or more storage nodes in which to store particular data. For example, an image for a popular operating system may be placed on multiple storage nodes in order to provide for high expected demand for the operating system among virtual machines. Dynamic data replication involves creating additional copies of particular data on different nodes in order to provide better performance for accessing the data. Dynamic data migration involves moving data to a different storage node, such as to relieve a bottleneck. Typically, these mechanisms are implemented by monitoring and collecting data about the behavior of host nodes and/or storage nodes and associated workload levels, such as which objects are more used than others, and policy intelligence for making determinations based upon this input. In some embodiments, the storage nodes provide virtual network attached storage devices for use by virtual machines running within the MTVMI.

In some embodiments, the storage manager uses copy-on-write techniques that represent a child image stored at a later time for particular virtual machine as a set of changes made to a parent image stored for that virtual machine at an earlier time. In such embodiments, a dependency exists in the child image on the parent image. Where the parent image is to be moved to a different storage node, the storage manager may migrate the child image with the parent image, or it may break the dependency of the child image on the parent image by transforming the representation of the child image into a complete copy of the child image.

Figure 6A:
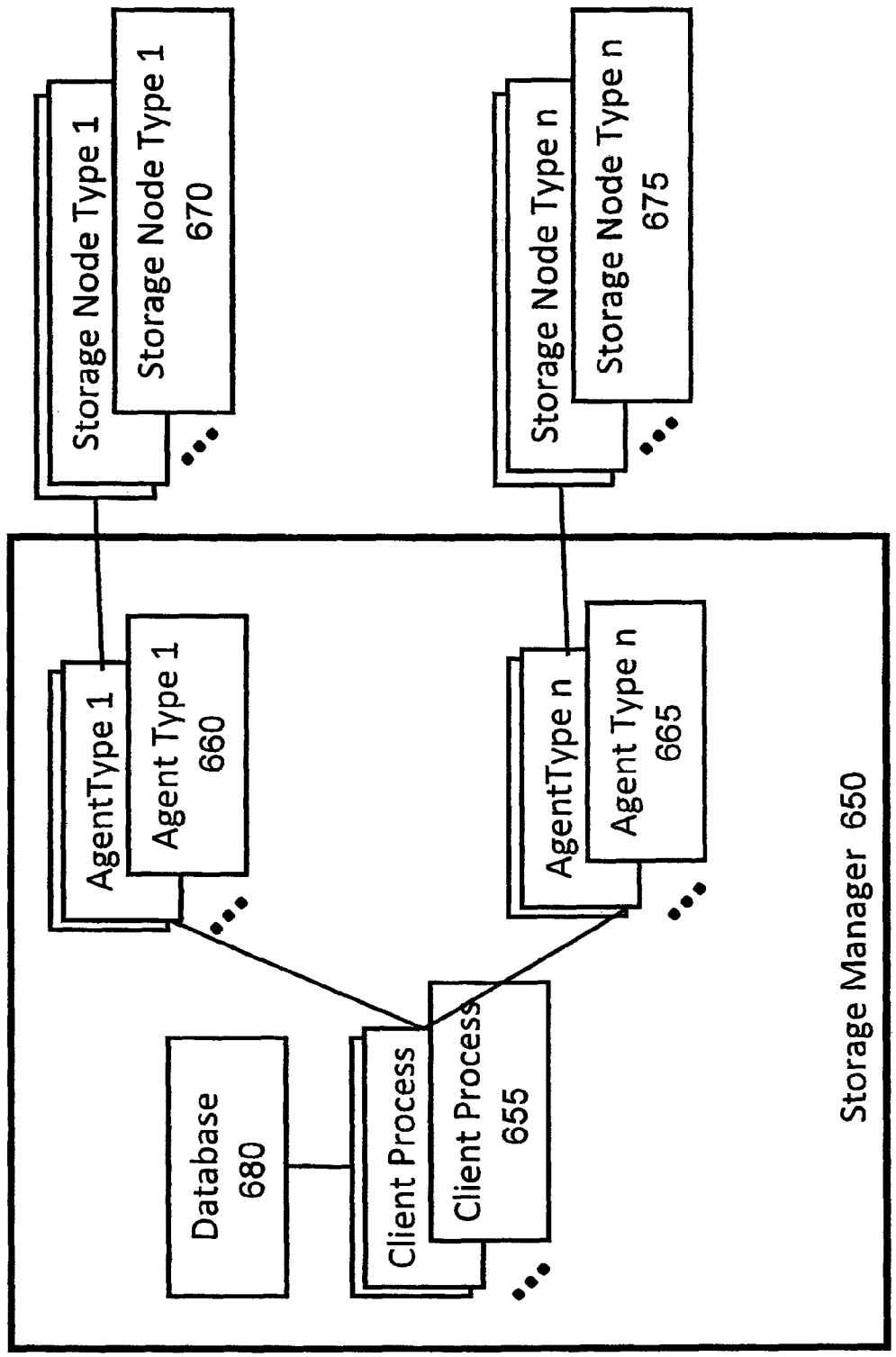
FIG. 6A is a block diagram illustrating a storage manager in some embodiments.

FIG. 6A is a block diagram illustrating a storage manager in some embodiments. Storage manager 650 is comprised of client processes 655 embedded with client libraries (not shown), agent processes 660 and 665, and a state database 680. The storage manager defines a distinct layer on top of the underlying storage nodes 670 and 675 and presents a unified view across these storage nodes.

Client processes 655 execute storage management intelligence which, among other things, determines how to allocate responsibilities to individual storage nodes. For example, the client processes determine: for particular data that is to be stored, on what storage node(s) to store it; when to move particular data from one storage node to another; when to replicate data on one storage node to another; and, in response to a retrieval request for particular data that is stored on each of multiple storage nodes, which node to retrieve the data from. In making such determinations, the client processes consider content, capacity/usage, performance, load, health, and affinity information that the storage manager collects and maintains for each of the storage nodes. In many cases, determinations made by client processes involve determining a subset of feasible nodes, then selecting a node from among the feasible nodes.

If new content must be stored that has a dependency on pre-existing content (e.g., creating a copy or snapshot of existing content), then the storage nodes that have that pre-existing content are the subset of feasible nodes. If content must be retrieved, then the subset of nodes that have that specific content is the feasible subset. In selecting one node from among the set of feasible nodes, the client processes seek to avoid nodes that are less healthy (e.g., their disks are in a degraded state) and to prefer nodes that have lower usage and load. Other choices are possible. In particular, tenants of the service can be assigned an affinity to a specific subset of nodes (and vice versa where a node is assigned affinity to a subset of tenants), such that requests on behalf of that tenant will target this subset of affinity nodes.

Logic to determine which content should be replicated or migrated and to which node is also based on the same attributes as above. The logic additionally schedules these operations during a window when there is less performance impact. In addition, system administrators can manually trigger replication/migration of specific data to specific nodes.

Client libraries embedded within client processes provide local-API access to the storage nodes, manage the overall state of the storage subsystem, act as a communication channel between the client processes and the agents, and collect performance and load data for the agents.

Agent processes 660 and 665 run on or near the storage nodes and act as an adapter that supports a common API and semantics across the different underlying storage nodes. The agent processes provide a layer to abstract the details of the specific storage nodes from the storage manager, which provides the MTVMI management application with a unified interface for interacting with any number and/or type of storage nodes. In this example, agent processes 660 provide an interface to storage nodes 670 of type "Storage Node Type 1" while agent processes 665 provide an interface to storage nodes 675 of type "Storage Node Type n."

State database 680 stores state of the storage subsystem and its various components and allows concurrent operations to proceed safely. For example, state database 680 may store state information for each file stored in storage nodes 670 and 675. When a client process performs an operation on a file, such as a write operation, the state database may "lock" the file so that other client processes do not perform inconsistent operations on the file simultaneously. In this manner, storage manager 650 may use state database 680 to serialize conflicting operations.

In some embodiments, management application 115 further includes a billing system component for monitoring a tenant's use of resources within MTVMI 100 and producing an invoice. The monitoring may occur, for example, by tracking the amount of CPU time or data storage consumed by the users associated with each tenant.

In some embodiments, management application 115 further comprises a resource integration module for facilitating inclusion of external (i.e., non-local or other third party) resources into MTVMI 100. In this way, MTVMI 100 can be used to provide potentially brokered access to computing, storage and network resources regardless of where the resources are physically located. Such access can be provided according to policies for achieving any number of tenant or user objectives, such as, e.g., cost, reliability, security, availability, and performance.

In some embodiments, management application 115 further includes a module for specifying a grid configuration of a virtual data center based on input from a tenant. A grid configuration is a specification of the topology of a set of virtual machines and related networks and storage systems. The grid configuration module could generate the grid configuration by receiving a tenant's description of an existing physical or virtual network in the form of a tenant-created file or data structure, and then modifying the description into a form usable by MTVMI 100. The grid configuration can subsequently be imaged onto MTVMI 100 for use by particular tenant or user.

Management application 115 may further comprise an access component for allowing tenants to restrict the rights of users to specific physical or virtual resources, configurations, and other software resources within MTVMI 100. For instance, when establishing an account for MTVMI 100, a tenant could specify a set of users with access to a particular software suite within MTVMI 100, and a set of users without access to the software suite. The MTVMI management application additionally could include a security component that could monitor access to a software suite based on the tenant's specification. Additionally, the security component could issue alerts or perform other actions in response to attempts at unauthorized access, etc.

In some embodiments, management application 115 further comprises a quota component allowing tenants to modify resource quotas among individual users associated with the tenant, or among all users associated with the tenant. More generally, the policy component could allow tenants to modify any aspect of the tenant's subscription agreement with MTVMI 100.

In some embodiments, management application 115 further comprises maintenance components such as patching and virus protection software for updating different the configurations of tenants' different virtual networks, backup or replication software for storing redundant copies of virtual machines, application packages, installation and testing tools and services, etc. In general, these maintenance components may operate with or without input from tenants or users, with or without oversight by the entity hosting MTVMI 100, and in a fully automated, partially-automated, or non-automated manner.

In components allowing tenant or user interactions with MTVMI 100, such interactions may take place through a variety of different interfaces, such as graphical interfaces, command line interfaces, programming interfaces, and so on.

Management application 115 may further include custom monitoring and management components created by tenants or users. To implement these custom features, a user could create scripts or application programs using a scripting program or an application programming interface (API) compatible with MTVMI 100. To facilitate the creation of such programs, management application 115 may additionally include a software development platform for MTVMI 100. By allowing tenants and users to create custom software components, MTVMI 100 may provide flexibility and unique capabilities useful to a variety of users having a variety of needs.

In addition to the above-described components and features, management application 115 may further comprise software applications for providing specific virtualization-based services to tenants and users within MTVMI 100. Examples of such services will be described below with reference to FIGS. 7 and 8. A more specific example of the service of FIG. 8 will then be described with reference to FIGS. 9-22.

Several data structures and computing structures used to implement capabilities of the MTVMI management application, in some embodiments, are described in further detail below with reference to FIGS. 50-53.

In various embodiments, the MTVMI and the portal together support a variety of uses, including application development and testing; online education; pre-sales software demonstration; consulting platform; and IP prototyping and operations.

Figure 7:
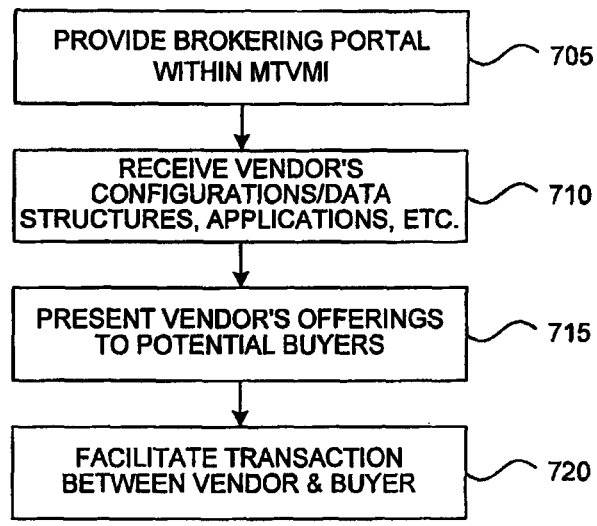
FIG. 7 is a flowchart illustrating the provision of a software brokering service by an MTVMI in some embodiments.

FIG. 7, which illustrates the provision of a brokering service by MTVMI 100 in some embodiments, is described in further detail below.

Figure 8:
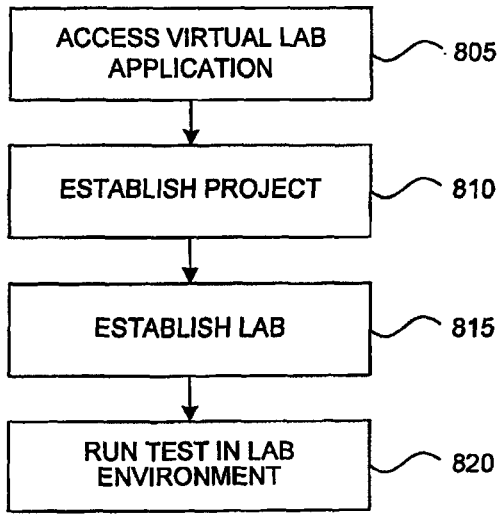
FIG. 8 is a flowchart illustrating the provision of a virtual lab service by an MTVMI in some embodiments.

FIG. 8 is a flowchart illustrating the provision of a virtual lab service by an MTVMI in some embodiments. In the example of FIG. 8, the user creates a virtual lab and executes a software test using the virtual lab. A virtual lab is a set of virtual computing resources that can be configured and re-configured frequently in the process of prototyping, demonstrating, validating, or offering training on one or more computing tasks. As an example, a virtual lab may comprise a set of virtual machines and related software configured to stream video to a number of diverse client machines. This virtual lab may be particularly useful for validating that the streamed media is rendered accurately on client machines that differ in their operating system or application software. Other example steps that could be performed within a virtual lab application will be apparent from the description presented below in relation to FIGS. 9-22.

Referring to FIG. 8, in step 805, a user accesses a virtual lab application within MTVMI 100. The virtual lab application may generate a graphical user interface on the user's display, such as the interface illustrated in FIGS. 9-22. Upon accessing the virtual lab application, in step 810, the user creates or accesses one or more projects. A project is a data organization folder that is assigned a set of resources or objects in MTVMI (e.g., virtual data center configurations) and a set of users that can access the resources assigned to the project. In some embodiments, resource usage is separately measured and quota compliance is separately enforced for each project. By specifying both users and resources, the project allows specific virtual data center instances to be developed through a collaborative process among the users. Example projects will be described in further detail below with reference to FIGS. 9-10. In some embodiments, a tenant's administrative user can specify resource permissions at a variety of different levels of scope, including private scope in which permissions are established for a single user, or tenant-wide scope in which permissions are established for all users for a particular tenant. Resource permissions can also be specified at all-tenant scope, in which permissions are established for users of all tenants. Such permissions may relate to items from the software library, the labs, or asset lists established by or for tenants.

After establishing the project, in step 815, the user creates a lab by selecting and configuring particular resources within the project. As an example, the user may select a set of virtual machines from the project to create a virtual data center or virtual lab and install software applications to be run on the virtual machines. Example labs will be described in further detail below with reference to FIGS. 9 and 11-12. Multiple virtual data centers, identical or otherwise, can be created by different users.

Once the project and lab have been created, in step 820, the user runs the lab to perform a particular computational task—in this case, a software test. An example of a software test performed in a virtual lab will be presented below with reference to FIGS. 9-22. Multiple users can concurrently perform the software test on a virtual data center that they all have access to or they can perform the software test concurrently on independent virtual data centers. At the end of the tests, users can snapshot the entire state of the virtual data center, if needed, to save the outcome of the tests on the virtual data center. In some embodiments, this snapshot copy of the virtual data center can be assigned to the same project, allowing other users in the project to instantiate and examine the virtual data center to analyze the results of the testing.

FIGS. 9-22 are display diagrams showing a user interface presented by an example software application running on a MTVMI to provide a virtual lab service in some embodiments. The virtual lab service is available on-demand over the Internet and allows users to rapidly build and configure software test environments using a pre-built library of virtual machine images. The virtual lab service further allows users to create virtual infrastructure such as virtual processing, networking, and storage facilities on demand using a browser. Finally, the virtual lab service allows users to share data and collaborate with other users who are also connected to the virtual lab environment via the Internet.

The operation of the virtual lab service will be explained below using a concrete example involving an engineer who uses a MTVMI to test an e-commerce website on behalf of a tenant having users located in different parts of the world. The engineer may share components of the virtual lab with the other users associated with the tenant.

Figure 9:
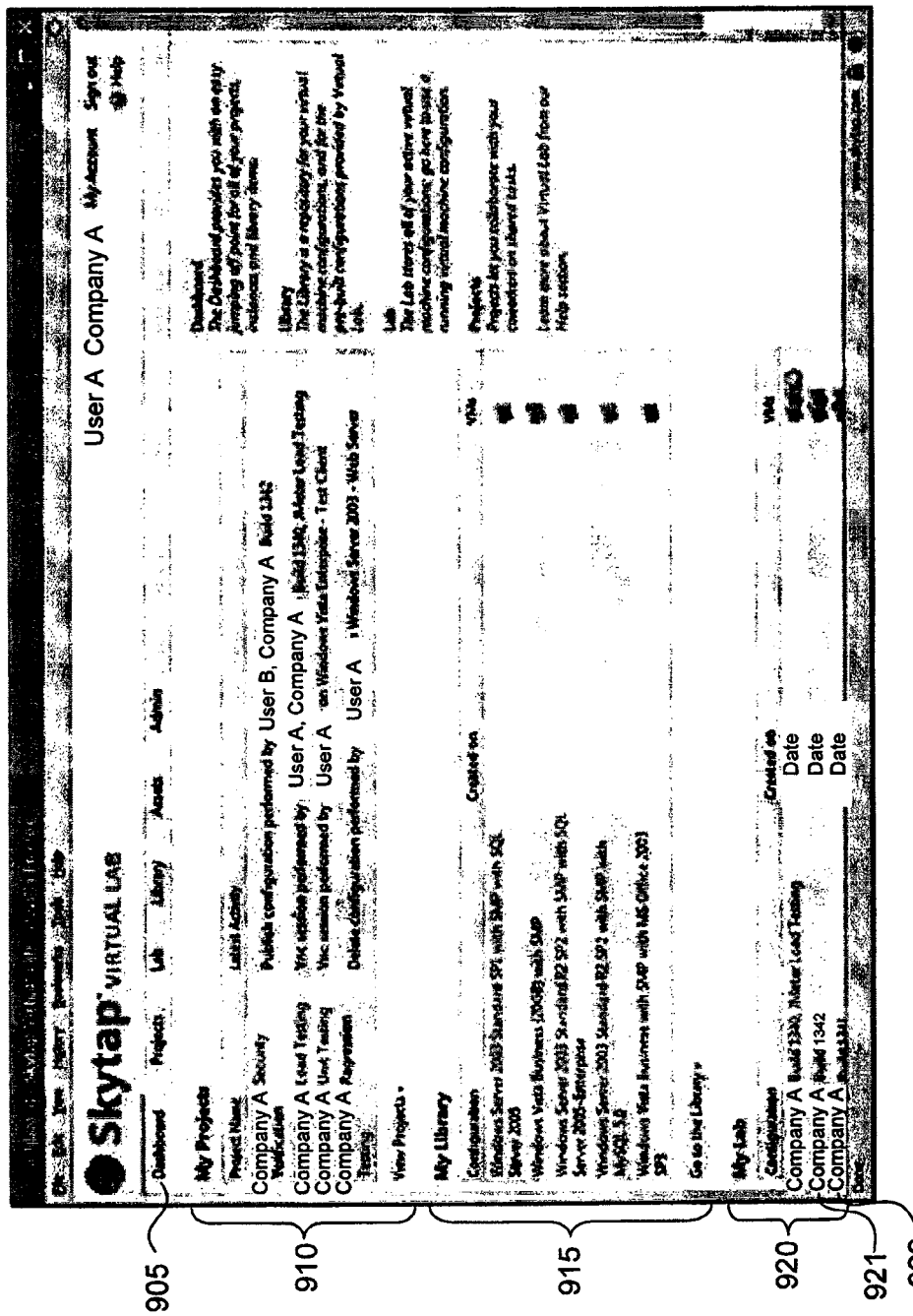

FIG. 9 illustrates a screen that appears after the engineer logs on, through a secure connection, to a MTVMI hosting the virtual lab service. In this regard, the screen of FIG. 9 corresponds to an entry point for the virtual lab service. As seen in FIG. 9, the screen includes a tab labeled as dashboard 905.

Dashboard 905 includes information related to current projects and recently used items within the engineer's scope of user privileges. In particular, dashboard 905 includes a set of projects 910, virtual data center configurations in software library 915, and virtual data center configuration instances in lab 920 associated with the engineer. The projects 910, software library 915, and lab 920 of FIG. 9 may be created within the illustrated application, or they may have been created previously.

In the current example, we will assume that the engineer will deploy a virtual data center configuration instance that was previously created. To do this, the engineer may simply select the virtual data center configuration from the list 920 shown under the heading "My Lab". As an example, to select the lab illustrated in FIG. 11, the engineer may select a virtual data center configuration 921 entitled "Company A—Build 1340". Similarly, to select the virtual data center configuration illustrated in FIG. 12, the engineer may select a virtual data center configuration 922 entitled "Company A—Build 1341". By selecting one of these configurations, the user can bring up the screen shown in FIG. 11 or FIG. 12, which will be described in further detail below.

In testing the e-commerce site, the engineer verifies the site's scalability and performance on virtual machines defined in the selected lab. A realistic test of a e-commerce site typically requires a large number of machines. However, the test generally only requires the use of the machines for a short period of time, say, a few days or weeks at most. Accordingly, by performing the test in this virtual lab, the engineer avoids the need to requisition actual hardware and the corresponding large expense, as would generally be required to test the site in a non-virtual environment.

In addition to eliminating the need to requisition physical hardware, the virtual lab service also enables the engineer to quickly configure and launch a test environment. In contrast, tests using actual machines often require hours of setup time for connecting machines, installing software, booting up the machines, and so on. In selected embodiments of the virtual lab service, virtual machines can be requisitioned and launched without requesting use of the virtual machines in advance. This is typically possible in a MTVMI where the amount of available computing power is large in relation to the instantaneous user demand.

Figure 10:
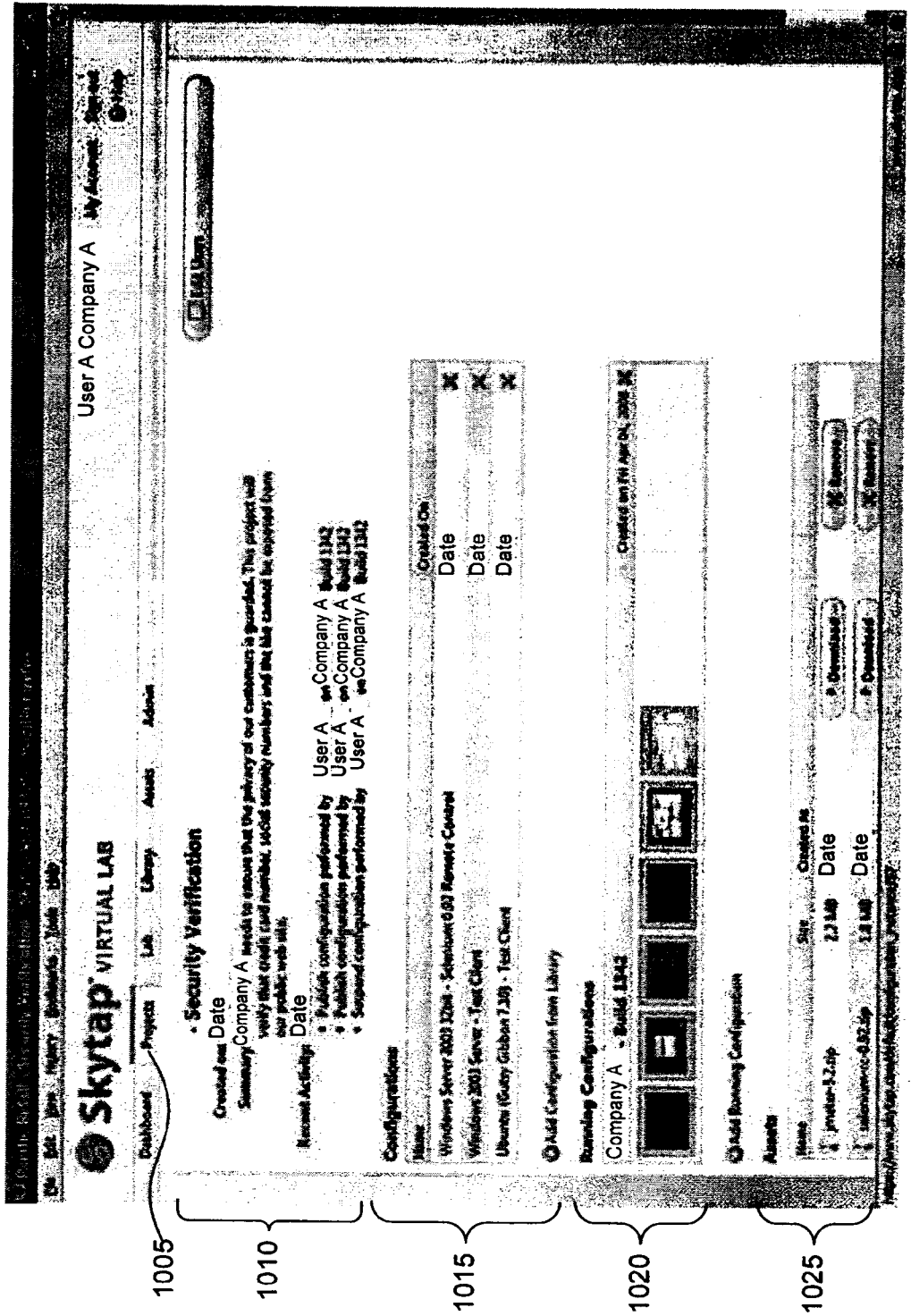

FIG. 10 shows a projects tab 1005 within the virtual lab service. Projects tab 1005 provides information 1010 regarding a particular project ("Security Verification") accessible to the engineer, virtual machine configurations 1015 available within the project, running configurations 1020 within the project, and software assets 1025 associated with the project. Each of these features will be described in additional detail below with reference to the remaining figures.

Figure 11:
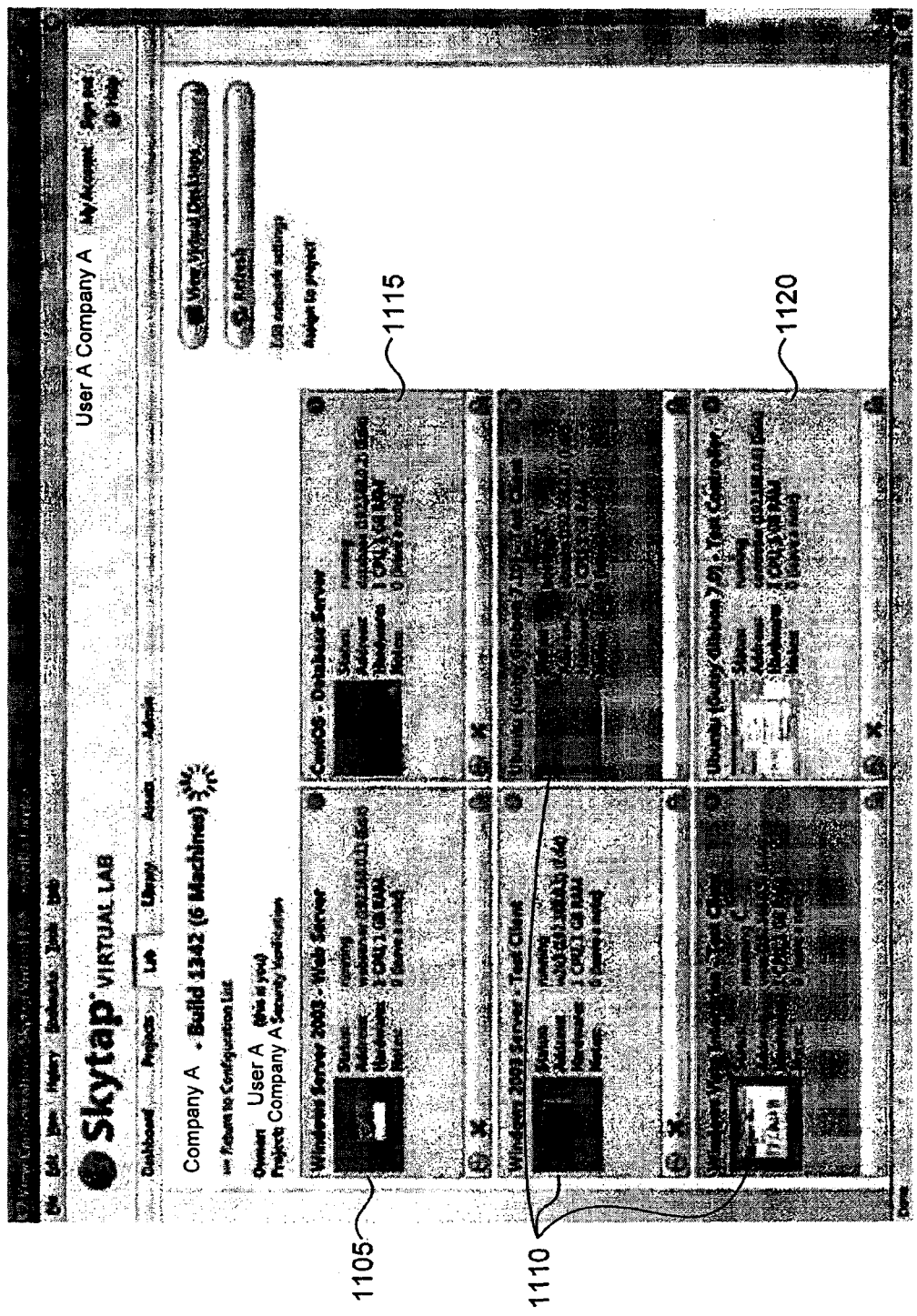
Figure 12:
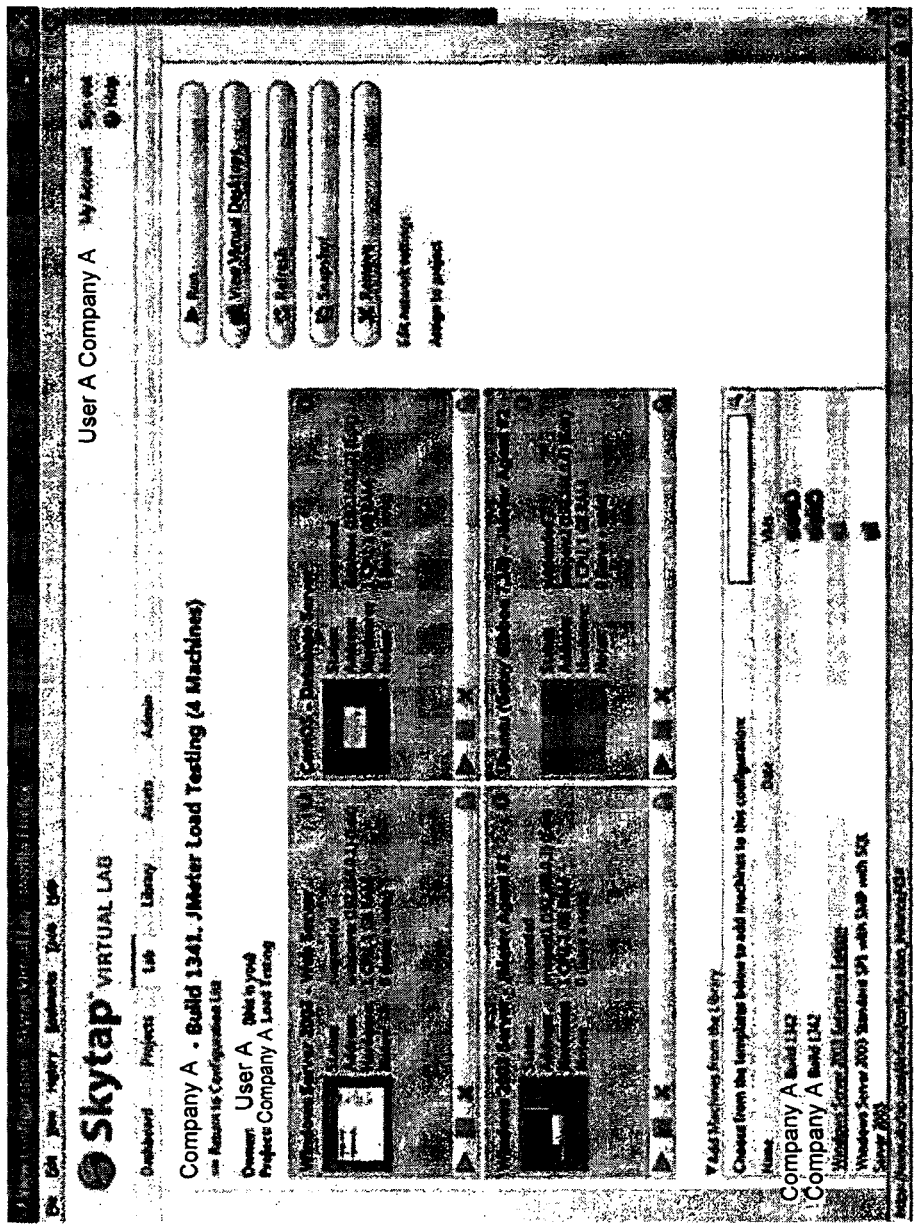

FIGS. 11 and 12 illustrate different virtual data centers available to the engineer. As seen in the figures, these virtual data centers each include a number of virtual machines. Each virtual machine is visually represented by a thumbnail image of the console display currently being generated by the virtual machine. For illustration purposes, each of the virtual machines has been configured with a unique combination of computing characteristics, operating system, and status. For instance, in FIG. 11, a web server 1105 is implemented by a virtual machine having a 1 GHz CPU, 1 GB of RAM, and running the Microsoft Windows operating system. Within a virtual network, web server 1105 has a network address "192.168.0.1" and a status "running". Other virtual machines have different configurations, including different operating systems, different statuses, and so forth. Once machines are up and running in the illustration of FIGS. 11 and 12, the engineer can click on a thumbnail image of any one of the virtual machines to interact with the machine through the engineer's local interface.

In the examples of FIGS. 11 and 12, the status of each virtual machine (e.g., running, booting, resuming) can be indicated by both a textual indicator and a background color around the corresponding virtual machine icon. The virtual lab service may allow users to modify virtual network settings such as domains, subnet attributes and IP addresses of virtual machines within a particular lab.

In some embodiments, the virtual lab service enables the user to generate a snapshot of one or more running virtual machines, such as a single virtual machine, all of the virtual machines in a virtual network, or all of the machines in a configuration. For example, the user may select a visual control associated with the machine, network, or configuration in order to generate a snapshot. When a snapshot is generated, complete state for each of the virtual machines is stored in the library. After the snapshot is generated, this item may be selected from the library in order to instantiate any number of new instances of the set of virtual machines that were the subject of the snapshot. This is useful, for example, to establish a large number of initially identical instances of a particular configuration. Also, in a testing project, it can be useful for a tester who has just produced an error in a configuration being tested to establish a snapshot of the configuration that can be reviewed later by a developer to determine the conditions under which the error occurred.

In some embodiments, the virtual lab service allows the user to generate for a particular virtual machine a URL that can be used, in the absence of any other identifying information, to access the console display for that virtual machine. This URL can be distributed to users that are not authorized under the tenant's account to provide access to this particular virtual machine to those users. Such access may permit only observing the console display of the virtual machine, or it may permit user interface interactions with the virtual machine. In some embodiments, the user can click on a CD icon displayed by the MTVMI in connection with a virtual machine (not shown) in order to insert a software installation file such as an ISO file from the assets list into the virtual machine allowing the user to install additional software on the virtual machine.

Figure 13:
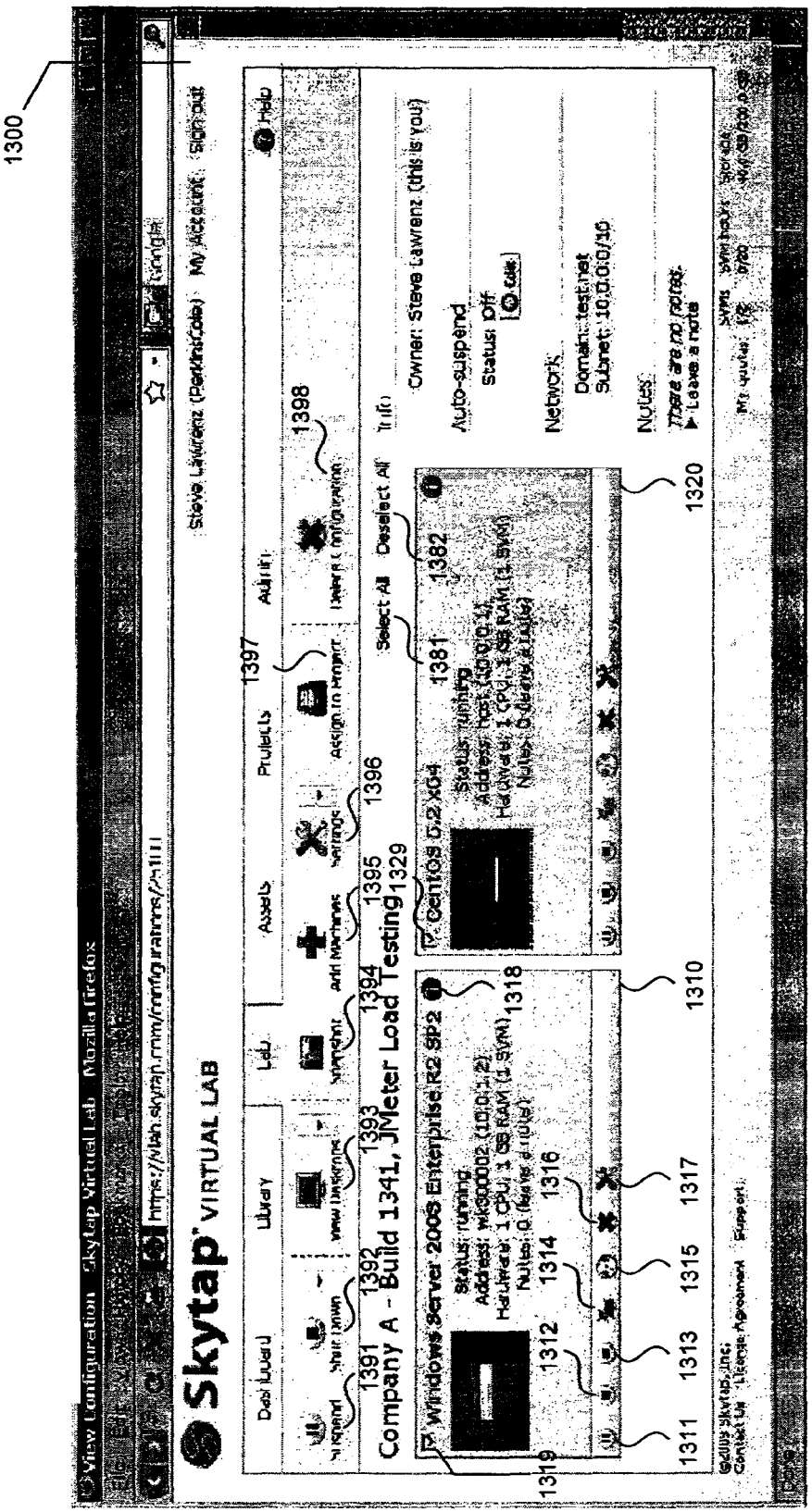

FIG. 13 is a display diagram showing a sample display typically presented by the infrastructure in order to permit a user to control the operation of virtual machines. The display 1300 shows information 1310 and 1320 for two virtual machines. The information 1310 for the first virtual machine includes information describing the virtual machine, as well as the following controls: a run/suspend control 1311 for beginning or suspending execution of the virtual machine; a shut down control 1312 for invoking an operating system function on the virtual machine designed to turn the computer system running the operating system off; a power off control 1313 for immediately disconnecting power to the virtual machine; a Remote Display Protocol (RDP) for accessing a machine's console display over the network from a remote location; a connection control 1314 for establishing an RDP connection with the virtual machine; an ISO control 1315 for loading a software installation ISO file from the software assets list as a CD-ROM into the virtual machine; a delete control 1316 for deleting the virtual machine; and a settings control 1317 for editing network and hardware attributes of the virtual machine. Each of controls 1311-1317 operate specifically with regard to the virtual machine identified by virtual machine information 1310. The display also includes controls 1391-1394 which, when operated by the user, operate with respect to every virtual machine whose check box (e.g., check boxes 1319 and 1329) is checked. The display also includes controls 1381 and 1382 for respectively selecting all of the virtual machines and deselecting all of the virtual machines.

Figure 14:
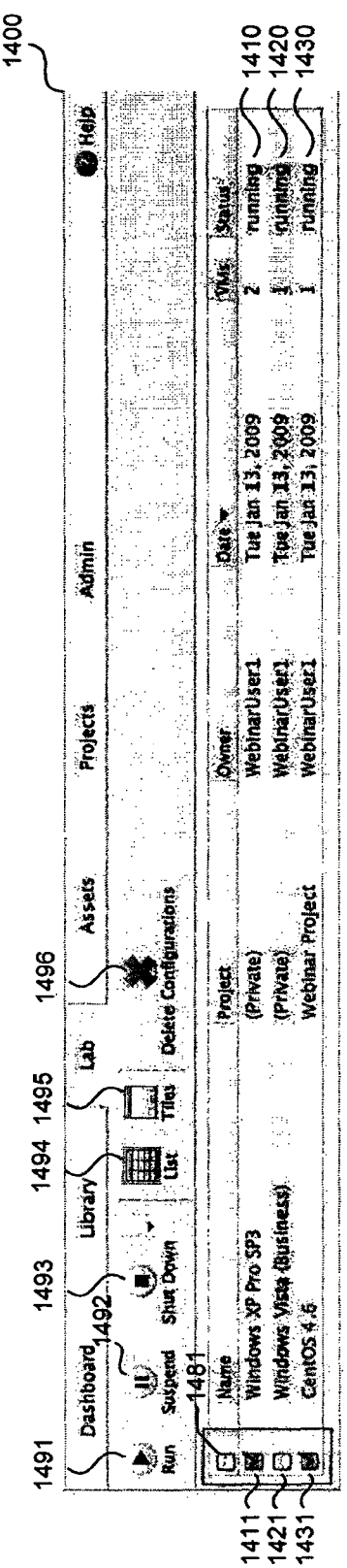

FIG. 14 is a display diagram showing a sample display typically presented by the infrastructure to display information about and allow interaction with virtual data center configurations available to a user in their Lab. The display 1400 includes entries 1410, 1420, and 1430 each corresponding to a different virtual data center configuration that is accessible to the user. In a manner similar to that discussed above in connection with FIG. 13, these entries contain check boxes 1411, 1421, and 1431, respectively. Each of these can be checked so that controls 1491, 1492, 1493, and 1496 operate with respect to the corresponding virtual machine. The display also includes controls 1494 and 1495 for switching between a list view of configurations and a tiles view of configurations, respectively.

Figure 15:
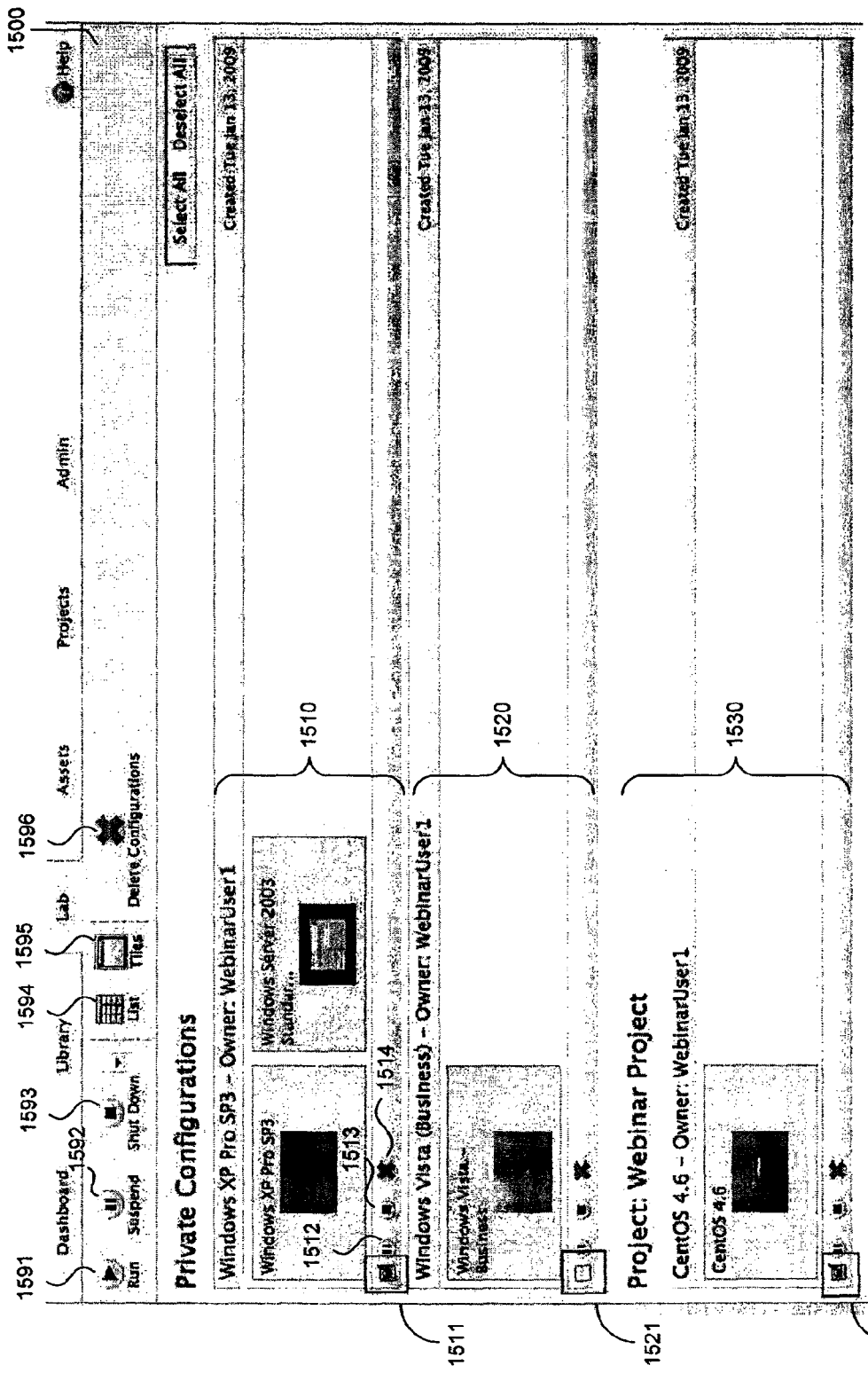

FIG. 15 is a display diagram showing a sample display typically presented by the infrastructure to display information about and permit manipulation of virtual data center configurations in a tiles view. The display 1500 includes sections 1510, 1520, and 1530, each containing information about a different virtual data center configuration. For example, information 1510 about the first virtual data center configuration shows two virtual machines, and includes controls 1512, 1513, and 1514 whose operation affects each of the virtual machines in the first configuration. Information 1510 further includes a check box, like check boxes 1521 and 1531 for other machine configurations, that determines whether controls 1591, 1592, 1593, and 1596 apply to the configuration.

Figure 16:
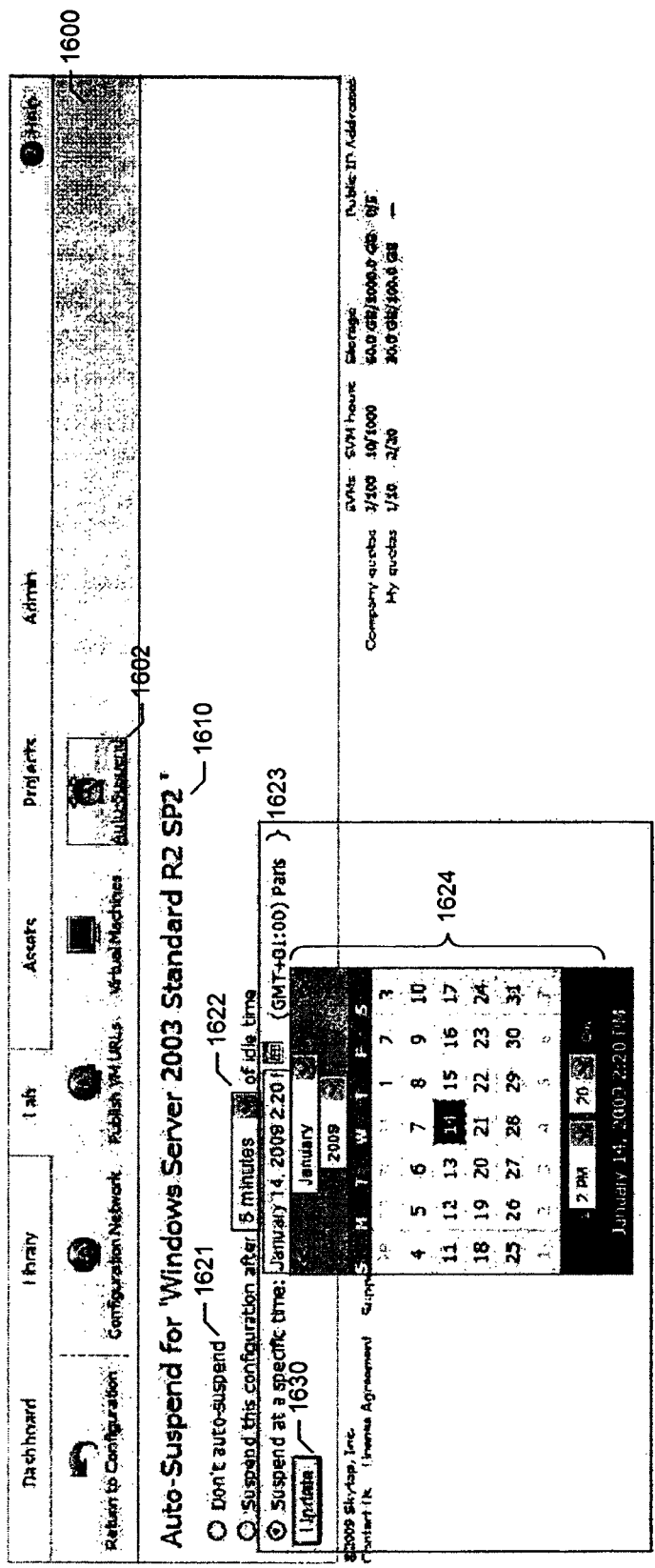

FIG. 16 is a display diagram showing a sample display that is typically presented by the infrastructure in order to permit the user to specify automatic suspension of the virtual machines for a machine configuration. The display 1600 may be reached by selecting an auto-suspend control 1602. The display includes information 1610 identifying the machine configuration. The infrastructure permits selection between the following options for suspending this machine configuration: an option 1621 not to automatically suspend this machine configuration; an option 1622 for suspending the machine configuration after all of the virtual machines in the configuration have been idle for at least a user-specified amount of time; and an option 1623 to suspend the virtual machines of the machine configuration at a user-specified time and date. The display also includes an update control 1630 for updating the auto suspension settings for this machine configuration.

Figure 17:
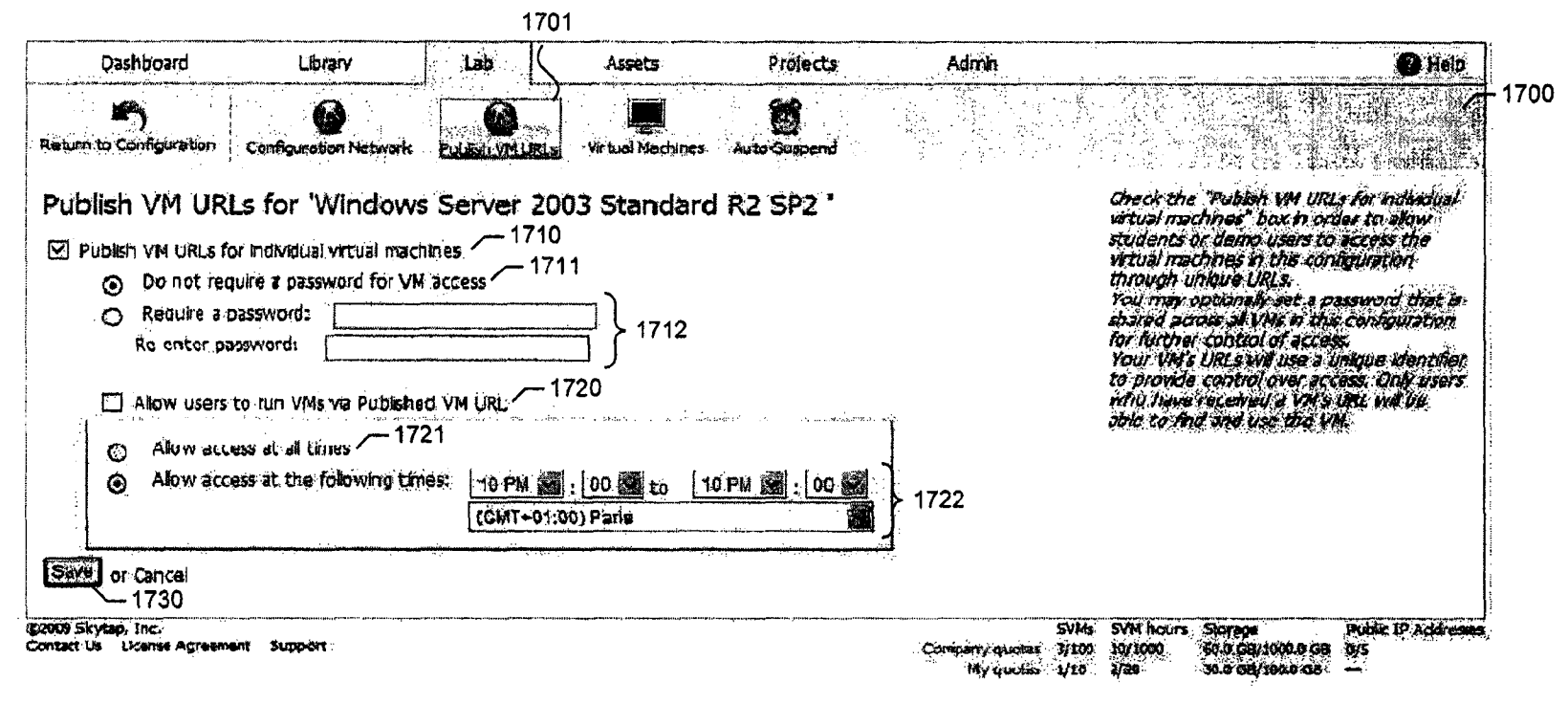

FIG. 17 is a display diagram showing a sample display typically presented by the infrastructure in order to publish VM URLs for accessing virtual machines of a machine configuration. The display 1700 can be reached by selecting a Publish VM URLs control 1701. The display enables the user to determine with option 1710 whether URLs are generated and activated for accessing the consoles of the virtual machines of the current machine configuration. Where option 1710 is selected, the user can elect between option 1711 in which passwords are not required in order to access a virtual machine using its URL and 1712 where a user-specified password is required to access each virtual machine in the machine configuration. Also, where the user selects option 1710, the user can determine whether to select option 1720 for allowing users who access a virtual machine in the machine configuration using its published URL to control the virtual machine as contrasted with merely viewing its console output. Also, where the user selects option 1710, the user may elect between option 1721 to allow those in possession of a virtual machine's URL to access it at all times, and option 1722 to allow access only during a user-specified time-of-day range. The display 1700 also includes a save control 1730 to update these attributes of the current machine configuration.

Figure 18:
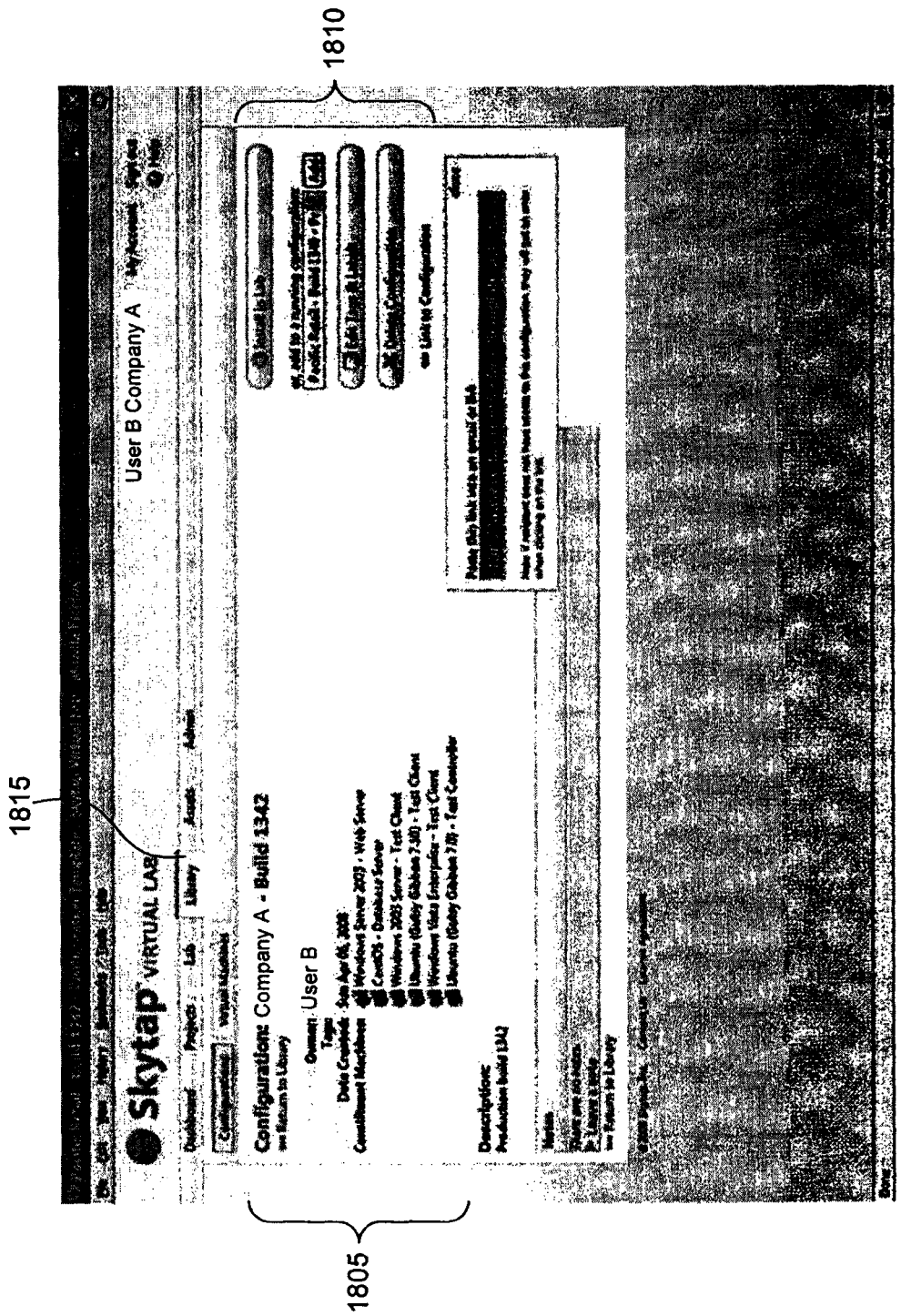
Figure 19:
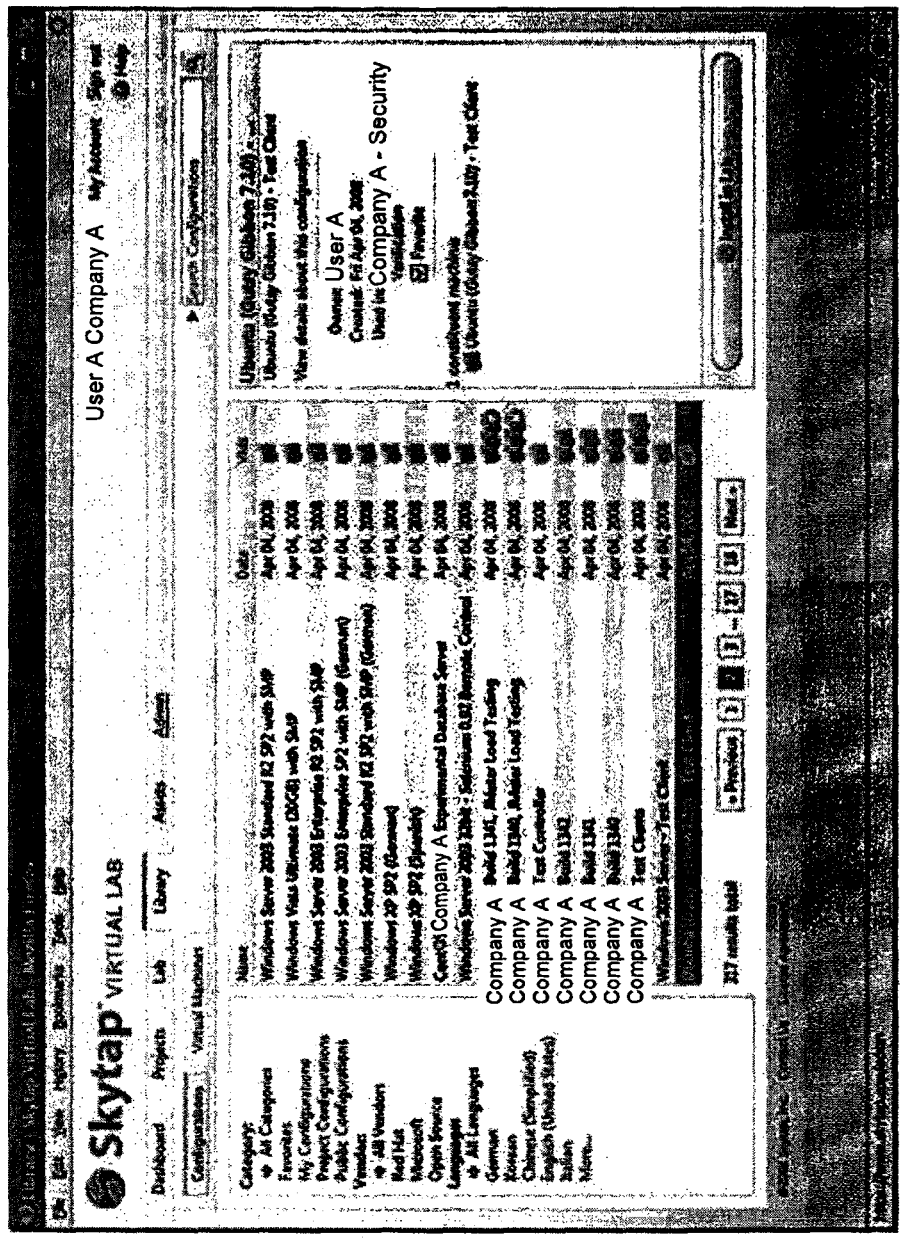
Figure 20:
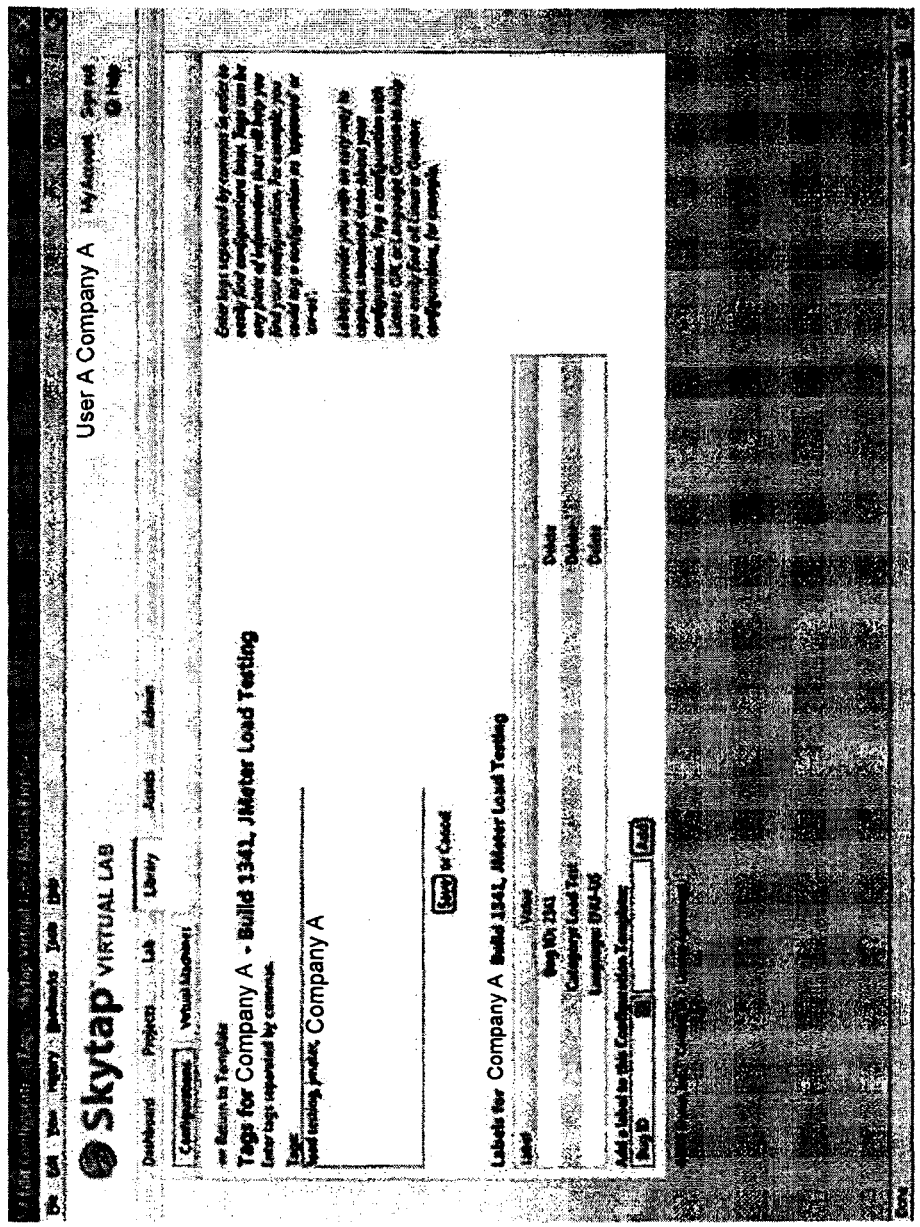

FIGS. 18 through 20 illustrate a library of virtual data center configurations available to the engineer within the virtual lab service. The library includes configurations that have virtual machine images preinstalled with common operating systems, databases and applications. By creating a lab from pre-installed images, the user can save hours of manual installation tasks.

Configurations 1805 shown in FIG. 18 have all been installed in the lab of FIG. 11. These and other configurations such as those illustrated in FIG. 19 can be installed in labs or added to currently running configurations by actuating buttons within the interfaces shown in FIGS. 18 and 19. Although the engineer may create labs from predefined configurations, the engineer could alternatively assemble and configure new virtual data center configurations from scratch by specifying a new combination of virtual hardware, operating system, and so on. The engineer could then add the new configuration to an existing lab or create a new lab through the virtual lab service. In general, any new configurations created by a user be associated with that user or shared among other users within the MTVMI.

Where a single user or tenant runs multiple virtual data center instances with identical virtual networks (e.g., multiple configurations with same network subnet address, same IP addresses for virtual machines) within the virtual lab service, the different instances are generally fenced off from each other. Fencing is typically accomplished by using a virtual private network to establish a separate virtual LAN for each network instance. In some embodiments, the virtual machines in each of the instances of the network are assigned the same set of IP addresses. Accordingly, to provide independent access to the Internet for the virtual machines of each of the instances of the network, the network nodes and/or the firewall proxy requests from these virtual machines to the Internet, enabling the proxy to route the reply from the Internet to the correct one of the virtual machines having the source IP address associated with the original request. In various embodiments, this proxying is performed in a variety of ways, such as mapping each virtual machine instance to a different public IP address, URL, or combination or URL and port number.

Returning to FIG. 11, to test the e-commerce web site, the engineer runs the web site on the virtual machine designated as web server 1105. While running the web-site, web server 1105 stores and retrieves data from a virtual, machine designated as a database server 1115. Three virtual machines having a variety of configurations are designated as test clients 1110 for generating traffic for the web-site. Finally, a virtual machine designated as a test controller 1120 controls test clients 1110 to perform the test.

Figure 21:
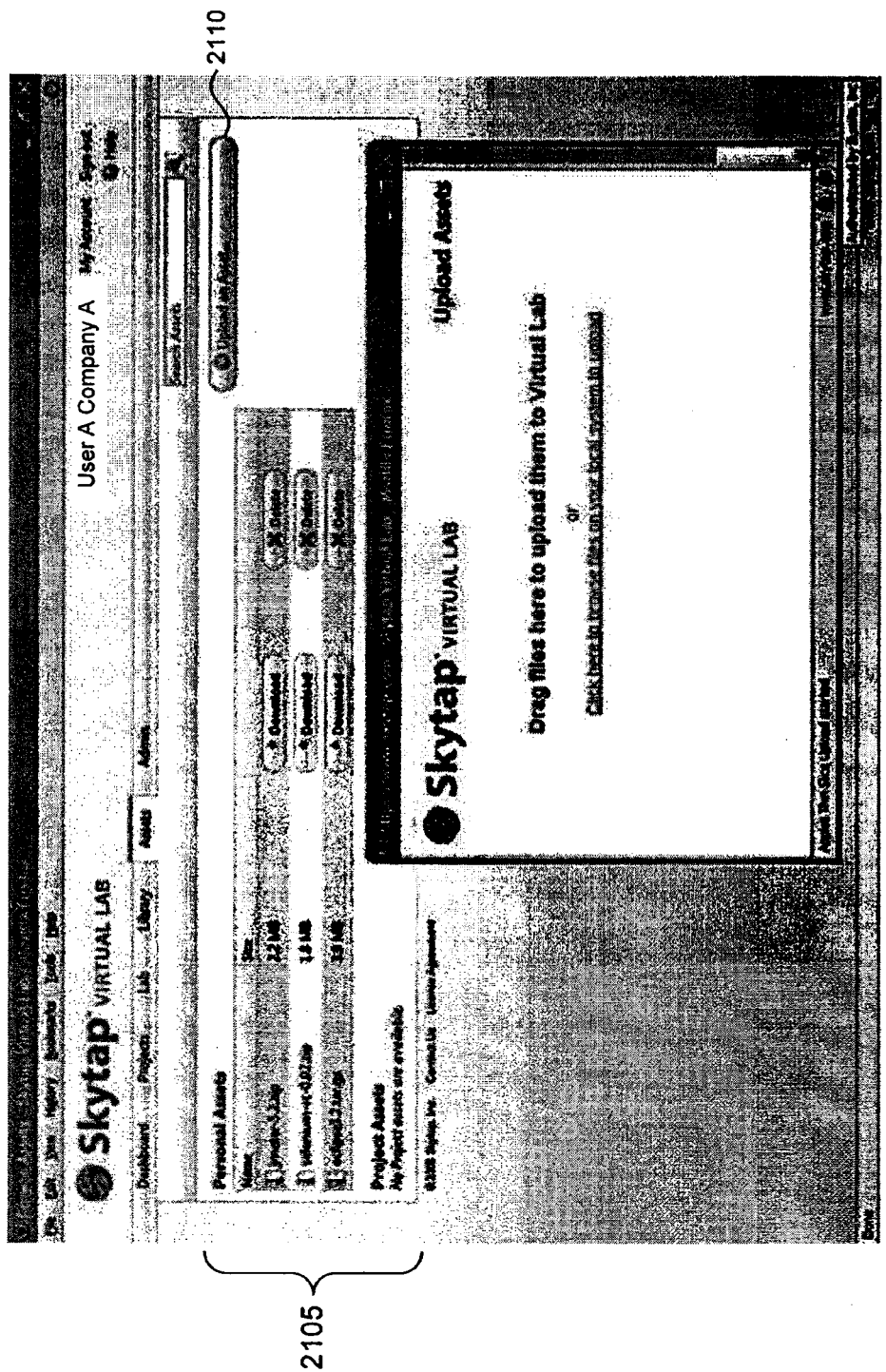

FIG. 21 illustrates software assets 2105 (an asset can be, for example, any file containing text, data, software program, etc.) that have been uploaded by the engineer to the virtual lab service. Using control 2110, the engineer can upload software assets from any machine (e.g., their laptop or other networked machine that they have access to including virtual machines running in the MTVMI) into an asset library in the virtual lab service. Once the assets have been uploaded to a library within the virtual lab service, the assets can be added to projects, as illustrated, e.g., by the information under the "assets" label in FIG. 10. By adding the assets to a project, the assets become available to other users assigned to the project. This allows the engineer to share the assets with other users. Additionally, web browsers and other tools executing on any machine (running within the MTVMI or elsewhere) may be used to "Download" software assets from the MTVMI asset library to the machine over the Internet. To perform this operation, the engineer can actuate the "Download" button from within their browser or another tool.

Figure 22:
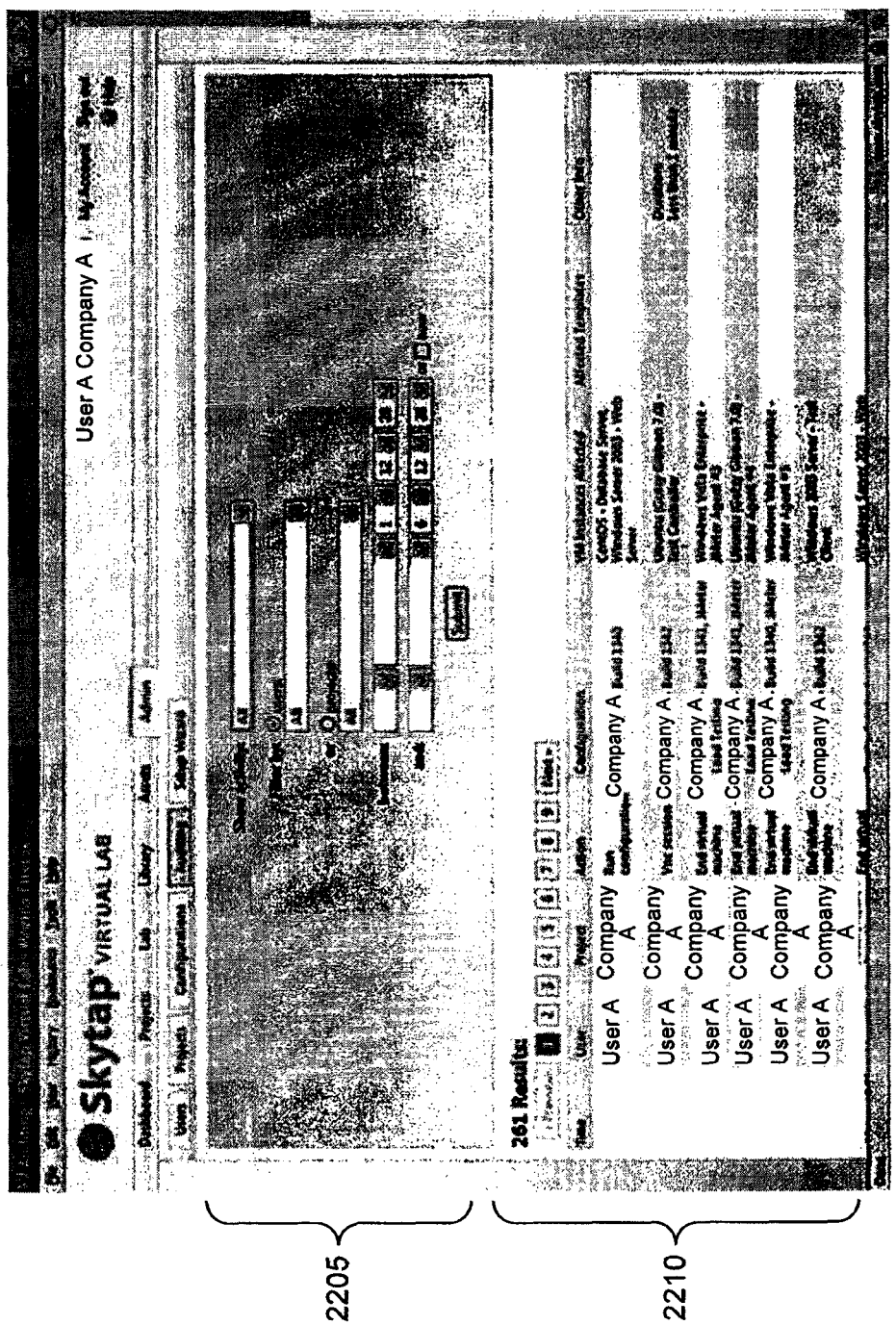

FIG. 22 shows an aspect of the virtual lab application that allows an administrator to monitor use of the virtual lab service. To monitor specific types of usage, the administrator may select various parameters from drop down menus in an area 2205. For instance, the administrator may select a certain type of activity to monitor, such as running a virtual machine, stopping a virtual machine, etc. Alternatively, the administrator may choose to monitor activity of certain users, activity around certain dates, and so on. Activity that falls within the parameters specified in area 2205 is displayed in an area 2210.

Figure 23:
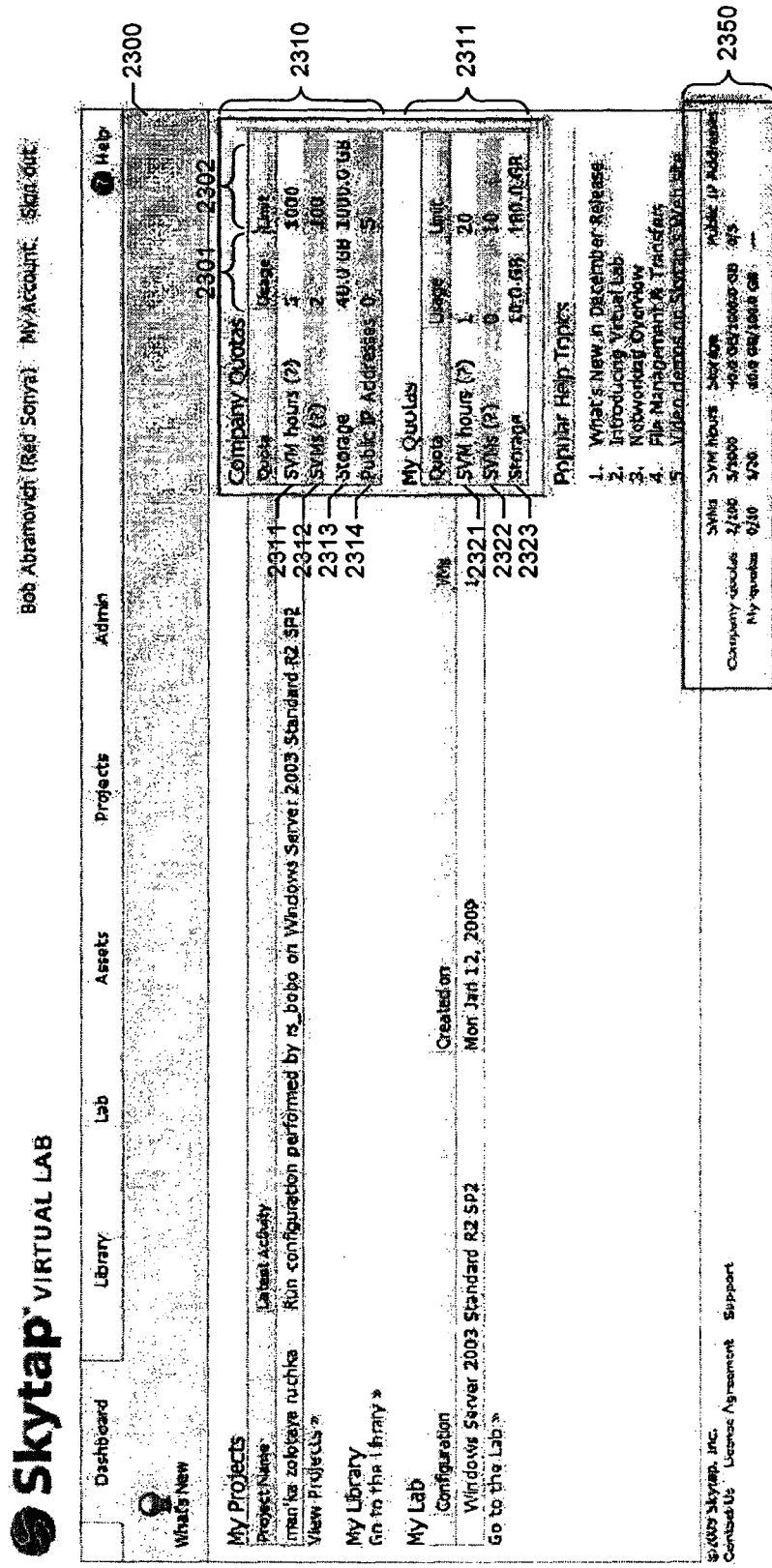

FIG. 23 is a display diagram showing a sample display typically presented by the infrastructure to show the consumption of resources relative to quotas across an entire customer as well as by an individual user. The display 2300 includes a section 2310 about consumption relative to quotas for the customer, and section 2320 for consumption versus quotas for the current user. The rows in each section are divided into two columns: usage column 2301 that shows the amount that has been used by the entity and limit column 2302 that shows the quota to which consumption is limited for the entity. The customer section 2310 includes row 2311 for number of hours that virtual machines execute; row 2312 for the number of virtual machines allocated; row 2313 for the volume of persistent storage allocated; and row 2314 for the number of public IP addresses allocated. Section 2320 for the individual user includes corresponding rows 2321-2323, showing the user's consumption and the user's limit as contrasted with the customer's total usage and limit. The display also includes a more concise version 2350 of this information that is suitable to be displayed on a variety of pages containing a variety of other information.

Figure 24:
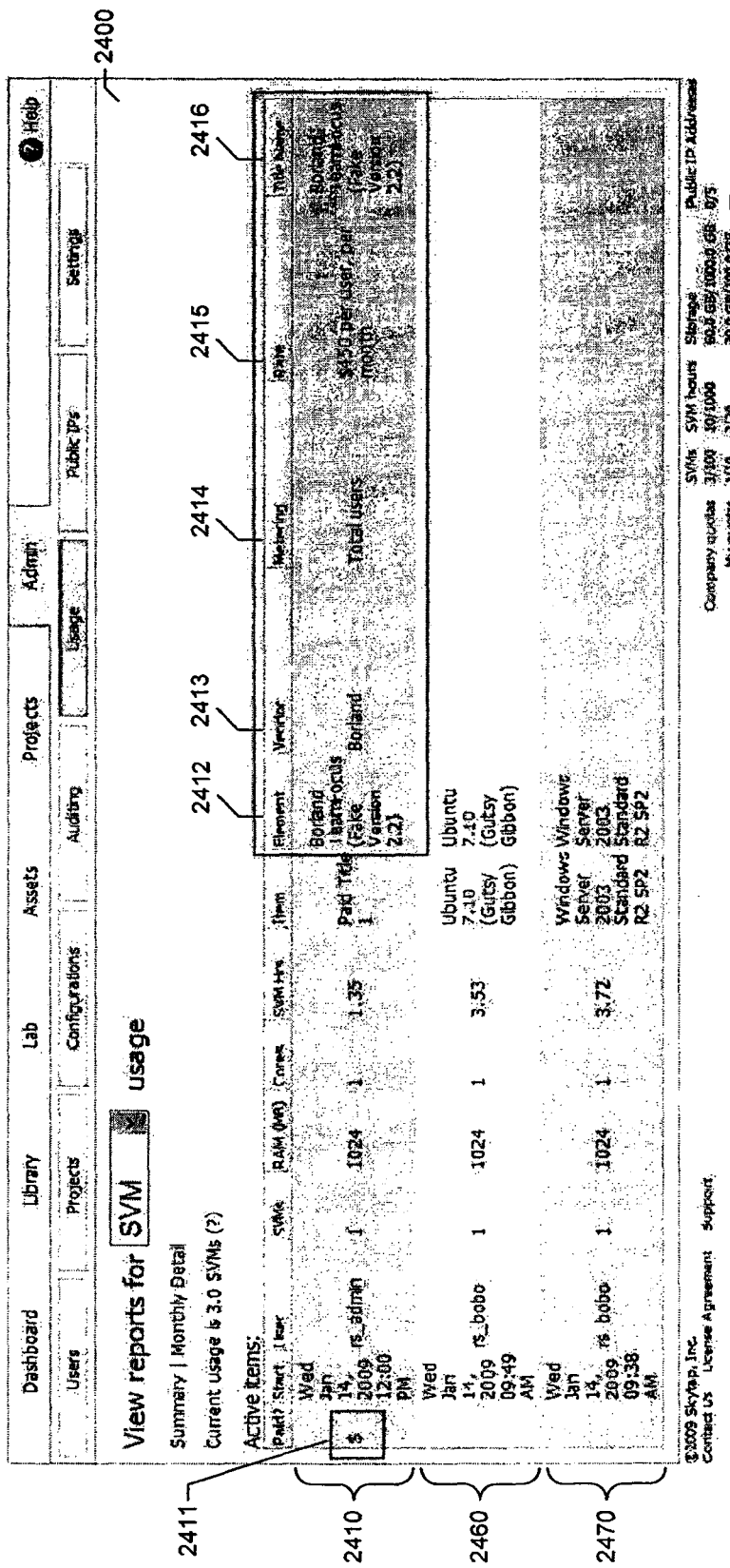

FIG. 24 is a display diagram showing a display typically presented by the infrastructure to report on usage of resources including paid resources made accessible via the brokering service, described in further detail below with reference to FIGS. 7 and 47-49. In a list of resources 2410, 2460, and 2470, a paid item icon 2411 indicates usage of a resource 2410 that incurs additional billable charges for the user. The entry includes information about the billable item including information 2412 and 2416 identifying the item, information 2413 identifying the vendor, information 2414 indicating the basis for which the item is metered for payment, and information 2415 indicating the cost of consuming the item. Usage entries 2460 and 2470 in the list report usage of resources that are accounted against the customer and user's resource consumption quota. Each entry includes information about the time of resource consumption, the user that incurred the resource consumption, the amount of various resources consumed and the items (e.g., virtual data center configuration) whose usage resulted in the resource consumption.

In some embodiments, a tenant may specify specific levels of service to be provided by the MTVMI. For example, the tenant may specify that its labs run in a dedicated virtual machine host node, and/or access a dedicated storage node; specify that physical processor utilization be no greater than a level such as 75% on the virtual machine host nodes on which its labs execute; or specify a maximum level of resources of one or more types that the tenant can consume in a particular period of time. In some embodiments, where quotas are specified for a tenant, either by the tenant or the operator of the MTVMI, the MTVMI displays usage relative to the quota to one or more of the users for the tenant.

Figure 25:
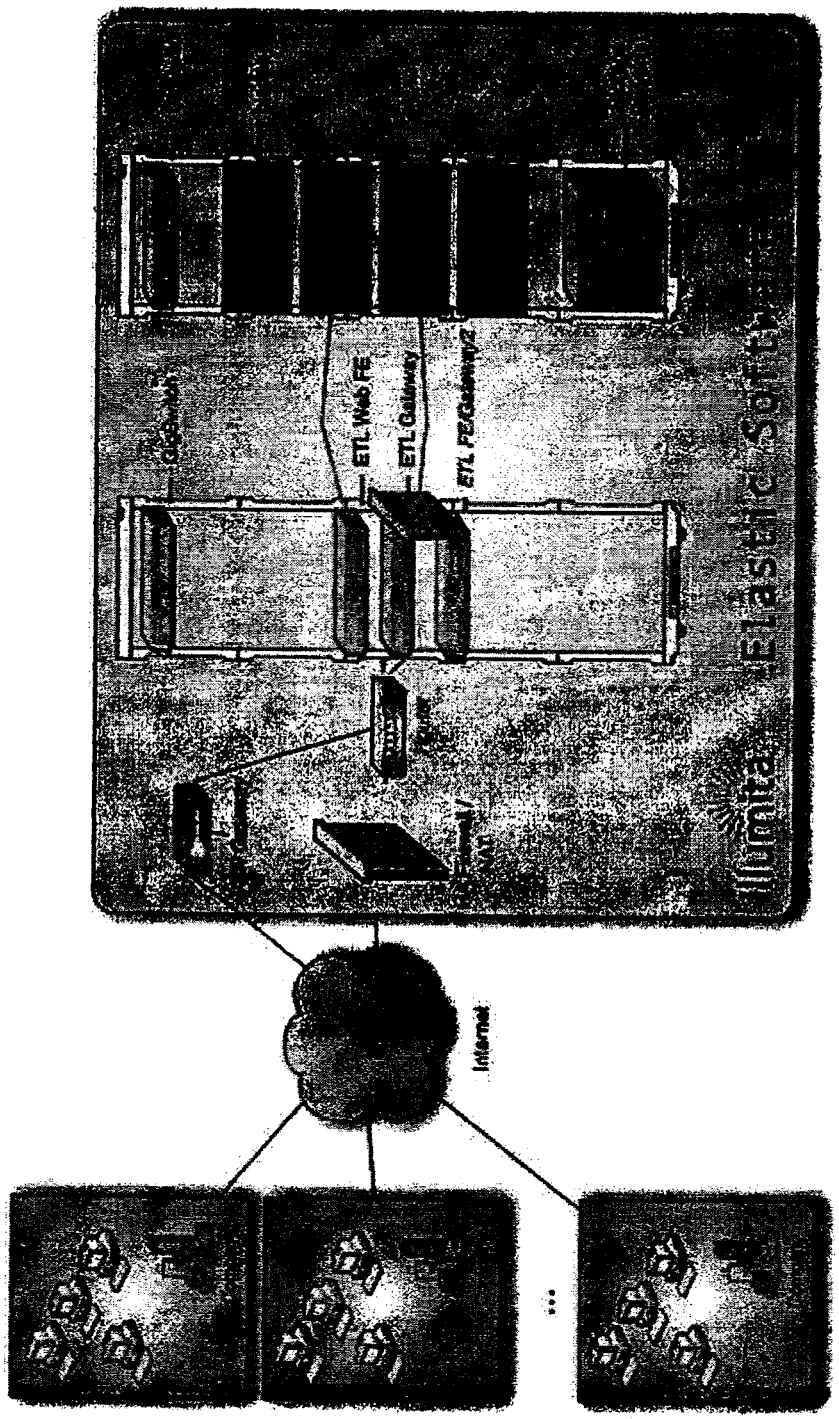
FIGS. 25-26 show additional conceptual diagrams illustrating the organization of the MTVMI in some embodiments.

FIG. 25 shows an additional conceptual diagram illustrating the organization of the MTVMI in some embodiments. FIG. 25 shows the physical arrangement of hardware components of the MTVMI in some embodiments. The MTVMI infrastructure has one or more storage servers or storage nodes, one or more server blades that serve as virtual machine hosting nodes or as network nodes all of which are housed in racks and connected in an Ethernet network fabric. Additional servers on the network fabric execute components of the MTVMI management application (e.g., shown as ETL Web FE in the figure). The MTVMI infrastructure in addition includes other typical components such as router, VPN gateway, firewall, load balancer, etc.

Figure 26:
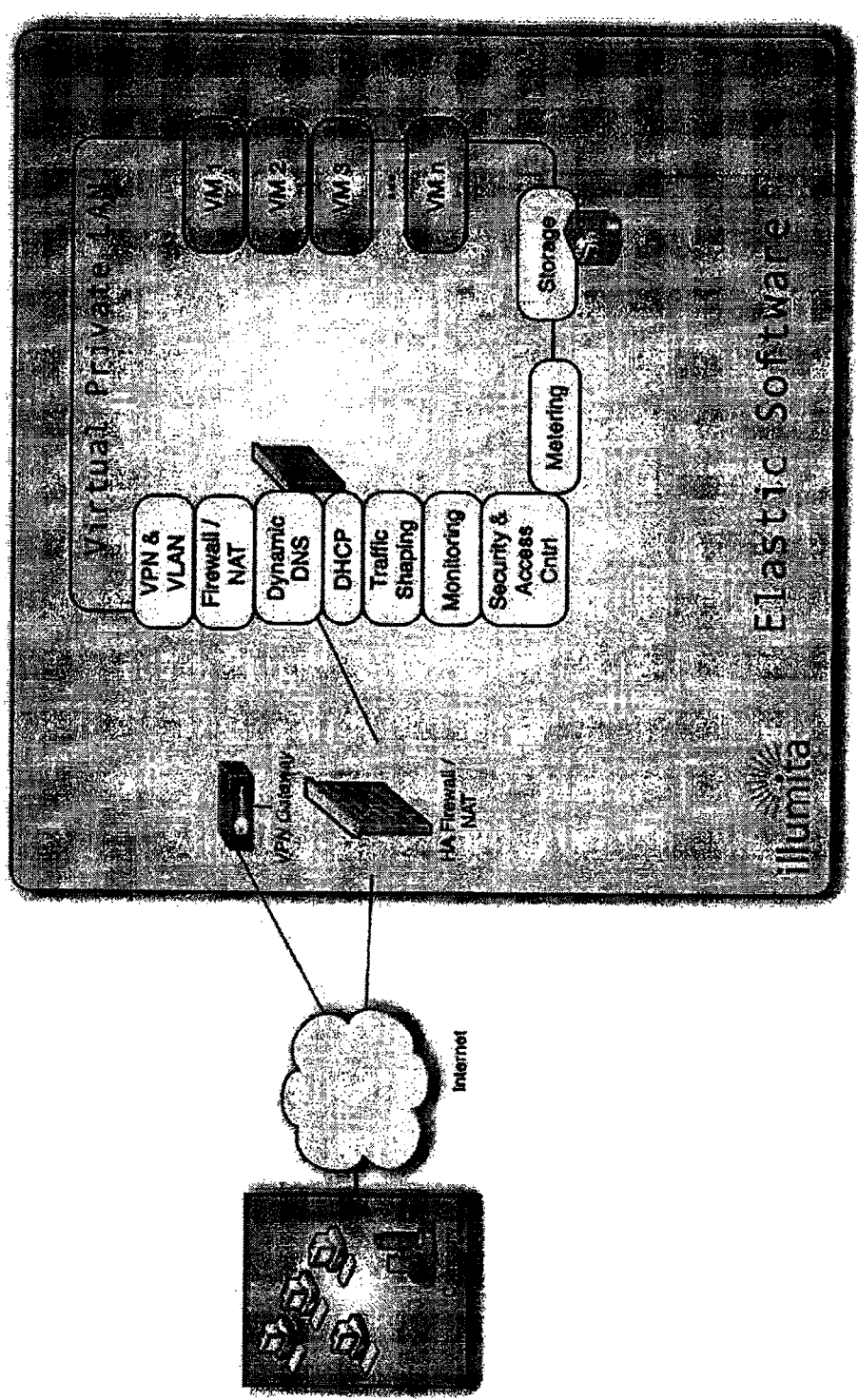

FIG. 26 illustrates some of the network services provided in connection with virtual networks in some embodiments. These network services include, for example, DNS, DHCP, Firewall, NAT (Network Address Translation), VPN, Traffic shaping, networked storage etc. These services are accessible to the virtual machines that are part of this virtual network. In some embodiments, network services in any virtual network are fully isolated from network services in other virtual networks within the MTVMI.

Figure 27:
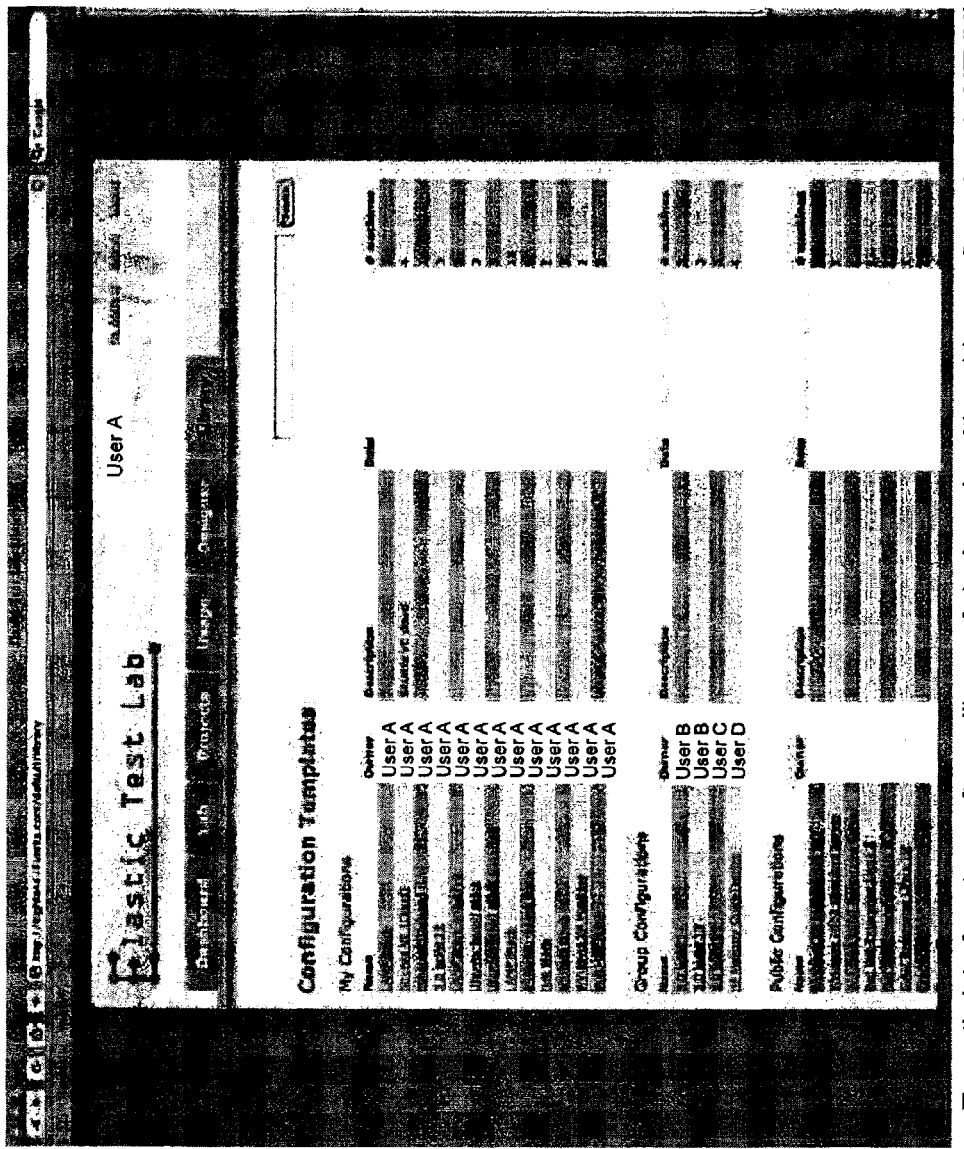
Figure 28:
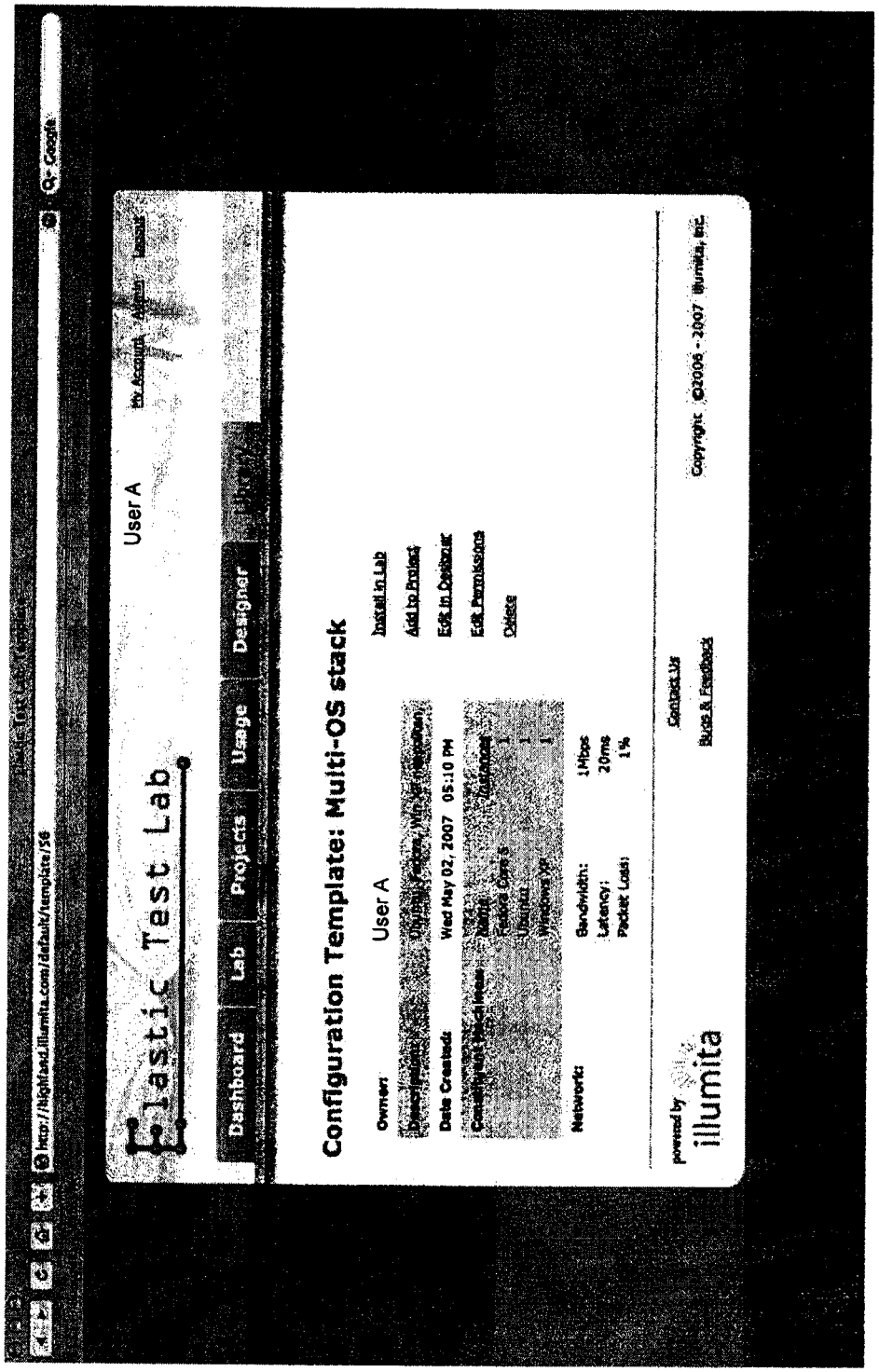
Figure 29:
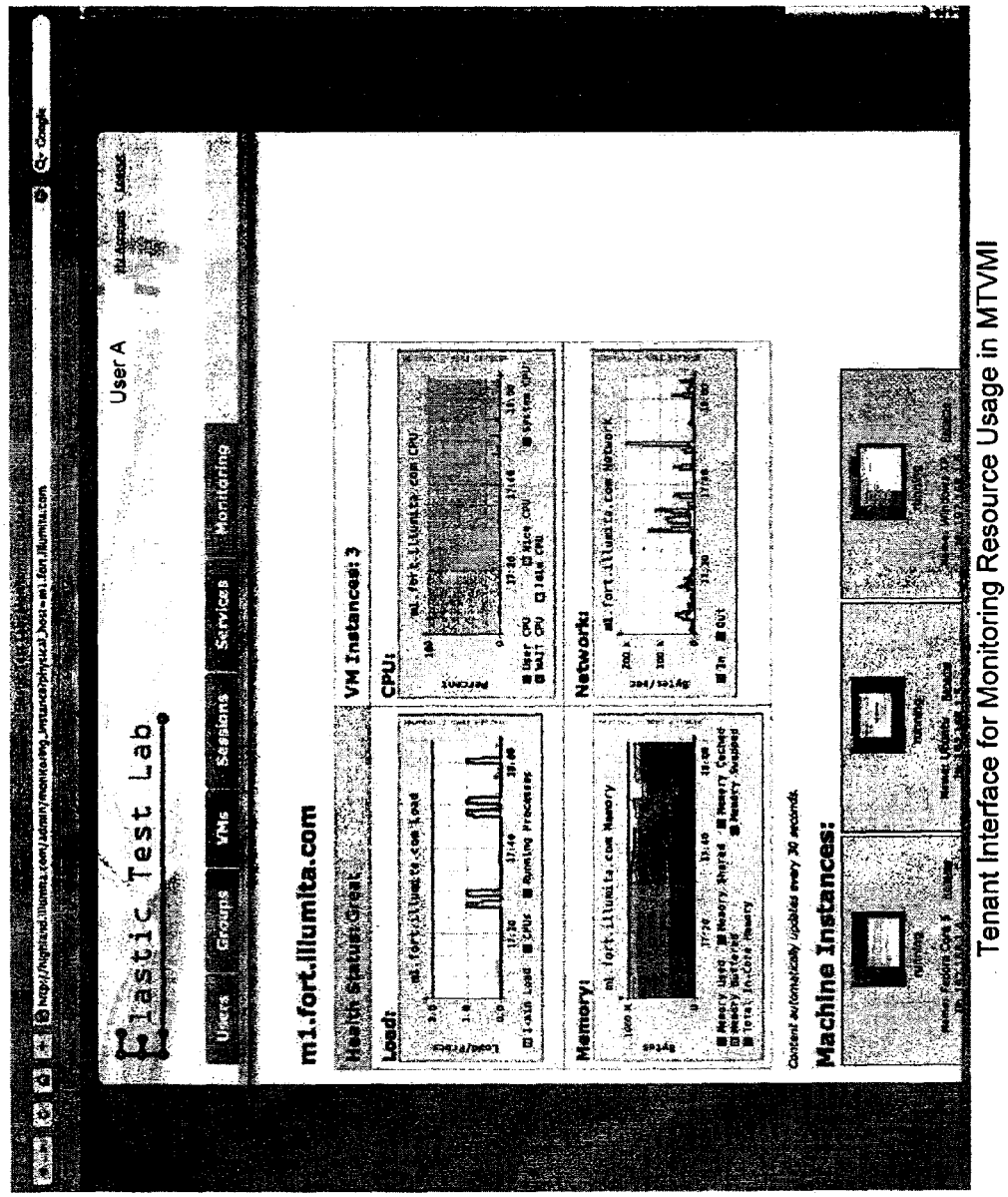
Figure 30:
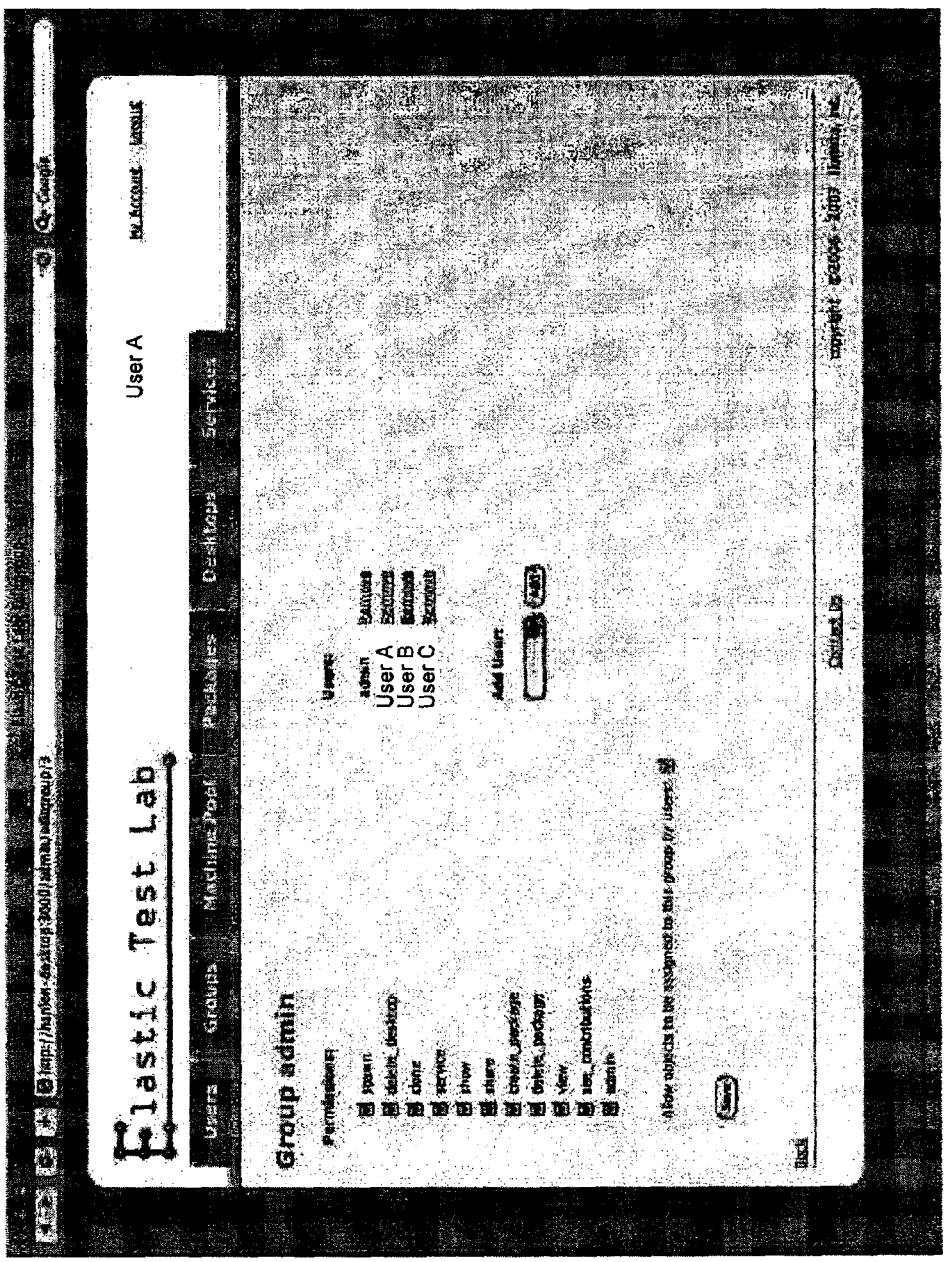
Figure 31:
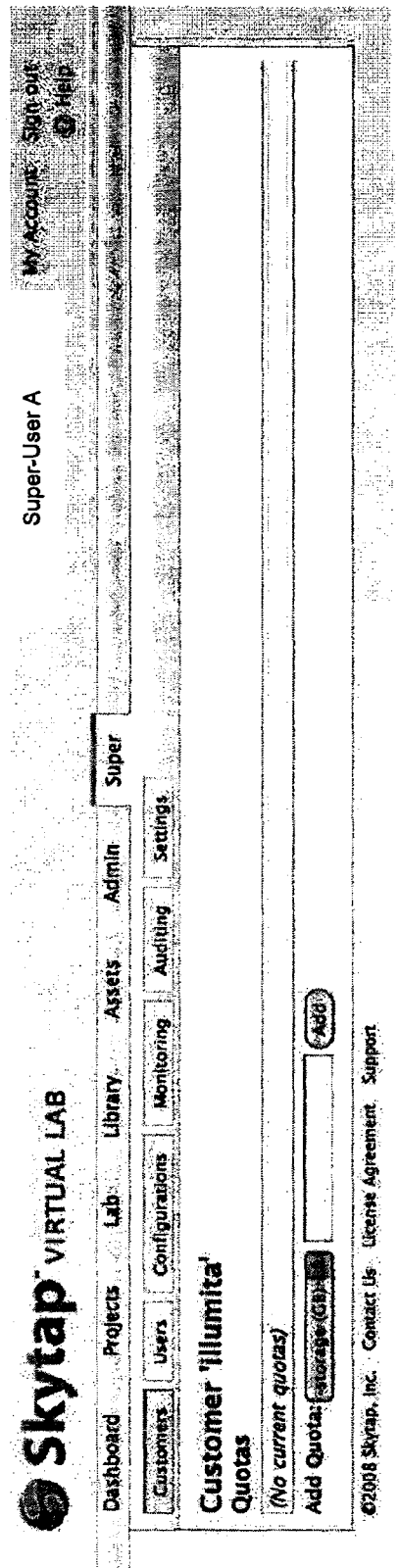
Figure 33:
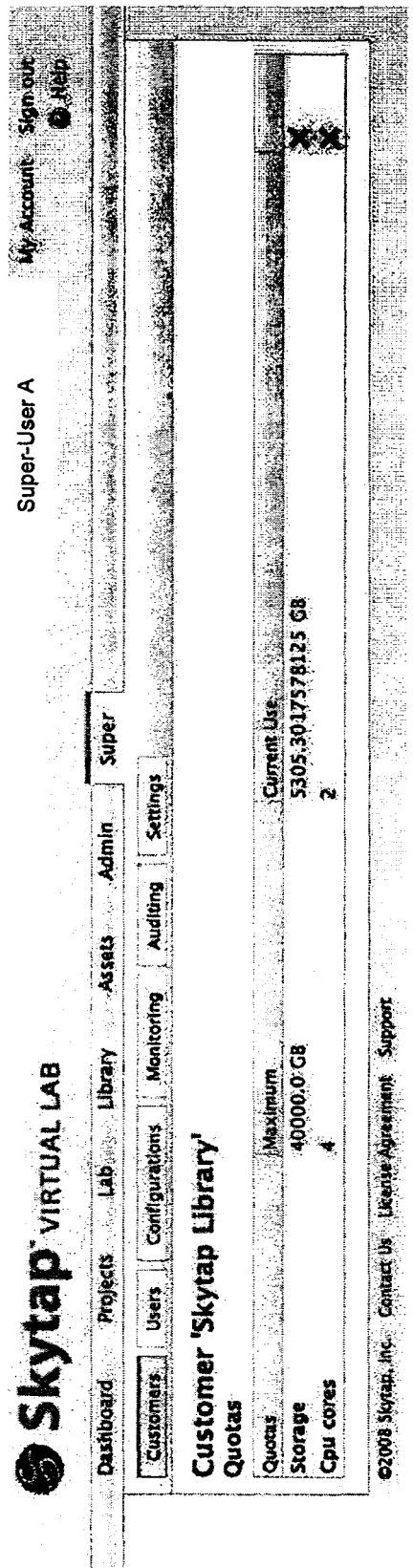
Figure 35:
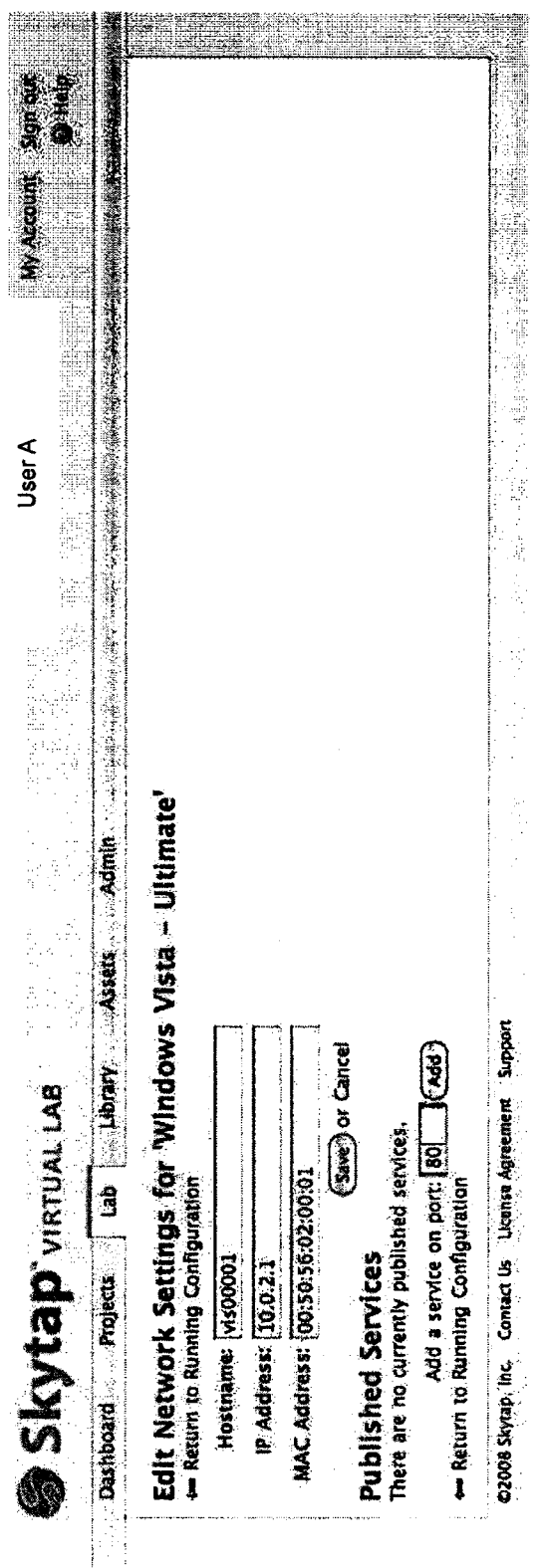
Figure 37:
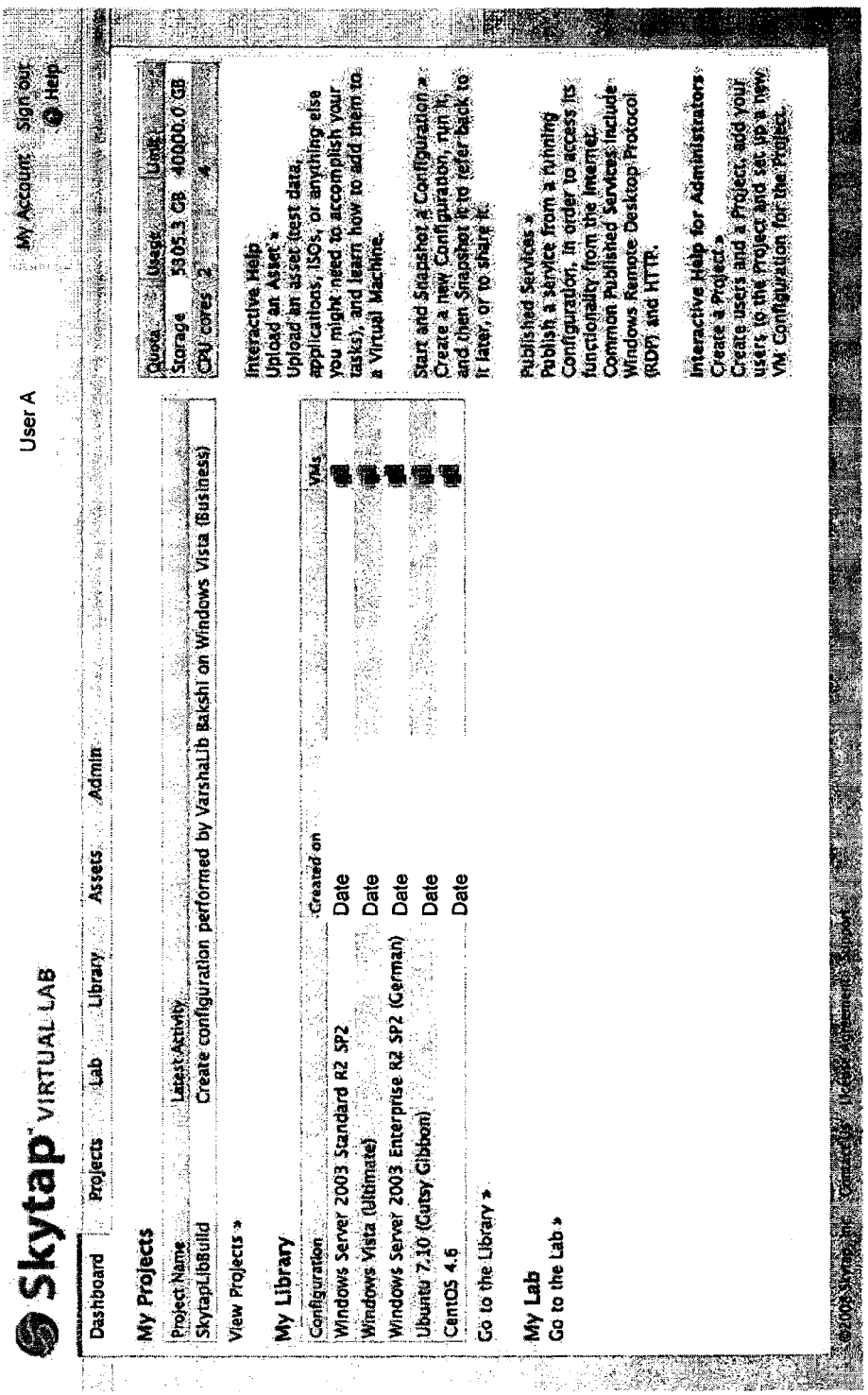
Figure 39:
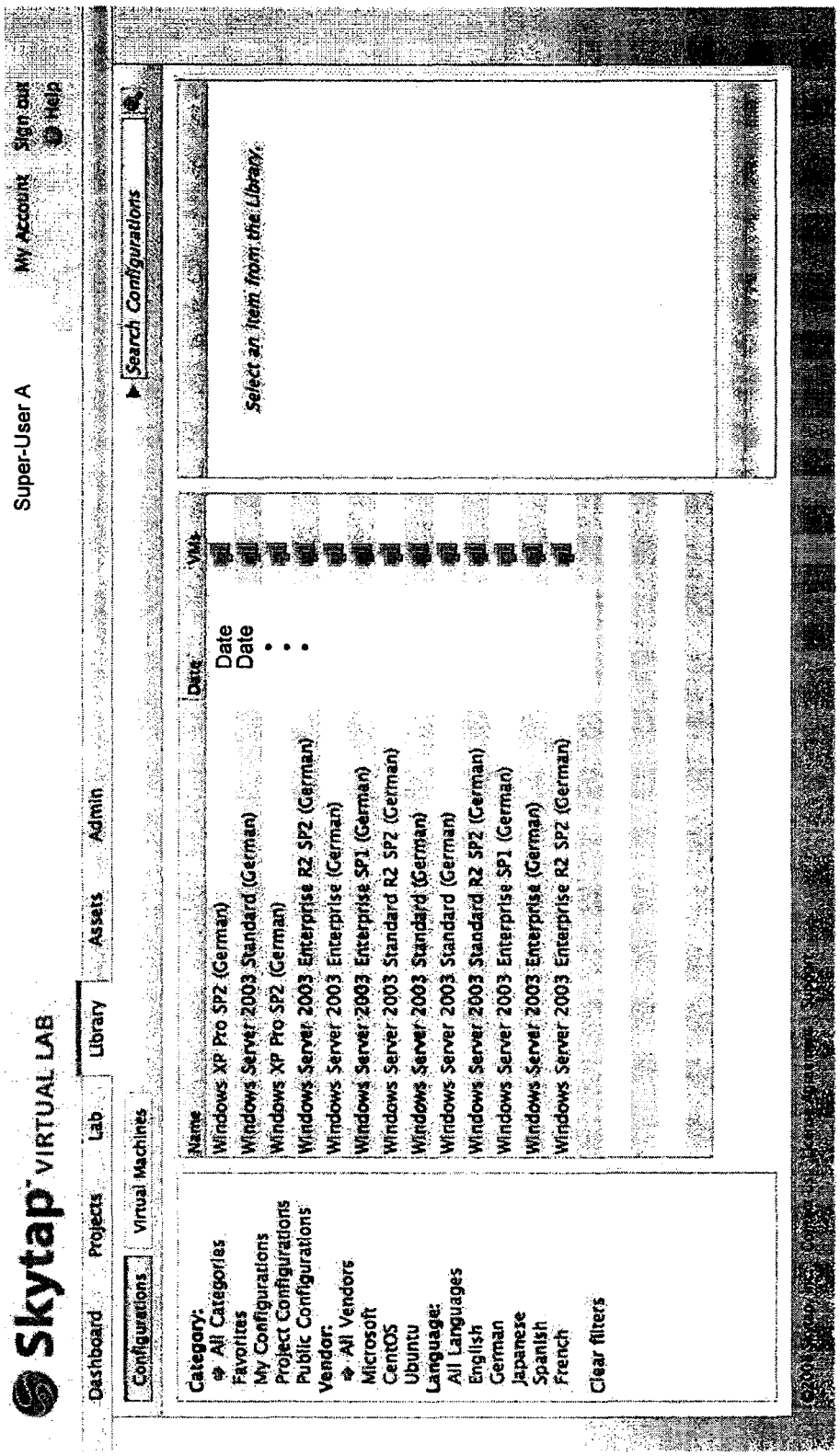
Figure 41:
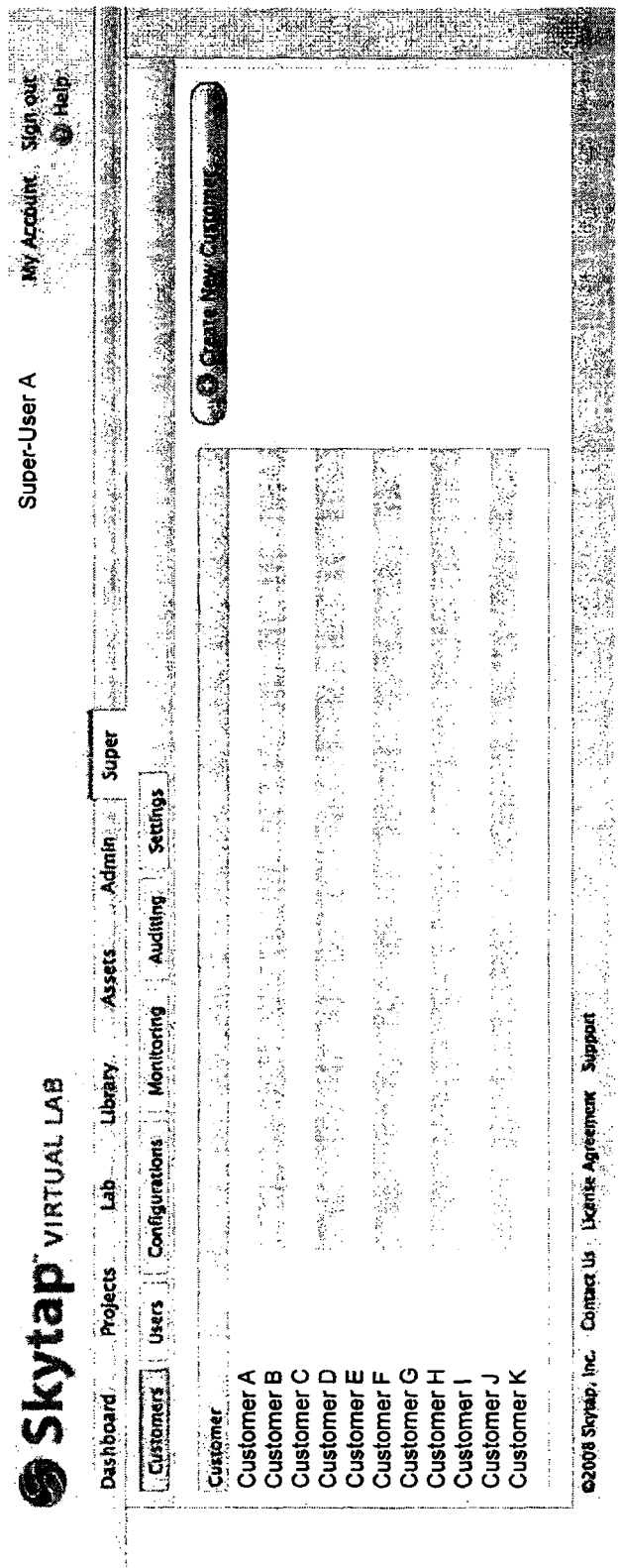

FIGS. 27-46 are display diagrams showing displays presented by the MTVMI in some embodiments. FIG. 27 shows a display enumerating available virtual data center configuration templates that is presented in some embodiments. FIG. 28 shows a display presenting information about a single configuration template that is presented in some embodiments. FIG. 29 shows a display for monitoring resource utilization within the virtual machines in a virtual data center that is presented in some embodiments. FIG. 30 shows a display that a tenant can use to configure their user's access permissions that is presented in some embodiments. FIG. 31 shows a display that enables a tenant quota to be specified that is presented in some embodiments. FIG. 32 shows a display for auditing a MTVMI user's operations across tenants that is presented in some embodiments. FIG. 33 shows a display for monitoring tenant resource usage with respect to quotas that is presented in some embodiments. FIG. 34 shows a display for monitoring the status of virtual machine host nodes that is presented in some embodiments. FIG. 35 shows a display for a user to control network settings for a virtual machine that is presented in some embodiments. This display shows fields for the user to change the virtual machine's Hostname, IP address, MAC address, and also open specific network ports in the firewall to allow access from the public Internet. FIG. 36 shows a display for reviewing and modifying project settings that is presented in some embodiments. FIG. 37 shows a display for navigating information associated with a virtual lab service that is presented in some embodiments. FIG. 38 shows a display identifying users associated with a tenant that is presented in some embodiments. FIG. 38 also shows a control that the tenant can actuate to create accounts for new users within the tenant's account. FIGS. 39 and 40 are displays showing lists of virtual data center configurations that are made available for users by a virtual lab service that is presented in some embodiments. FIG. 41 shows a display identifying tenants that is presented in some embodiments.

Figure 42:
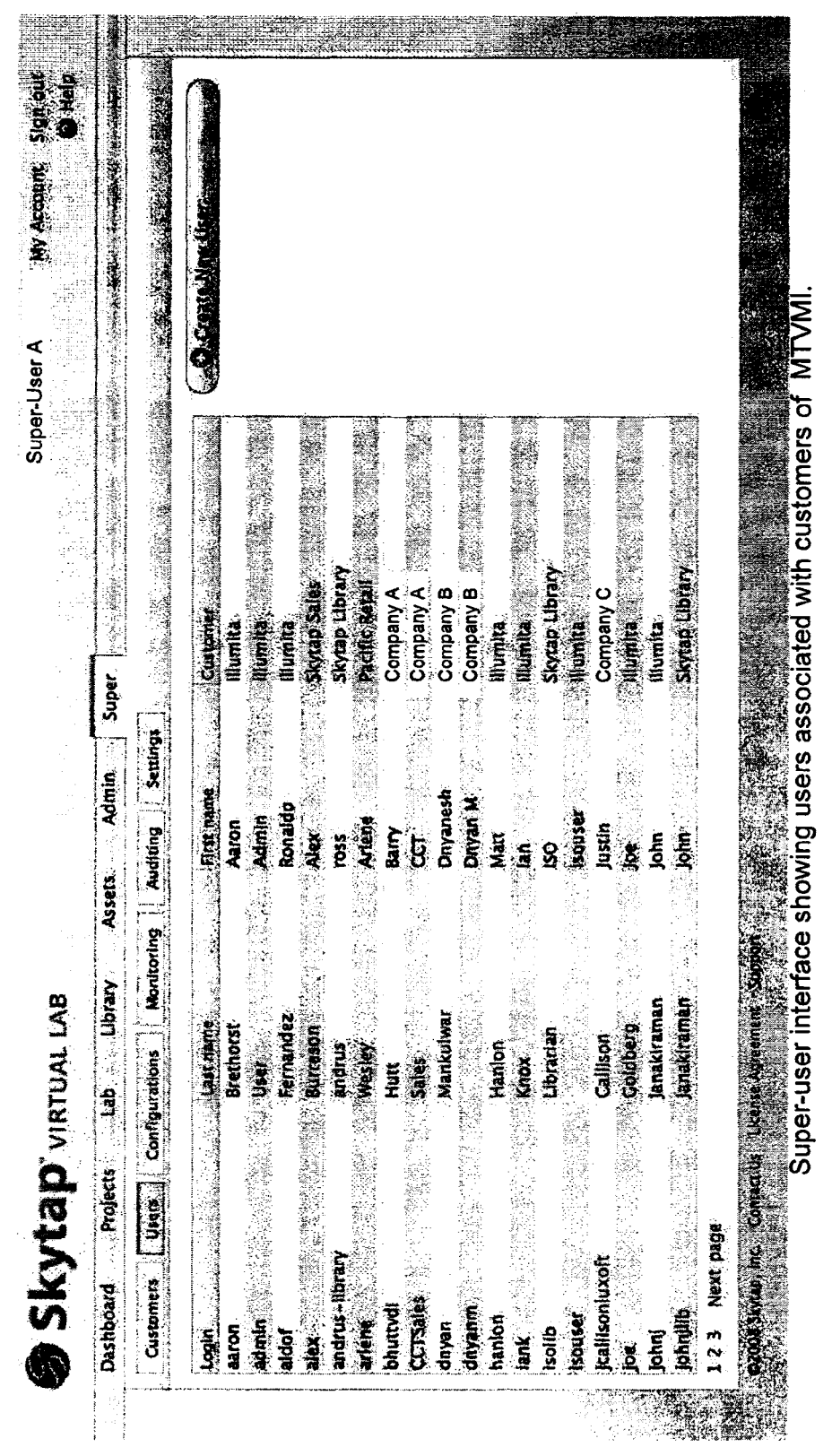
Figure 43:
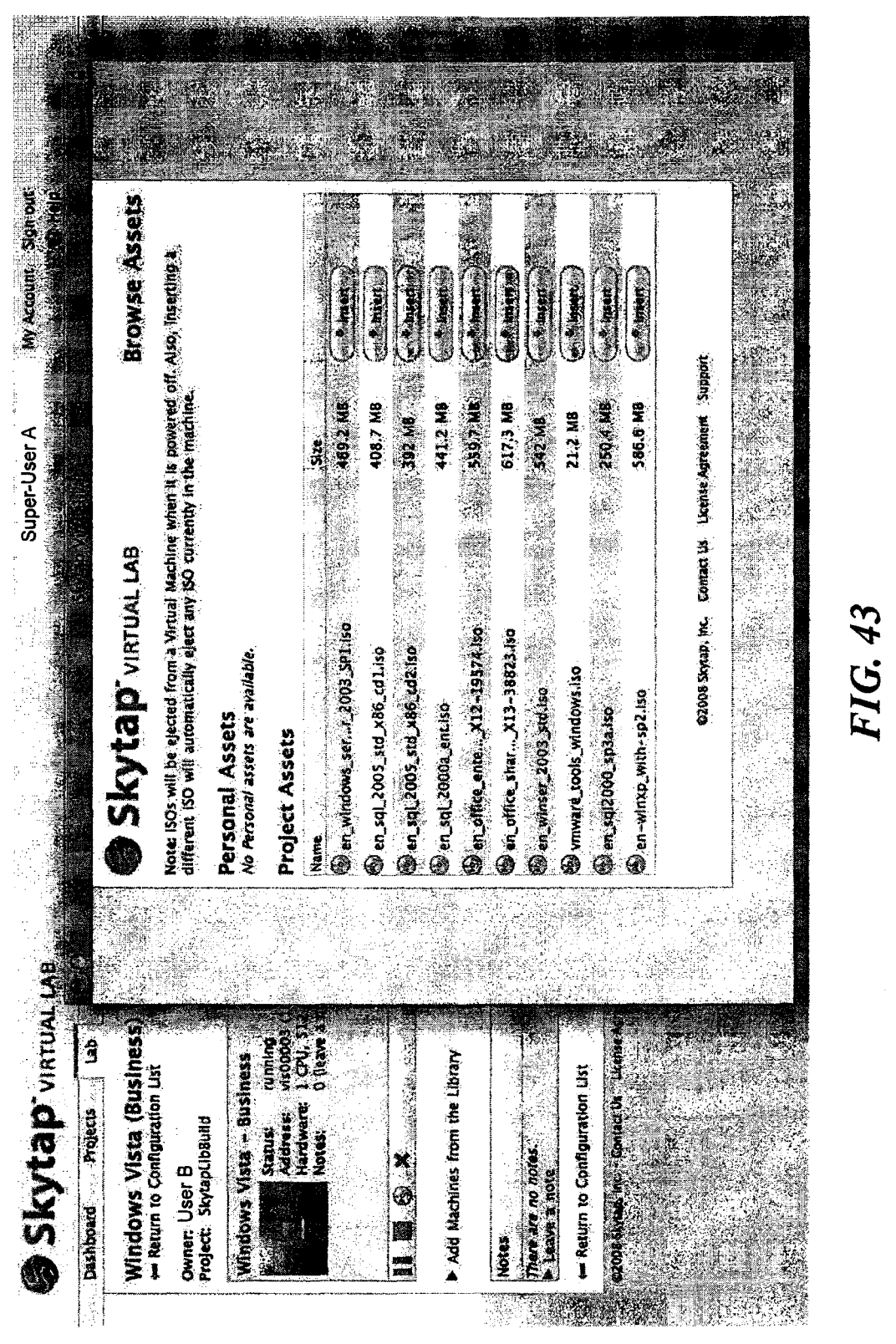
Figure 44:
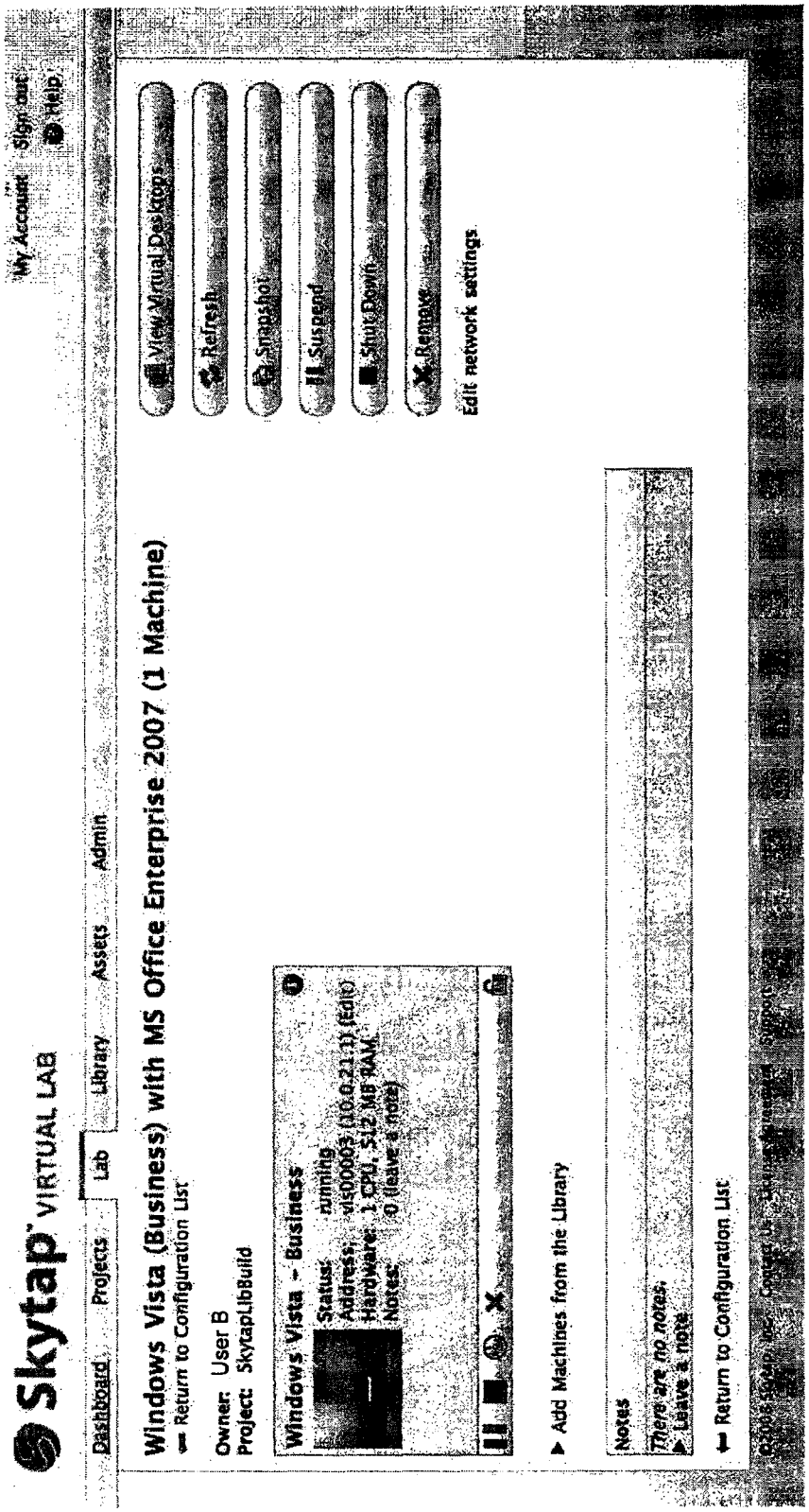
Figure 45:
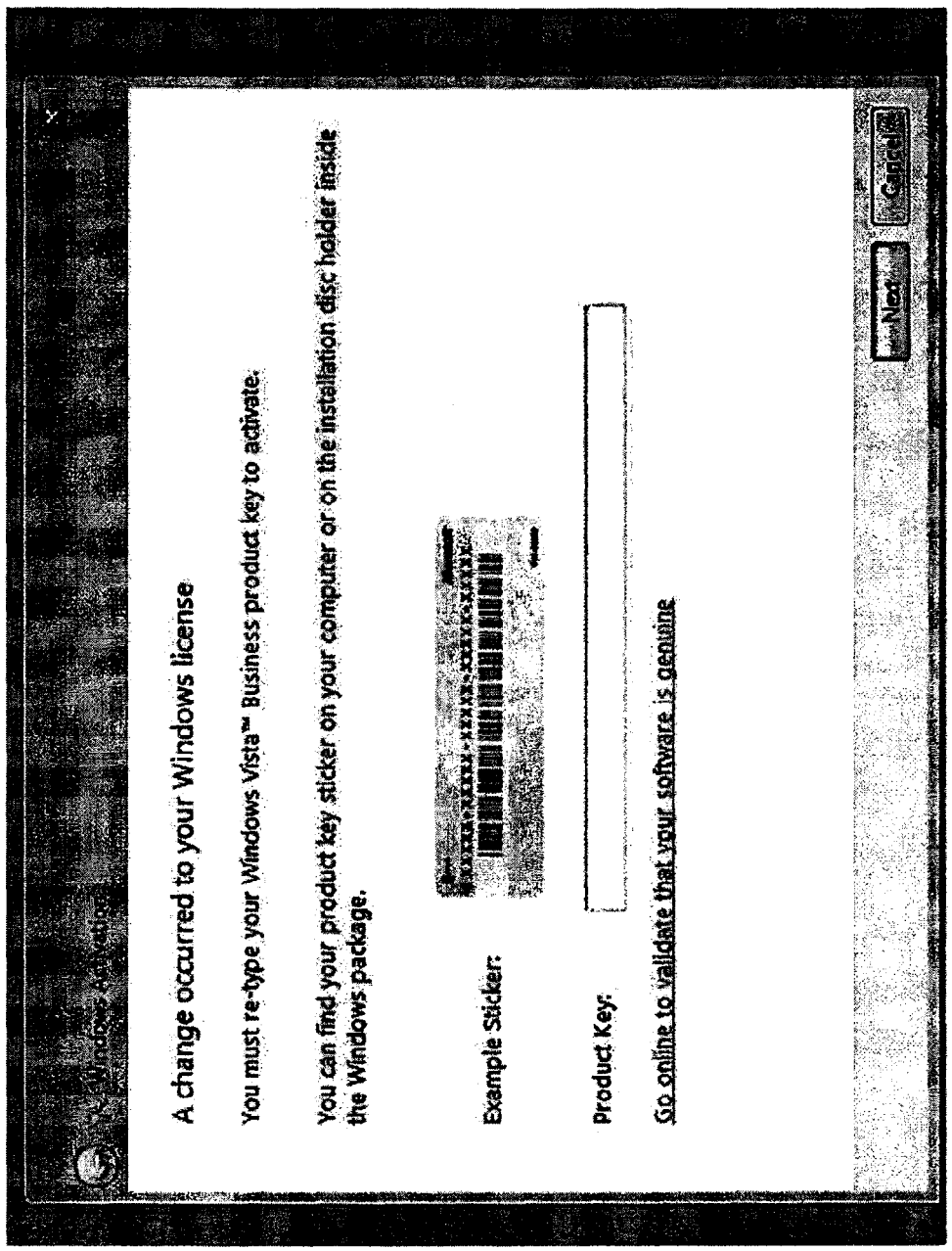
Figure 46:
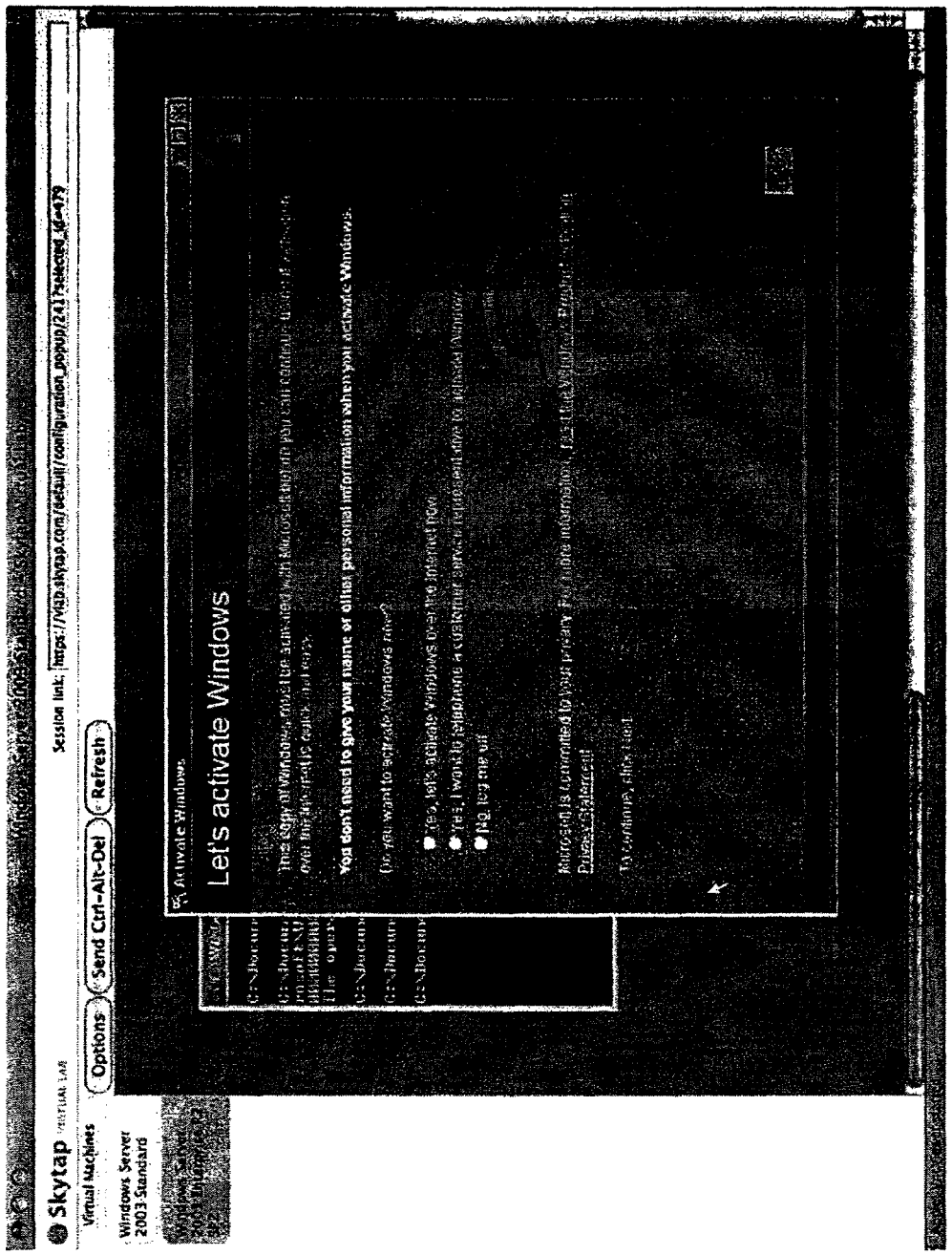

FIG. 42 is a display identifying users associated with each tenant that is presented in some embodiments. FIG. 43 is a display showing assets available within the virtual lab service that is presented in some embodiments. FIG. 44 is a display showing information about a virtual machine configuration that is presented in some embodiments. FIGS. 45 and 46 show displays of a virtual machine's console display illustrating a user authenticating (FIG. 45) and activating (FIG. 46) a third-party software license for software installed on the virtual machine. FIG. 46 shows a display for activating a pre-installed instance of an operating system using a license key owned by a tenant that is presented in some embodiments. It can be seen that the display includes tabs, such as tabs "Windows Server 2003 Standard" and "Windows Server 2003 Enterprise R2 SP2," that each refer to a different virtual machine. The user can select a view of a particular machine by selecting the tab corresponding to that virtual machine.

In some embodiments, MTVMI 100 provides a brokering service that enables tenants and users to exchange or offer products and/or services. FIG. 7 is a flowchart illustrating the provision of a brokering service by MTVMI 100 in some embodiments. The brokering service of FIG. 7 is provided by a brokering portal where tenants and users are allowed to exchange software and other data that may be useful within MTVMI 100. The data may include, e.g., custom virtual machine or virtual data center configurations, software applications, custom scripts or programs written for MTVMI 100, to name but a few.

In step 705, MTVMI 100 provides a brokering portal. In one example, the brokering portal comprises a software application that presents a graphical user interface within a user's display. The graphical interface may include a mechanism for presenting available software and/or data that the user can download. The graphical user interface may further include a mechanism for allowing the user to upload software to the portal. In some embodiments, the MTVMI grants access to the tenant to software that is already available within the MTVMI. The portal may require the user to provide a form of payment to download certain software or data. Alternatively, the software or data may be provided free of charge.

In step 710, MTVMI 100 receives data from the user through the portal and stores the data in a common access area. For explanation purposes, a user who uploads data to the portal is referred to as a vendor in FIG. 7, even though the portal does not necessarily require users to exchange payment for sharing data. Similarly, a user who downloads software from the portal will be referred to as a buyer.

In step 715, MTVMI 100 presents data to potential buyers within the portal. In step 720, MTVMI 100 facilitates a transaction between the vendor and the buyer by, for example, allowing the buyer to download data provided by the vendor. MTVMI 100 facilitates transactions involving the exchange of money by, for example, enabling users to debit or credit bank accounts, providing deposit accounts within the MTVMI, adding incurred expenses to a tenant's MTVMI account, etc.

FIGS. 47-49 are display diagrams illustrating a user interface designed for use by vendors offering items for sale via the brokering portal in some embodiments. FIG. 47 is a display diagram showing a sample display typically presented by the infrastructure in order to register a new vendor for the brokering portal. The display enables a user associated with the vendor to enter the following information about the vendor: the company name 4701 of the vendor; the company address 4702 of the vendor; the contact name 4703 of a contact at the vendor; the email address 4704 of the contact; a phone number 4705 of the contact; and a password 4706 to be used by the vendor to access a vendor portal for interacting with the brokering portal. The user can select a submit control 4710 to generate a profile that is based upon the inputted information.

FIG. 48 is a display diagram showing a sample display typically presented by the infrastructure in order to enable a vendor to list a new item for sale in the brokering portal. The display 4800 is typically made available to a user associated with the vendor in response to that user signing into the vendor portal on behalf of the vendor. The display includes information 4801 identifying the vendor. The user can use the display to input the following information about the item to be listed: the name 4811 of the item; a description 4812 of the item; a support link 4813 for the item; and a date 4814 on which the listing will expire. The user may also input pricing for any of a number of different pricing schemes, including: the per month cost 4821 for each user who uses the item; the per year cost 4822 for each user who uses the item; the per hour charge 4823 for the item; and the one-time charge 4824 per user for using the item. Typically, if the user does not enter a price in one of these fields, the option is not offered as a basis on which buyers can purchase the item. The display further includes controls 4831 and 4832 for specifying a path to the file containing the item that is to be uploaded to the infrastructure from the vendor's computer system. The user can select submit control 4840 in order to create a listing in accordance with the inputted information.

FIG. 49 is a display diagram showing a sample display typically presented by the user in order to account to a vendor for revenue generated by the vendor's items in the brokering portal. The display 4900 shows a period 4901 such as a month, to which the displayed accounting applies. The user can select controls 4902 or 4903 to navigate to display an accounting for other periods of time. The display includes a table in which each row corresponds to a particular basis for charging customers for a particular item. These rows are grouped into group 4920 for the Crossbow Debugger item and group 4930 for the Image Cropper item. Each row is divided into the following columns: an item column 4911 identifying the item; a rate column 4912 identifying the rate charged to users for the payment option to which the row corresponds; a units column 4913 showing the number of units of that charging option that were consumed by customers during the selected period; a revenue column 4914 showing the revenue produced in connection with the current item charging option during the selected period; and an item title total column 4915 showing, for the last row of each group, the amount of revenue generated by the item during the selected period. The display also includes an indication 4940 of the gross revenue for the selected period, and an indication 4950 showing the portion of the revenue that is retained to support the operation of the brokering portal, and an indication 4960 of the net revenue to the vendor for the selected period.

FIGS. 50-53 describe the architecture of some embodiments of the MTVMI management application (shown in FIG. 6) to realize its functional capabilities.

Figure 50:
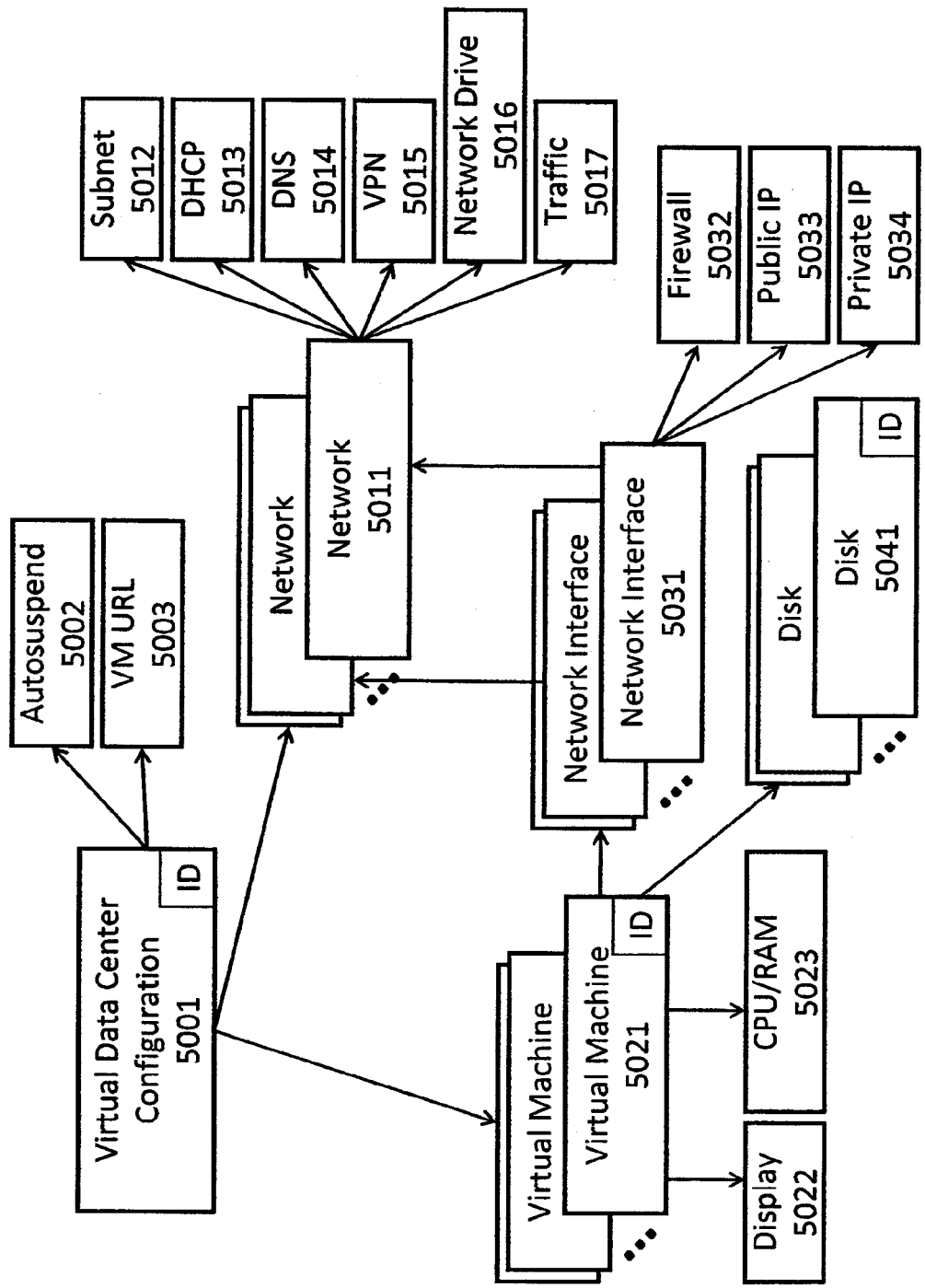
FIG. 50 is a block diagram illustrating a data model representation of virtual data centers in the MTVMI management application in some embodiments.

FIG. 50 is a block diagram illustrating a data model representation of virtual data centers in an MTVMI application in some embodiments. Each virtual data center is represented at the highest level by a virtual data center configuration 5001. Virtual data center configuration 5001 has an ID that is a globally unique reference to the specific virtual data center configuration. Each virtual data center configuration is associated with one or more virtual machine objects 5021, one or more virtual networks 5011, an autosuspend attribute 5002 and a VM URL (or publish URL attribute) 5003. The VM URL attribute specifies a URL handle that can be used to reference each of the virtual machines in the virtual data center as well as associated attributes such as authentication password, user privileges on operating the virtual machine. The autosuspend attribute specifies the policy that the user has configured for suspending the virtual data center or its component virtual machines (e.g., policies include after a specific idle duration, at a specific wall clock time, etc.) Each virtual network object 5011 has several attributes including Subnet specification 5012, DNS specification 5013, DHCP specification 5014, VPN specification 5015, Network Drive specification 5016, and Traffic specification 5017. The Subnet attribute 5012 can specify the network address and network subnet mask associated with that network. DNS and DHCP attributes 5013 and 5014 can specify the network address of these services and whether they should be the default services or custom services provided by the user. VPN attribute 5015 can specify the configuration attributes of the network tunnel including the identity of the remote VPN gateway, network address specifications for the tunnel, access credentials, policy for auto-connecting the tunnel etc. Network Drive specification 5016 can specify a reference to one or more virtual storage drives that should be accessible in the network. Traffic attribute 5017 can specify a bandwidth quota for the network. Each virtual machine object 5021 has an ID that globally uniquely identifies that virtual machine. Each virtual machine object is associated with a Display attribute 5022, a CPU/RAM attribute 5023, one or more Network Interface objects 5031, and one or more Disk objects 5041. The Display attribute provides a reference to the graphical console display of the particular virtual machine. The CPU/RAM attribute specifies the number of processing elements and the amount of RAM for the particular virtual machine. Each Network Interface object 5031 is bound to one of the Network Objects associated with the parent virtual data center configuration. It also specifies several attributes including its MAC address, one or more IP addresses for the interface (e.g., Public IP 5033 routable from the public Internet, Private IP 5034 routable only within the Network that the interface is bound to, and also one or more firewall rules identifying which network ports (e.g., port 22 for SSH, port 80 for HTTP etc.) are open for access from the public Internet. Each Disk object 5041 has a globally unique ID that identifies the disk file or files that hold the content of this disk on the storage nodes.

The virtual data center data model discussed in FIG. 50 is an example embodiment. Other embodiments include additional attributes, both attributes that are specified by the user (e.g., name for the virtual data center, specific tasks to be executed at specified times on the virtual data center) and attributes that are determined by the MTVMI management application itself (e.g., other IDs or version numbers). In addition, the MTVMI management application will maintain runtime information about the virtual data center, including its execution state, error states if any for any of the virtual data center components, locking state to support serialization of operations on the virtual data center, queue of pending operations on the virtual data center, and timestamps for last user activity on the virtual data center.

A user of the MTVMI can provide various inputs, as discussed over previous embodiments, to specify the desired configuration for a virtual data center including its virtual machines, its virtual network, virtual storage, etc. The MTVMI management application instantiates a virtual data center configuration object with these configuration parameters when creating the virtual data center for the user. When performing subsequent user-requested operations on the virtual data center, the MTVMI management application will perform these operations across the breadth of the attributes and state of the virtual data center as appropriate for the specific operation. For example, one of the operations that the MTVMI management application supports is to Snapshot the virtual data center. This Snapshot operation captures the complete attributes and state of the virtual data center. This enables the user to subsequently perform a second operation to create a duplicate copy of the virtual data center from the snapshot. The duplicate copy that is created is identical to the original but is however independent and isolated from the original.

The MTVMI management application orchestrates several steps, some done in sequence and some done in parallel, to perform operations on the virtual data center. To perform a Snapshot operation on the virtual data center, the steps performed include quiescing previous user-initiated operations on the virtual data center, quiescing execution of the virtual machines in the virtual data center so that a consistent checkpoint of the virtual machine states can be saved, saving the state of the executing virtual machine including the state of its processors and memory, saving a copy of disk data that is associated with the virtual machines and any network share drives, creating a new virtual data center configuration object with a newly assigned globally unique ID, and saving all information that needs to be persisted from the original virtual data center configuration object to the newly created virtual data center configuration object. Virtual data center configuration object information that is saved include Virtual Machine objects with newly assigned globally unique ID, the CPU/RAM attributes of each virtual machine, the Network Interface attributes of each virtual machine including their Firewall, Public IP, and Private IP attributes, Disk object information referencing the IDs of the newly saved copies of the disk state, Network object information including its attributes discussed in FIG. 50, the Autosuspend attribute and the VM URL attribute. Specific attributes that need to be uniquely associated with the new virtual data center configuration object are not saved, including globally unique IDs associated with the original virtual data center configuration object, its virtual machines, and its Disk Objects, VM URL references to the virtual machines in the original virtual data center configuration and Display object references to the virtual machines in the original virtual data center configuration.

When a user initiates an operation to instantiate a Snapshot copy of a virtual data center, in some embodiments, the MTVMI management application orchestrates the necessary steps to instantiate the virtual data center. This includes instructing the Network Manager component to assign a dedicated VLAN for each of the Network objects referenced in the virtual data center configuration and create dedicated instances of network services in each of the VLANs with configuration parameters as specified with the attributes of the Network object. This also includes instructing the Storage Manager to make the required disk objects accessible to the virtual machines that will be instantiated in the virtual data center. This also includes instructing the VM Manager to allocate resources for running the virtual machines, configuring the CPU/RAM and network interface attributes of the virtual machines to meet the specifications in the virtual data center configuration object, triggering the execution of the virtual machines from their associated processor, memory, and disk state. This also includes establishing the Autosuspend, VM URL, and Display controls and references to meet the specifications in the virtual data center configuration object. These and other steps orchestrated by the MTVMI management application instantiate an exact duplicate copy of the original virtual data center which is, however, independent and isolated from the original virtual data center.

In other embodiments, the MTVMI management application supports and orchestrates additional operations including creating a copy from the Snapshot without instantiating a virtual data center, creating a duplicate instance of a virtual data center directly from an instantiated virtual data center without creating an explicit Snapshot, etc.

Figure 51:
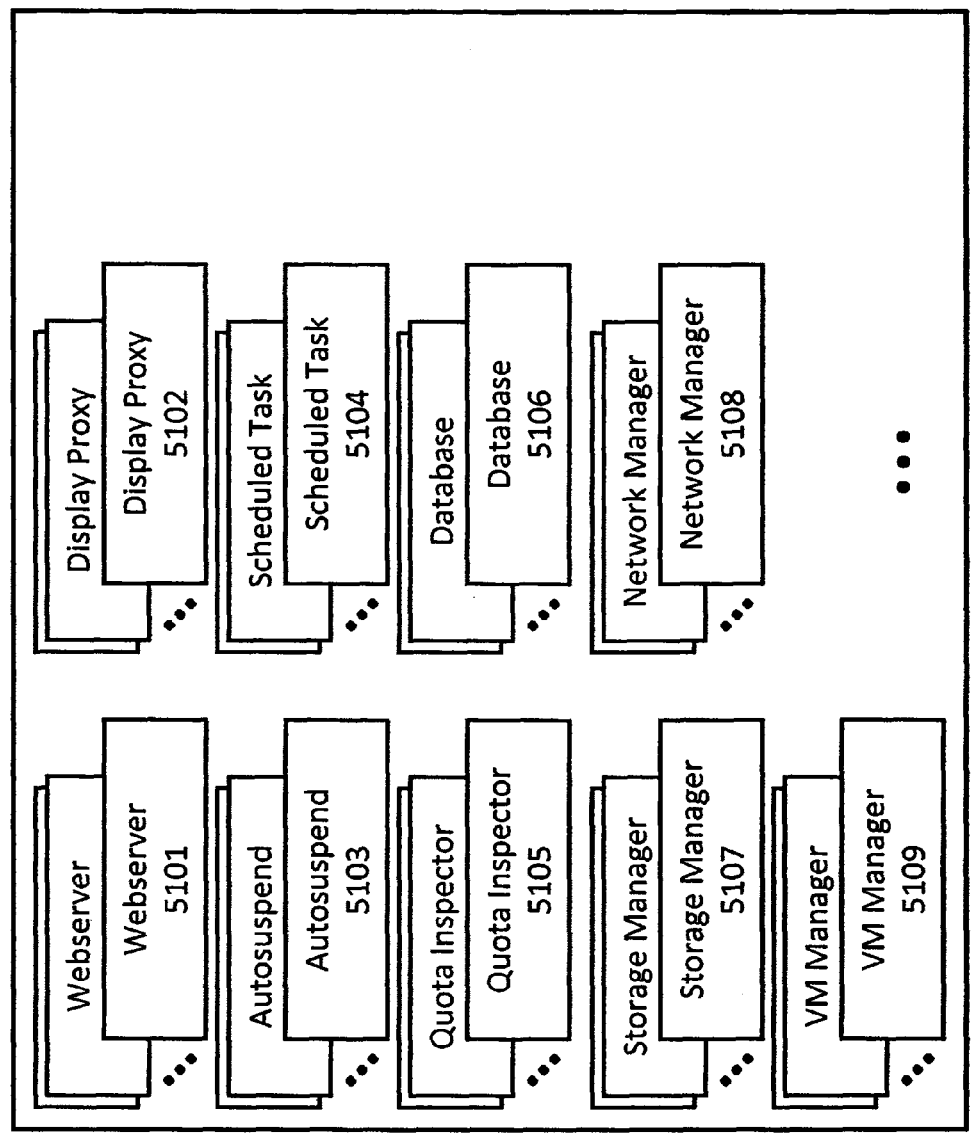
FIG. 51 is a block diagram illustrating component processes in the MTVMI management application in some embodiments.

The MTVMI management application is comprised of a number of component processes as discussed previously. FIG. 51 is a block diagram illustrating component processes in the MTVMI management application in some embodiments. The MTVMI management application includes one or more instances of Webserver process 5101, Display Proxy process 5102, Autosuspend process 5103, Scheduled Task process 5104, Quota Inspector process 5105, Database process with one or more associated databases 5105, Storage Manager process 5106, Network Manager process 5107, and VM Manager process 5108. The Webserver process 5101 services user requests over a standard protocol such as HTTP or HTTPS that is carried over the Internet. Servicing these requests cascade to requests for other processes in the MTVMI management application as appropriate depending on the request. The Display Proxy process 5102 enables the user to access the graphical console display of virtual machines in their virtual data centers running in the MTVMI. When a user requests access to the graphical console display of the virtual machine, the Web server process first retrieves the Display object reference for the associated virtual machine from the virtual data center configuration object and returns it to the user's browser. An applet is triggered to run on the user's browser which supplies this Display object reference to the Web server in a second request. This request is passed to the Display proxy process which associates the supplied Display object reference with the graphical console port of the specific virtual machine and bridges the connection between the user's browser applet to the graphical console of the virtual machine. The graphical console is rendered on the user's browser over the Internet through the use of a standard remote display protocol carried over the Internet such as VNC (Virtual Network Console) or RDP (Remote Display Protocol). The Autosuspend process 5103 runs periodically to examine expiry of idle time intervals or other timing intervals for virtual data centers and if these intervals have expired triggers appropriate additional processes for further action on the virtual data center (e.g., to suspend execution of all virtual machines in the virtual data center). The Scheduled Task process 5104 triggers the execution of additional processes at pre-specified time of day to perform specific actions on the virtual data center (e.g., to initiate execution of all virtual machines in the virtual data center at the specified time). The Quota Inspector 5105 process runs periodically to detect exhaustion of time-dependent resource usage quotas such as the length of time a virtual machine is allowed to run. The Quota Inspector process examines events with ongoing resource usage (to be discussed further with reference to FIG. 53) and the entities to which the resource usage is assigned to (e.g., entities such as customer, user, project). If the aggregate of prior resource usage and the ongoing resource usage is determined to exceed the resource quota allocated for the entity, the Quota Inspector triggers the execution of additional processes to perform further action on the virtual data center. These actions can include suspending the execution of virtual machines associated with that entity to stop further usage, sending notification to one or more users associated with the entity informing them of exceeding quota, posting error notifications in the virtual data center configuration object, automatically increasing the resource quota allocation etc. The Database process 5106, as the name indicates, maintains metadata information used by the MTVMI management application in a database and services queries and operations on this metadata. This metadata includes information about entities such as Customer, User, Project, virtual data center configurations, Library, etc. The Storage Manager process 5107, Network Manager process 5108, and the VM Manager process 5109, which have been discussed previously, manage the creation, operation, and management of the virtual storage, virtual network, and virtual machines provided for each of the virtual data centers managed by the MTVMI.

In some embodiments, MTVMI management application 115 supports access control mechanisms to enable tenants to restrict their users' access rights to specific objects (e.g., virtual data centers, virtual machines, data files, etc.) within the MTVMI as described earlier. FIG. 52 is a block diagram illustrating the organization of the data model that supports access mechanisms of MTVMI management application in some embodiments. This data model includes a Customer Table 5201, a User Table 5202, a Project Table 5203, a Role Assignment Table 5204, and a Shares Table 5205. The Customer Table 5201 records a globally unique Customer ID for each tenant that has a customer account on the MTVMI system and associated attributes. These customer attributes include, for example, the customer's name, their address, contact information for the customer's primary contact, the quota allocation for the customer for each consumable MTVMI resource (e.g., virtual machine hours, storage size, network bandwidth, etc.), a globally unique quota ID for the customer, etc. The User Table 5202 records a globally unique ID for each user and associated attributes. These user attributes include, for example, the user's name and address, the customer ID of the customer account (i.e., tenant) that the user is associated with, the user's level of privilege within the customer account (e.g., account administrator), the user's credentials for accessing the MTVMI, the quota allocation for the user for each consumable MTVMI resource, a globally unique quota ID for the user, etc. The Project Table 5203 records a globally unique ID for each Project in the MTVMI and associated attributes. These Project attributes include, for example, the name of the Project, the customer ID of the customer account to which the Project belongs, the user ID of the user who created the Project, the quota allocation for the Project for each consumable MTVMI resource, a globally unique quota ID for the Project etc. The Role Assignment Table 5204 records the privileges of users for each Project to which they have access rights. For every Project that user has access to, Role Assignment Table 5204 tracks the user's ID and the Project's ID and the user's role within the Project. The MTVMI management application recognizes multiple tiers of roles each of which awards different rights on different objects in the MTVMI. For example, a Member tier role in a Project allows the user to read and use objects (e.g., virtual data center) that are already assigned to the Project but does not allow the user to add or remove objects from the Project. The Shares Table 5205 records for each object in the MTVMI, the ID of the object (e.g., virtual data center configuration ID for a virtual data center), the ID of the user who owns the object, the ID of the customer account to which the object belongs, and the list of IDs of Projects to which the object is assigned (objects can be assigned to multiple Projects in some embodiments).

In some embodiments, MTVMI management application 115 supports access control to MTVMI objects using the data model described in FIG. 52. When a user attempts to perform an operation on a specific object (e.g., to take a Snapshot of a virtual data center), the MTVMI management application permits the operation to proceed successfully if it meets at least one of the following conditions: 1) the user ID of the user matches the owner ID for the object in the Shares Table 5205, or 2) the user has administrator level privileges in the customer account that contains the object, which is verified using the customer ID associated with the object in the Shares Table 5205 and the customer ID and the user's privilege level for the user's ID in the User Table 5202 or 3) the user has the requisite access rights within a Project to which the object is assigned, which is verified using the user's role indicated in the Role Assignment Table 5204 for each Project ID that is included in the list of Project IDs associated with the object in the Shares Table 5205.

In some embodiments, MTVMI management application 115 supports the allocation and enforcement of usage quota mechanisms for various consumable MTVMI resources (e.g., virtual machine hours, storage bytes used, network bandwidth used etc.). The MTVMI application supports this quota management for multiple types of entities including customer accounts (customers for simplicity), individual users, and individual Projects. FIG. 53 is a block diagram illustrating the organization of the data model that supports usage quota mechanisms of MTVMI management application in some embodiments. This data model includes a Customer Table 5301, a User Table 5302, a Project Table 5303, and a Resource Usage Events Table 5304. The Customer Table, the User Table, and the Project Table are identical to their previous descriptions with reference to FIG. 52. The Customer Table 5301 records a globally unique Customer ID for each tenant that has a customer account on the MTVMI system and associated attributes including the quota allocation for the customer for each consumable MTVMI resource (e.g., virtual machine hours, storage size, network bandwidth, etc.) and a globally unique quota ID for the customer. The User Table 5302 records a globally unique ID for the user and associated attributes including the quota allocation for the user for each consumable MTVMI resource and a globally unique quota ID for the user. The Project Table 5303 records a globally unique ID for each Project in the MTVMI and associated attribute including the quota allocation for the Project for each consumable MTVMI resource and a globally unique quota ID for the Project, etc. The Resource Usage Events Table 5304 records an entry for each Event in the MTVMI that initiates or terminates usage of any consumable resource in the MTVMI system. For example, when a user instantiates a virtual data center, the initiation of each virtual machine within that virtual data center is an Event that initiates the consumption of virtual machine processor and memory resources. Another example is when a user deletes a data file from their account within the MTVMI system, this is an Event that terminates the consumption of storage resource within the MTVMI. For each such Event, the Resource Usage Events Table 5304 maintains a globally unique ID for the Event, the Type of resource that is consumed (e.g., virtual machine processor resource, storage capacity resource etc.), the size of resource consumption (e.g., the number of virtual machine processors, the amount of storage in bytes etc.), the start time of the Event which is populated when the resource usage is initiated, the end time of the Event which is populated when the resource usage is terminated, the ID of the object that is associated with the resource consumption (e.g., virtual machine ID, the Disk ID, the data file ID etc.), and the quota IDs of all entities that consumed the resource (i.e., user quota ID of the user who triggered the resource usage event, the customer ID of the customer account the user belongs to, the Project ID of any Projects to which the object is assigned).

In some embodiments, MTVMI management application 115 supports enforcement and reporting of usage quotas for various consumable MTVMI resources using the data model described in FIG. 53. The contents of the Resource Usage Events Table 5304 contains the total history of resource usage by any user, customer, or Project. The MTVMI management application queries this database of information to generate various reports or views, such as the current active usage of specific resource types (e.g. virtual machine processors) by specific entities (e.g., user, customer, Project), the aggregate usage of specific resource types by specific entities within a specific time interval etc. In some embodiments, these queries can be triggered by user input (to generate specific usage reports for the user), by MTVMI administrators to generate billing invoices to tenants, or by the MTVMI management application itself to automatically generate reports for users or to enforce resource usage quota limits. In some embodiments, the MTVMI management application periodically runs the necessary queries to maintain and provide to users an update tally of resource usage by each entity (e.g., user, customer, Project) for each type of resource. In some embodiments, the MTVMI management application can enforce quotas on resource usage using two mechanisms. With the first mechanism, when a user's operation initiates resource usage, the sum of the updated resource usage tally for the user, customer, and Project associated with the operation and the incremental resource usage required by the operation are compared against their respective resource usage quotas. The operation is allowed to continue if the resource quota is greater than the sum of the resource usage tally and the incremental resource required by the operation. Otherwise, the operation is aborted with appropriate notification to the user. With the second mechanism, a Quota Inspector process (discussed previously with reference to FIG. 51) runs periodically to perform quota enforcement. The Quota Inspector calculates the most current resource usage tally for each user, customer, and Project in the MTVMI and determines if any of these usages exceed their respective resource quota. If a quota is exceeded for any entity, the Quota Inspector queries the Resource Usage Events Table 5304 for any Events belonging to that entity that will continue to increase resource usage with the passage of time (e.g., virtual machine execution time). For each such Event, the Quota Inspector triggers the execution of another process to perform an operation on the associated object to terminate the continued usage of resources (e.g., an operation to suspend a running virtual machine). These embodiments illustrate how the MTVMI management application supports resource usage quotas, their reporting, and their enforcement.

Figure 54:
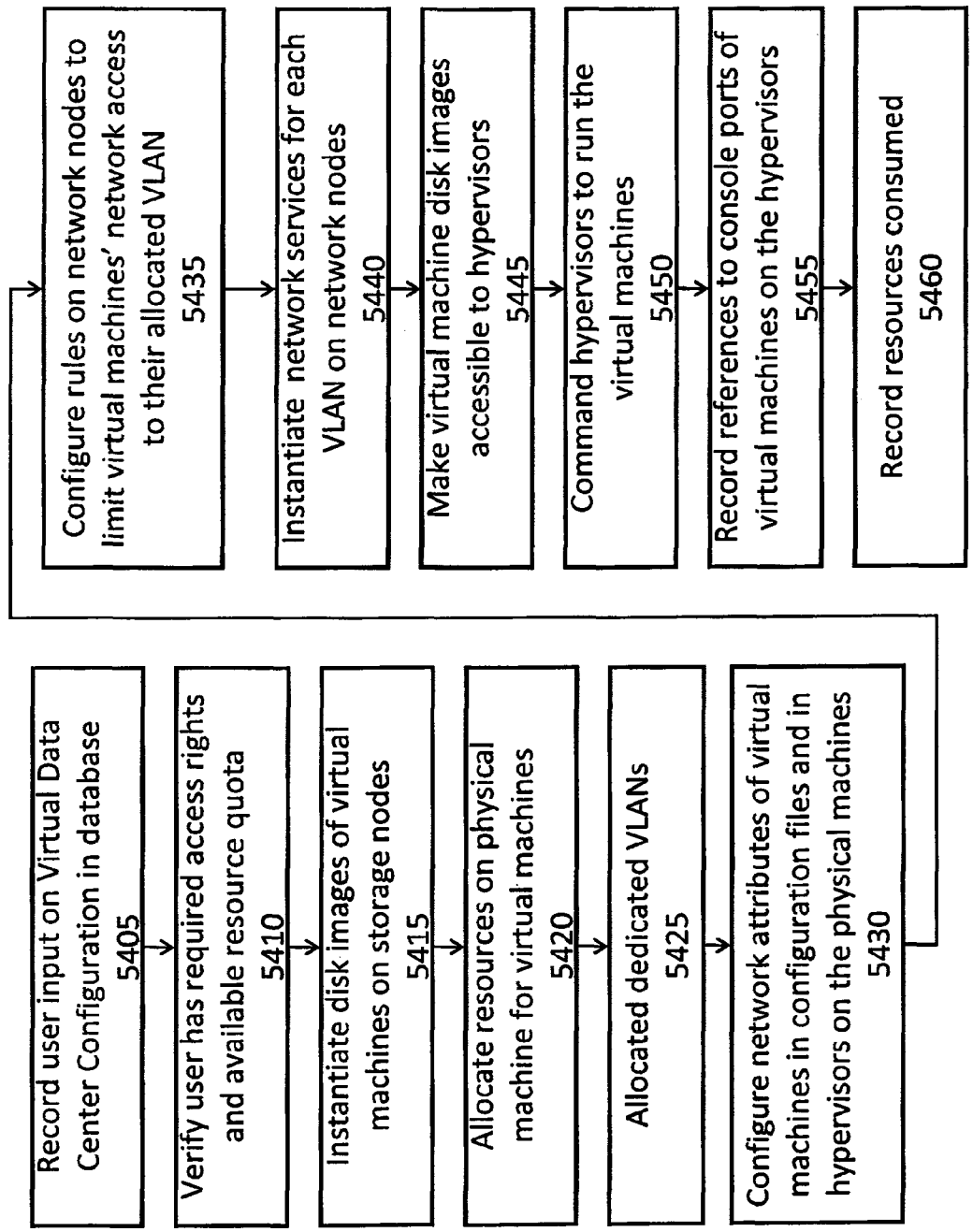
FIG. 54 is a flowchart illustrating the operations performed by a component of the MTVMI management application to instantiate a virtual data center configuration on the MTVMI infrastructure in some embodiments.

FIG. 54 is a flowchart illustrating the operations performed by a component of the MTVMI management application to instantiate a virtual data center configuration on the MTVMI infrastructure in some embodiments. These operations perform steps to instantiate virtual machines, virtual networks, and virtual storage for the virtual data center if the user has the required access rights and available resource quota. In some embodiments these steps are performed through the individual operations of various processes in the MTVMI management application. In block 5405, the component records user input relating to the Virtual Data Center Configuration in a database. In block 5410, the component verifies that the user has the required access rights and available resource quota. In block 5415, the component instantiates disk images of virtual machines storage nodes. In block 5420, the component allocates resources on physical machines for the virtual machines. In block 5425, the component allocates dedicated VLANs for the Virtual Data Center. In block 5430, the component configures network attributes of virtual machines in configuration files and in hypervisors on the physical machine. In block 5435, the component configures network rules for the virtual machines. In block 5440, the component instantiates network services for each VLAN. In block 5445, the component enables hypervisor access to virtual machine disk images. In block 5450, the component commands the hypervisors to run the virtual machines. In block 5455, the component records references to console ports of the virtual machines on the hypervisors. In block 5460, the component records an indication of resources consumed by the Virtual Data Center.

Figure 55:
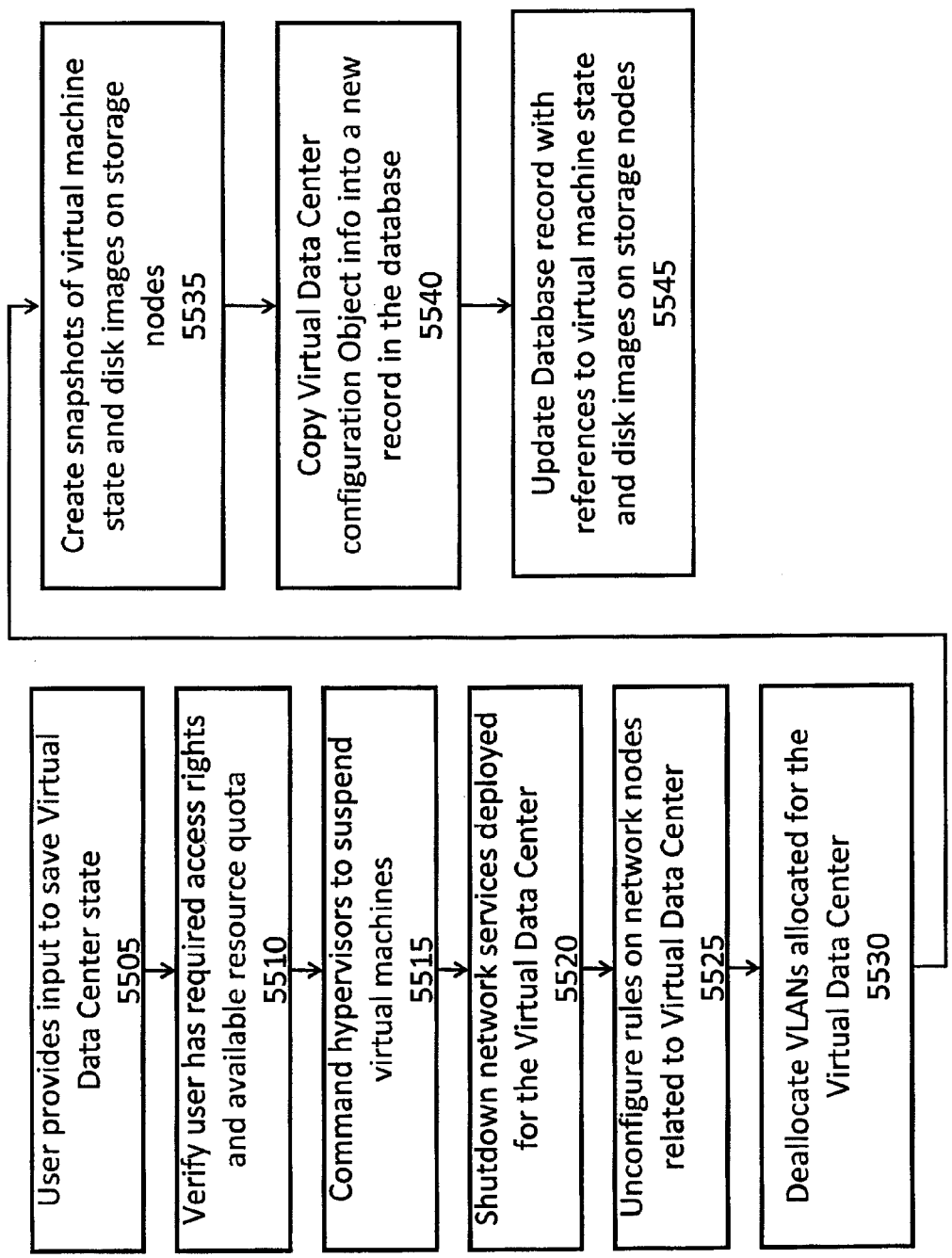
FIG. 55 is a flowchart illustrating the operations performed by a component of the MTVMI management application to save the state of the Virtual Data Center in some embodiments.

FIG. 55 is a flowchart illustrating the operations performed by a component of the MTVMI management application to save the state of the Virtual Data Center in some embodiments. In block 5505, the component receives from a user an indication to save state of the Virtual Data Center. In block 5510, the component verifies that the user has the required access rights and available resource quota. In block 5515, the component commands hypervisors to suspend the virtual machines. In block 5520, the component shuts down network services deployed for the Virtual Data Center. In block 5525, the component unconfigures rules on network nodes related to the Virtual Data Center. In block 5530, the component deallocates VLANs allocated for the Virtual Data Center. In block 5535, the component creates snapshots of virtual machine state and disk images on storage nodes. In block 5540, the component copies Virtual Data Center configuration information into a new record in a database. In block 5545, the component updates a database record with references to virtual machine state and disk images on the storage nodes.

In view of the foregoing, it should be appreciated that, while selected embodiments have been described herein for illustration purposes, various modifications may be made without deviating from the scope of the invention. Accordingly, the invention is not limited except as by the appended claims and the elements explicitly recited therein.

We claim:

1. A method in a computing system having a processor for sharing access to a virtual machine, comprising:
   generating a unique URL corresponding to the virtual machine;
   providing the generated URL to a user specifically authorized to access the virtual machine;
   receiving an HTTP request specifying the provided URL;
   in response to the HTTP request, without attempting to determine the identity of a user who issued the HTTP request, providing access to the virtual machine; and
   receiving from the user specifically authorized access the virtual machine input specifying timing restrictions on access to the virtual machine using the provided URL, and wherein access is only provided in connection with the HTTP request if the HTTP request is received at a time consistent with the specified timing restrictions.

2. The method of claim 1 wherein the user rho issued the HTTP request is not the authorized user.

3. The method of claim 1 wherein the output of the console of the virtual machine is provided in response to the HTTP request, but no input for the console of the virtual machine is accepted in connection with the HTTP request.

4. The method of claim 1 wherein, in response to the HTTP request, the user who issued the HTTP request receives the output of the console of the virtual machine and is permitted to provide input from the console of the virtual machine.

5. The method of claim 1, wherein the access is to a console of the virtual machine.

6. A computer-readable device storing contents adapted to cause a computing system to perform a method for sharing access to a virtual machine, the method comprising:
   generating a unique URL corresponding to the virtual machine;
   providing the generated URL to a user specifically authorized to access the virtual machine;
   receiving an HTTP request specifying the provided URL;
   in response to the HTTP request, without attempting to determine the identity of a user who issued the HTTP request, providing access to the virtual machine; and
   receiving from the user specifically authorized access the virtual machine input specifying timing restrictions on access to the virtual machine using the provided URL, and wherein access is only provided in connection with the HTTP request if the HTTP request is received at a time consistent with the specified timing restrictions.

7. The computer-readable device of claim 6 wherein the user who issued the HTTP request is not the authorized user.

8. The computer-readable device of claim 6 wherein the output of the console of the virtual machine is provided in response to the HTTP request, but no input for the console of the virtual machine is accepted in connection with the http request.

9. The computer-readable device of claim 6 wherein, in response to the HTTP request, the user who issued the http request receives the output of the console of the virtual machine and is permitted to provide input from the console of the virtual machine.

10. The computer readable device of claim 6, wherein the access is to a console of the virtual machine.

11. A computing system comprising:
    at least one processor for sharing access to a virtual machine; and
    memory comprising computer program code configured to, with the at least one processor, cause the computing system to:
    generate a unique URL corresponding to the virtual machine;
    provide the generated URL to a user specifically authorized to access the virtual machine;
    receive an HTTP request specifying the provided URL;
    in response to the HTTP request, without attempting to determine the identity of a user who issued the HTTP request, provide access to the virtual machine; and
    receive from the user specifically authorized access the virtual machine input specifying timing restrictions on access to the virtual machine using the provided URL, and wherein access is only provided in connection with the HTTP request if the HTTP request is received at a time consistent with the specified timing restrictions.

12. The computing system of claim 11 wherein the user who issued the HTTP request is not the authorized user.

13. The computing system of claim 11 wherein the output of the console of the virtual machine is provided in response to the HTTP request, but no input for the console of the virtual machine is accepted in connection with the http request.

14. The computing system of claim 11 wherein, in response to the HTTP request, the user who issued the http request receives the output of the console of the virtual machine and is permitted to provide input from the console of the virtual machine.

15. The computing system of claim 11 wherein the access is to a console of the virtual machine.

* * * * *

UNITED STATES PATENT AND TRADEMARK OFFICE
CERTIFICATE OF CORRECTION

PATENT NO. : 8,473,627 B2
APPLICATION NO. : 13/276153
DATED : June 25, 2013
INVENTOR(S) : Astete et al.

Page 1 of 1

It is certified that error appears in the above-identified patent and that said Letters Patent is hereby corrected as shown below:

In the Specification

In column 20, line 56, delete "virtual," and insert -- virtual --, therefor.

In column 24, line 46, before "charging" insert -- and --.

In the Claims

In column 31, line 58, in claim 2, delete "rho" and insert -- who --, therefor.

Signed and Sealed this
Twenty-fourth Day of November, 2015

Michelle K. Lee
*Director of the United States Patent and Trademark Office*